US012480877B2

(12) United States Patent
Krauth et al.

(10) Patent No.: US 12,480,877 B2
(45) Date of Patent: Nov. 25, 2025

(54) METHOD AND APPARATUS FOR DETECTING A PRESENCE OF A FLUORESCENCE PATTERN TYPE ON AN ORGAN SECTION BY MEANS OF IMMUNOFLUORESCENCE MICROSCOPY

(71) Applicant: EUROIMMUN Medizinische Labordiagnostika AG, Lübeck (DE)

(72) Inventors: Jens Krauth, Lübeck (DE); Stefan Gerlach, Groß Groenau (DE); Christian Marzahl, Erlangen (DE); Christopher Krause, Büchen (DE); Jens Hocke, Luebeck (DE); Melanie Hahn, Stockelsdorf (DE); Joern Voigt, Luebeck (DE)

(73) Assignee: EUROIMMUN Medizinische Labordiagnostika AG, Lübeck (DE)

( * ) Notice: Subject to any disclaimer, the term of this patent is extended or adjusted under 35 U.S.C. 154(b) by 391 days.

(21) Appl. No.: 17/557,839

(22) Filed: Dec. 21, 2021

(65) Prior Publication Data
US 2022/0196553 A1 Jun. 23, 2022
US 2022/0404283 A2 Dec. 22, 2022

(30) Foreign Application Priority Data

Dec. 21, 2020 (EP) .................... 20215995

(51) Int. Cl.
| | |
|---|---|
| *G01N 31/00* | (2006.01) |
| *G01N 21/64* | (2006.01) |
| *G01N 33/53* | (2006.01) |
| *G01N 33/58* | (2006.01) |
| *G06N 3/045* | (2023.01) |
| *G06T 7/00* | (2017.01) |
| *G06T 7/11* | (2017.01) |
| *G06T 7/62* | (2017.01) |

(52) U.S. Cl.
CPC ..... *G01N 21/6458* (2013.01); *G01N 21/6486* (2013.01); *G01N 33/582* (2013.01); *G06N 3/045* (2023.01); *G06T 7/0012* (2013.01); *G06T 7/11* (2017.01); *G06T 7/62* (2017.01); *G06T 2207/10056* (2013.01); *G06T 2207/10064* (2013.01); *G06T 2207/20084* (2013.01); *G06T 2207/30024* (2013.01)

(58) Field of Classification Search
None
See application file for complete search history.

(56) References Cited

U.S. PATENT DOCUMENTS

| | | | | |
|---|---|---|---|---|
| 8,637,327 | B2 * | 1/2014 | Winfried | G06T 7/90 |
| | | | | 436/166 |
| 12,392,723 | B2 * | 8/2025 | Gerlach | G06N 3/084 |
| 2008/0199078 | A1 * | 8/2008 | Lam | G06T 7/337 |
| | | | | 382/190 |
| 2015/0032671 | A9 * | 1/2015 | Kamath | G06V 20/69 |
| | | | | 706/12 |
| 2020/0300764 | A1 | 9/2020 | Gerlach et al. | |
| 2021/0019883 | A1 | 1/2021 | Krauth et al. | |

FOREIGN PATENT DOCUMENTS

| | | |
|---|---|---|
| EP | 3258247 A1 | 12/2017 |
| EP | 3712618 A1 | 9/2020 |
| EP | 3767587 A1 | 1/2021 |

OTHER PUBLICATIONS

Xu, Jun et al. "A Deep Convolutional Neural Network for segmenting and classifying epithelial and stromal regions in histopathological images." Neurocomputing 191 (2016): 214-223. (Year: 2016).*
Francisco-Cruz et al. (Methods in Molecular Biology, MIMB, vol. 2 2055, online Sep. 10, 2019) (Year: 2019).*

* cited by examiner

*Primary Examiner* — Lisa V Cook
(74) *Attorney, Agent, or Firm* — Bochner PLLC; Andrew D. Bochner

(57) ABSTRACT

A method for detecting a potential presence of a fluorescence pattern type on an organ section via immunofluorescence microscopy and digital image processing, the method comprising: providing an organ section on a slide, incubating the section with a liquid patient sample potentially including primary antibodies and secondary antibodies labelled with a fluorescent dye, acquiring a fluorescence image of the organ section, determining, by segmentation of the fluorescence image via a first neural network, a sub-area of the fluorescence image relevant to formation of the fluorescence pattern type, determining, via a second neural network, the measure of confidence indicating an actual presence of the fluorescence pattern type, determining, validity information indicating a degree of a validity of the measure of confidence, and outputting the measure of confidence of the actual presence of the fluorescence pattern type and of the validity information.

11 Claims, 65 Drawing Sheets

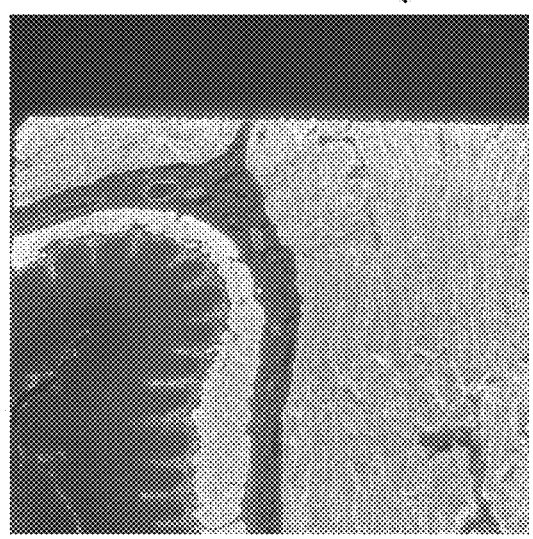
Fig. 15A
Fig. 15B
Fig. 15C
Fig. 15D

Fig. 20A

LKM

EUROPattern visual mode

| EPa-Classifier | | found | not found | Total |
|---|---|---|---|---|
| | found | 11 | 1 | 12 |
| | not found | 1 | 79 | 80 |
| | Total | 12 | 80 | 92 |

Sensitivity: 91,67%

Specificity: 98,75%

Overall agreement: 97,83%

20x magnification, instrument EUROPatternMicroscope 1.5.1

Table1

Fig. 20B

AMA

EUROPattern visual mode

| EPa-Classifier | | found | not found | Total |
|---|---|---|---|---|
| | found | 11 | 1 | 12 |
| | not found | 1 | 79 | 80 |
| | Total | 12 | 80 | 92 |

Sensitivity: 91,67%

Specificity: 98,75%

Overall agreement: 97,83%

20x magnification, instrument EUROPatternMicroscope 1.5.1

Table2

Fig. 21A

LKM

| | EUROPattern visual mode | | |
|---|---|---|---|
| EPa-Classifier | | found | not found | Total |
| found | 11 | 1 | 12 |
| not found | 1 | 80 | 81 |
| Total | 12 | 81 | 93 |

Sensitivity: 91,67%
Specificity: 98,77%
Overall agreement: 97,85%

10x magnification, instrument EUROPatternMicroscope 1.5.1

Table 3

Fig. 21B

AMA

| | EUROPattern visual mode | | |
|---|---|---|---|
| EPa-Classifier | | found | not found | Total |
| found | 12 | 0 | 12 |
| not found | 0 | 81 | 81 |
| Total | 12 | 81 | 93 |

Sensitivity: 100,00%
Specificity: 100,00%
Overall agreement: 100,00%

10x magnification, instrument EUROPatternMicroscope 1.5.1

Table 4

Fig. 22A

LKM

| | EUROPattern visual mode | | |
|---|---|---|---|
| EPa-Classifier | | found | not found | Total |
| | found | 11 | 0 | 11 |
| | not found | 1 | 80 | 81 |
| | Total | 12 | 80 | 92 |

Sensitivity: 91,67%
Specificity: 100,00%
Overall agreement: 98,91%

20x magnification, instrument EUROPatternMicroscopeLive

Table 5

Fig. 22B

AMA

| | EUROPattern visual mode | | |
|---|---|---|---|
| EPa-Classifier | | found | not found | Total |
| | found | 11 | 4 | 15 |
| | not found | 1 | 76 | 77 |
| | Total | 12 | 80 | 92 |

Sensitivity: 91,67%
Specificity: 95,00%
Overall agreement: 94,57%

20x magnification, instrument EUROPatternMicroscopeLive

Table 6

Fig. 23A

Endomysium

| EPa-Classifier | EUROPattern visual mode | | |
|---|---|---|---|
| | found | not found | Total |
| found | 69 | 2 | 71 |
| not found | 0 | 165 | 165 |
| Total | 69 | 167 | 236 |

Sensitivity: 100,00%
Specificity: 98,80%
Overall agreement: 99,15%

10x magnification, instrument EUROPatternMicroscope 1.5.1

Table 7

Fig. 23B

Endomysium

| EPa-Classifier | EUROPattern visual mode | | |
|---|---|---|---|
| | found | not found | Total |
| found | 69 | 0 | 69 |
| not found | 0 | 167 | 167 |
| Total | 69 | 167 | 236 |

Sensitivity: 100,00%
Specificity: 100,00%
Overall agreement: 100,00%

20x magnification, instrument EUROPatternMicroscope Live

Table 8

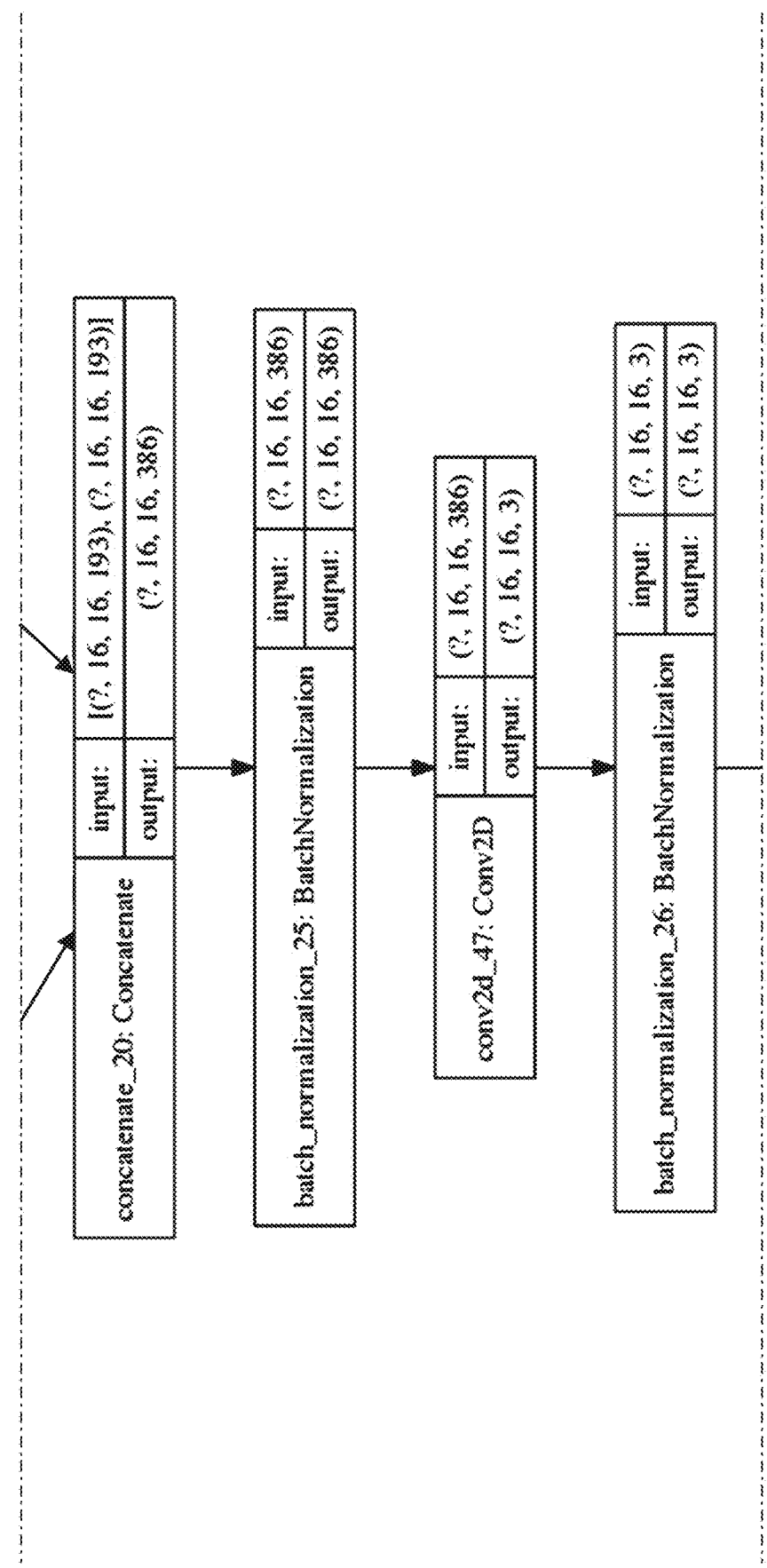
FIG. 26B
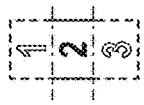

METHOD AND APPARATUS FOR DETECTING A PRESENCE OF A FLUORESCENCE PATTERN TYPE ON AN ORGAN SECTION BY MEANS OF IMMUNOFLUORESCENCE MICROSCOPY

CROSS-REFERENCE TO RELATED APPLICATIONS

The present application claims priority pursuant to 35 U.S.C. § 119(a) to EP patent application 20215995.0, filed Dec. 21, 2020, which is incorporated by reference herein in its entirety.

BACKGROUND

The invention relates to a method and an apparatus for detecting at least one potential presence of at least one fluorescence pattern type on an organ section by means of immunofluorescence microscopy and by means of digital image processing.

Immunofluorescence microscopy or indirect immunofluorescence microscopy is an in vitro test for determination of a presence of human antibodies against certain antigens in order to be able to answer or assess a diagnostic question. Such antigens are, for example, present in certain regions of organ sections such as a rat kidney or an esophagus of a simian. The substrate used is thus an organ section which is incubated with a patient sample in the form of blood or diluted blood or else blood serum or diluted blood serum. The patient sample thus potentially comprises certain primary antibodies which can express a presence of a disease in the patient. Such primary or specific antibodies can then bind to antigens of the substrate or organ section. Primary antibodies bound in such a manner can then be labelled by binding so-called secondary antibodies, preferably anti-human antibodies, to the bound primary antibodies in a further incubation step and being able to visualize them later as a result of the secondary antibodies having been labelled with a fluorescent dye. Such a fluorescent dye is preferably a green fluorescent dye, in particular the fluorescent dye FITC. Such binding of a primary antibody together with a fluorescently labelled secondary antibody can then be visualized later by irradiating the organ section with excitation light of a certain wavelength and thus exciting the bound fluorescent dyes to emit fluorescence radiation.

Depending on the diagnostic question, the focus can be on a presence of a fluorescence pattern type or very specific fluorescence pattern types on certain organ sections or very specific sub-regions or sub-areas of the organ sections. The task that thus arises is that of detecting, by means of digital image processing in the course of immunofluorescence microscopy for an organ section incubated in the prescribed manner, one or more fluorescence pattern types in an immunofluorescence microscopy fluorescence image.

FIG. 6 shows, as a fluorescence image FB, an exemplary fluorescence image FB1 of an organ section of a rat kidney. What are revealed in the sub-regions TB1, TB2, each indicated by bright rectangles, are zones in which an LKM pattern to be expected for a positive diagnostic case may be present, at least in part. Such an LKM pattern is also called a liver-kidney-microsomal pattern, since so-called LKM antibodies (liver kidney microsomal antibodies) are present in a positive patient sample. The LKM pattern is a first fluorescence pattern type.

Such an LKM pattern can be looked at more closely at least in part in FIG. 7 in an enlargement of the sub-region TB1. In the case of said LKM pattern, what is visible in the region of the adrenal cortex is a finely granular cytoplasmic fluorescence of the proximal tubules PT. The distal tubules DT are negative here. The glomeruli GL, marked in FIG. 6, as a further sub-pattern of the LKM pattern are negative here, too. Such a multilevel nature of the fluorescence of the proximal tubules PT having a finely granular cytoplasmic fluorescence compared to negative distal tubules DT and negative glomeruli GL accounts for such an LKM pattern.

FIG. 8 shows a further fluorescence image FB2 of another organ section of a rat kidney, with a so-called AMA pattern of so-called anti-mitochondrial antibodies being present in a sub-region TB21, enlarged in FIG. 9. For such an AMA pattern, the cytoplasm of the proximal tubules PT2 and the distal tubules DT2 is stained with a granular fluorescence, whereas the glomeruli GL2 exhibit only faint illumination or faint fluorescence staining. The AMA pattern is thus a second fluorescence pattern type, the presence of which can be detected.

FIG. 13 shows a fluorescence image of a different kind of organ section, in this case an image FB3 of a section of an esophagus of a simian. A certain sub-area of the organ section, namely the region muscularis mucosae, indicated by reference sign C, is relevant to formation of a so-called endomysium pattern. In relation to this, FIG. 15C shows the corresponding accentuated relevant region of the muscularis mucosae, in which reticulated staining of said muscularis mucosae is present in a positive case. The region HGF is the so-called background of the fluorescence image or the slide, on which no organ section is present.

The task that thus arises for various organ sections is that of detecting one or more fluorescence pattern types with respect to the presence(s) thereof, which can be carried out by digital image processing.

SUMMARY

In accordance with the foregoing objectives and others, exemplary embodiments are disclosed herein for detecting at least one potential presence of at least one fluorescence pattern type on an organ section by means of immunofluorescence microscopy and by means of digital image processing. The method comprises various steps. First, what is provided is an organ section on a slide. What then takes place is incubation of the organ section with a liquid patient sample which potentially comprises primary antibodies. What then takes place is incubation of the organ section with secondary antibodies which have been labelled with a fluorescent dye. What further takes place is acquisition of a fluorescence image of the organ section in a color channel corresponding to the fluorescent dye. What further takes place is determination, by segmentation of the fluorescence image by means of a first neural network, of a sub-area of the fluorescence image that is relevant to formation of the fluorescence pattern type. What further takes place is determination, on the basis of the fluorescence image by means of a second neural network, of the measure of confidence that indicates an actual presence of the fluorescence pattern type. What further takes place is determination, on the basis of the previously determined sub-area, of validity information that indicates a degree of a validity of the measure of confidence. What lastly takes place is output of the measure of confidence of the actual presence of the fluorescence pattern type and of the validity information.

In principle, analyzing an entire image such as, for example, an entire fluorescence image by means of a single neural network and thereby detecting a presence of a pattern to be expected is known for digital imaging. Here, the entire image can thus be supplied all at once to the classifier or the neural network, which can then ascertain a measure of confidence regarding a presence of a certain pattern.

In immunofluorescence microscopy based on organ sections, certain adverse effects may arise during production, which adverse effects can be counteracted by the method according to the invention. An organ section such as from FIG. 6 and FIG. 8 is not present across the entire area of the image FB1 and FB2, respectively, since such biological material, in the course of production processing to create slides covered by organ sections, is sometimes not applied to the full surface of the slide. Availability of necessary organ material is not unlimited. A relatively large organ section is first applied to a support surface and then the support surface is divided into sub-support surfaces or slides, preferably by means of cutting, and so what can occur especially in edge regions of the organ section is only partial coverage of a slide, as can be seen in FIG. 6 and in FIG. 8. If such a fluorescence image FB1 or FB2 is then evaluated as a whole by means of a neural network, the neural network can then ascertain on the basis of the entire image FB1 or FB2 a measure of confidence with respect to a presence of a fluorescence pattern type. However, a possible lack of total planar coverage of the slide or fluorescence image by the organ section means that that sub-region of the image on which no organ section is present can, as image information, impair the quality of the determination of the measure of confidence by the neural network. As a result, there may thus be the possibility that a diagnostician, such as, for example, a physician, can rely on the neural network-determined measure of confidence only to a certain degree for subsequently making on his part a decision for a final diagnosis. Especially if the organ section is an esophagus of a simian, pattern detection can reliably take place only in a certain sub-region of the organ section, in this case in region C, the region of the muscularis mucosae, from the example image of FIG. 13. Said region C or the corresponding sub-area is only a certain planar proportion of the fluorescence image. Alternatively or additionally, a further negative technical effect can occur: for sufficient depiction or detectability of patterns in a fluorescence image, the fluorescence images are sometimes acquired using microscope optical systems of certain optical magnifications. This can lead to a fluorescence image which captures or depicts neither the entire slide nor the entire organ section. This too can make it necessary to establish how much sub-area of the fluorescence image is covered by the organ section or by a region of the organ section that is relevant to pattern formation.

Owing to the fact that the method according to the invention does not use only a single neural network for analyzing an entire image and then detecting a presence of a fluorescence pattern type, but that two different neural networks generate different items of information, the method according to the invention is more robust than the method from the prior art. Particularly advantageously, it is precisely validity information that is additionally determined as information and output together with the measure of confidence, meaning that the user or physician receives additional information regarding a validity of the measure of confidence.

According to the invention, the validity information is determined in a particular way. What first takes place is determination, by means of a neural network, of a sub-area of the fluorescence image that is relevant to formation of the fluorescence pattern type. In the example of the organ section of a rat kidney, this can for the example of the image FB1—see FIG. 11A—be the sub-area TF1 from FIG. 11B. The sub-area TF1 corresponds to precisely the sub-area occupied by the organ section in the image FB1. For the other example of the fluorescence image FB2—see FIG. 11C—a corresponding sub-area TF2 is shown in FIG. 11D. In the example of a fluorescence image FB3 of an esophagus of a simian from FIG. 13, such a sub-area that is relevant to formation of the fluorescence pattern type can be a sub-area of the organ section itself, i.e. a certain organ region. In this example of the image FB3 from FIG. 13, which is depicted again in FIG. 15A, the corresponding sub-area TF3 is depicted as a bright region in FIG. 15D. According to the invention, such a sub-area TF1, TF2, TF3 is used for determining the validity information on the basis thereof.

The method according to the invention is especially advantageous because a user need not rely just on a measure of confidence determined by a single neural network with respect to a presence of a fluorescence pattern type; instead, what is additionally output to said user is precisely validation information which takes into account the degree to which the fluorescence image analyzed by the first neural network is covered by a relevant region or relevant sub-area of the organ. As a result, if a slide provided from mass production and containing an organ section has unintentionally an only small sub-area on the slide, and then also on the fluorescence image, that is relevant to the formation of a fluorescence pattern type to be expected, it is thus possible to thereby receive by means of the validity information a kind of warning that he should possibly not come to a decision just solely on the basis of the measure of confidence that is output, but should preferably take into account the extent to which sub-areas of relevance to the formation of the fluorescence pattern type are actually present within the fluorescence image.

The method according to the invention is thus advantageous because the sub-tasks of ascertainment of the measure of confidence of a presence of the fluorescence pattern type and of the validity information need not be performed in a combined manner by a single neural network, but because this is divided into two sub-tasks for respective neural networks. Here, the first neural network can then be trained specifically on the sub-task of segmentation of the fluorescence image without having to detect a presence of certain fluorescence pattern types. Thus, the first neural network for segmentation of the fluorescence image must be merely trained for segmentation of the fluorescence image with respect to certain sub-areas, and so use can be made of training data in which certain fluorescence pattern types need not be present and such presence need also not be provided in the form of meta-data of a so-called "ground truth" for the training. Specifically, it is sufficient to carry out the task of segmentation of the fluorescence image on the basis of training data or training images comprising, as information in connotation form, the subdivision of the fluorescence image into various segmentation regions, such as, for example, the segmentation information from FIG. 11B or else segmentation information from FIG. 15B.

The second neural network as a classification network need then precisely not be trained on the identification of such sub-areas or segments, but must instead only be trained such that it detects presences of fluorescence pattern types. In particular, the second neural network can preferably ascertain the measure of confidence on the basis of the fluorescence image itself and also on the basis of the segmented fluorescence image or the segmentation information obtained therefrom. Here, it is thus possible for example for preferably not only the fluorescence image FB3 from FIG. 13, but also the segmentation information SEGA or the sub-area TF3 from FIG. 15D to enter into the second neural network for ascertainment of the measure of confidence. By means of particularly preferably the second neural network, it is then possible to take sub-fluorescence-image information, as depicted in FIG. 15C as information FB33, into greater account, and to thus ascertain the measure of confidence on the basis of said sub-fluorescence-image information FB33.

Advantageous embodiments of the invention are subject matter of the dependent claims and are more particularly elucidated in the following description with some reference to the figures.

Preferably, the method is designed for detection of respective potential presences of respective fluorescence pattern types on an organ section by means of immunofluorescence microscopy and by means of digital image processing, the method preferably comprising: determining, by segmentation of the fluorescence image by means of a first neural network, a sub-area of the fluorescence image that is potentially relevant to formation of the fluorescence pattern types, determining, on the basis of the fluorescence image by means of a second neural network, respective measures of confidence that indicate respective actual presences of the respective fluorescence pattern types, determining, on the basis of the previously determined sub-area, validity information that indicates a degree of a validity of the measures of confidence, outputting at least a subset of the respective measures of confidence of the respective actual presences of the respective fluorescence pattern types and the validity information.

Preferably, the method further comprises: determining the measure of confidence on the basis of the fluorescence image and on the basis of the segmented fluorescence image by means of the second neural network.

Preferably, the method further comprises: determining the measure of confidence on the basis of the fluorescence image, and on the basis of information indicating the sub-area, by means of the second neural network.

Preferably, the method further comprises: determining the validity information by means of determination of a proportion of a planar coverage of the fluorescence image due to the sub-area potentially relevant to formation of fluorescence patterns.

Preferably, the method further comprises: in the event of a fluorescence pattern type being determined as actually present, determining a degree of brightness of the sub-area in the fluorescence image that is potentially relevant to formation of the fluorescence pattern type.

Preferably, the method further comprises: estimating a maximum degree of dilution of the patient sample at which incubation of the organ section with the patient sample still leads to a presence of a or the fluorescence pattern type.

There is further proposed an apparatus for detecting at least one potential presence of at least one fluorescence pattern type on an organ section by means of immunofluorescence microscopy and by means of digital image processing, comprising a holding device for a slide containing an organ section which has been incubated with a patient sample potentially comprising primary antibodies and furthermore with secondary antibodies which have each been labelled with a fluorescent dye, at least one image acquisition unit for acquiring a fluorescence image of the organ section in a color channel corresponding to the fluorescent dye, and further comprising at least one computing unit designed to determine, by segmentation of the fluorescence image by means of a first neural network, a sub-area in the fluorescence image that is relevant to formation of the fluorescence pattern type, to determine, on the basis of the fluorescence image by means of a second neural network, a measure of confidence that indicates an actual presence of the fluorescence pattern type, to determine, on the basis of the sub-area, validity information that indicates a degree of a validity of the measure of confidence, and furthermore to output the measure of confidence of the actual presence of the fluorescence pattern type and the validity information.

There is further proposed a computing unit which, in the course of digital image processing, is designed to receive a fluorescence image representing staining of an organ section due to a fluorescent dye, to determine, by segmentation of the fluorescence image by means of a first neural network, a sub-area in the fluorescence image that is relevant to formation of the fluorescence pattern type, to determine, on the basis of the fluorescence image by means of a second neural network, a measure of confidence that indicates an actual presence of the fluorescence pattern type, to determine, on the basis of the previously determined sub-area, validity information that indicates a degree of a validity of the measure of confidence, and furthermore to output the measure of confidence of the actual presence of the fluorescence pattern type and the validity information.

There is further proposed a data network device comprising at least one data interface for receiving a fluorescence image representing staining of an organ section due to a fluorescent dye, and further comprising at least one computing unit which, in the course of digital image processing, is designed to determine, by segmentation of the fluorescence image by means of a first neural network, a sub-area in the fluorescence image that is relevant to formation of the fluorescence pattern type, to determine, on the basis of the fluorescence image by means of a second neural network, a measure of confidence that indicates an actual presence of the fluorescence pattern type, to determine, on the basis of the previously determined sub-area, validity information that indicates a degree of a validity of the measure of confidence, and furthermore to output the measure of confidence of the actual presence of the fluorescence pattern type and the validity information.

There is further proposed a method for digital image processing comprising: receiving a fluorescence image representing staining of an organ section (S) due to a fluorescent dye, determining, by segmentation of the fluorescence image by means of a first neural network, a sub-area in the fluorescence image that is relevant to formation of the fluorescence pattern type, determining, on the basis of the fluorescence image by means of a second neural network, a measure of confidence that indicates an actual presence of the fluorescence pattern type, determining, on the basis of the previously determined sub-area, validity information that indicates a degree of a validity of the measure of confidence, outputting the measure of confidence of the actual presence of the fluorescence pattern type and the validity information.

There is further proposed a computer program product comprising commands which, upon execution of the program by a computer, prompt said computer to carry out the method for digital image processing.

There is further proposed is a data carrier signal which transmits the computer program product.

BRIEF DESCRIPTION OF THE DRAWINGS

FIG. 15A shows the third fluorescence image, FIG. 15B shows a segmentation result of the third fluorescence image, FIG. 15C shows relevant image information of the third fluorescence image, FIG. 15D shows a relevant sub-area of the third fluorescence image, FIGS. 20A-23B show experimental results for different organ sections.

DETAILED DESCRIPTION

Figure 10:
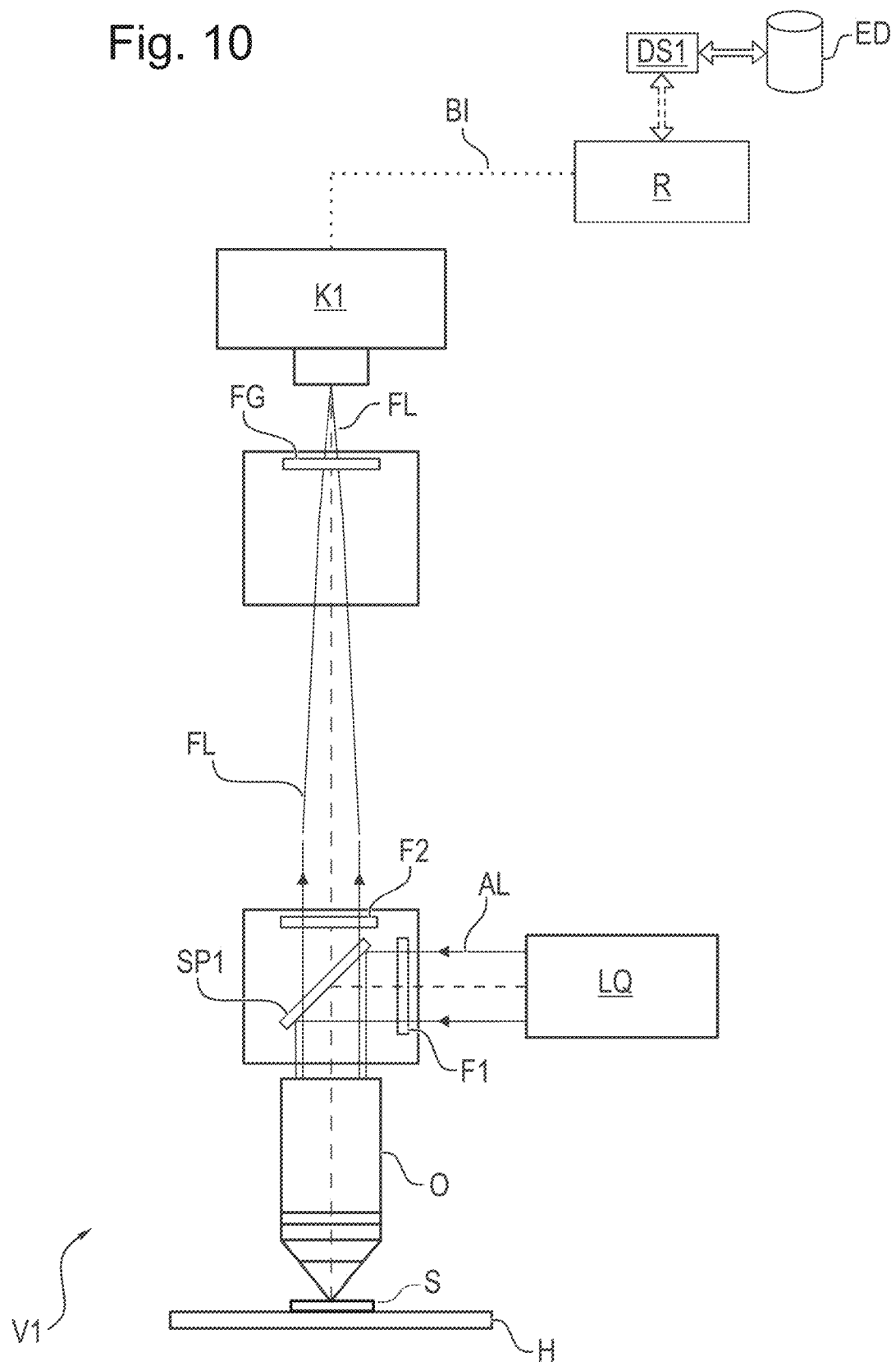
FIG. 10 shows an apparatus according to the invention as per a preferred embodiment.

FIG. 10 shows an apparatus V1, by means of which the method according to the invention can be preferably carried out. The apparatus V1 can be referred to as a fluorescence microscope. The apparatus V1 comprises a holder H for a substrate S or slide which has been incubated in the manner described above. Via an optical system O, excitation light AL of an excitation light source LQ is guided towards the substrate S. Resultant fluorescence radiation FL is then transmitted back through the optical system O and passes through the dichroic mirror SP1 and an optional optical filter F2. Preferably, the fluorescence radiation FL passes through an optical filter FG which filters out a green channel. A camera K1 is preferably a monochrome camera, which then captures the fluorescence radiation FL in a green channel if an optical filter FG is present. According to an alternative embodiment, the camera K1 is a color camera which manages without use of the optical filter FG and acquires the fluorescence image in the relevant color channel in the form of a green channel by means of a Bayer array. The camera K1 provides the image information BI or the fluorescence image to a computing unit R, which processes said image information BI. Preferably, the computing unit R can output or provide data such as, for example, a fluorescence image, measures of confidence and validity information via a data interface DS1.

Figure 6:
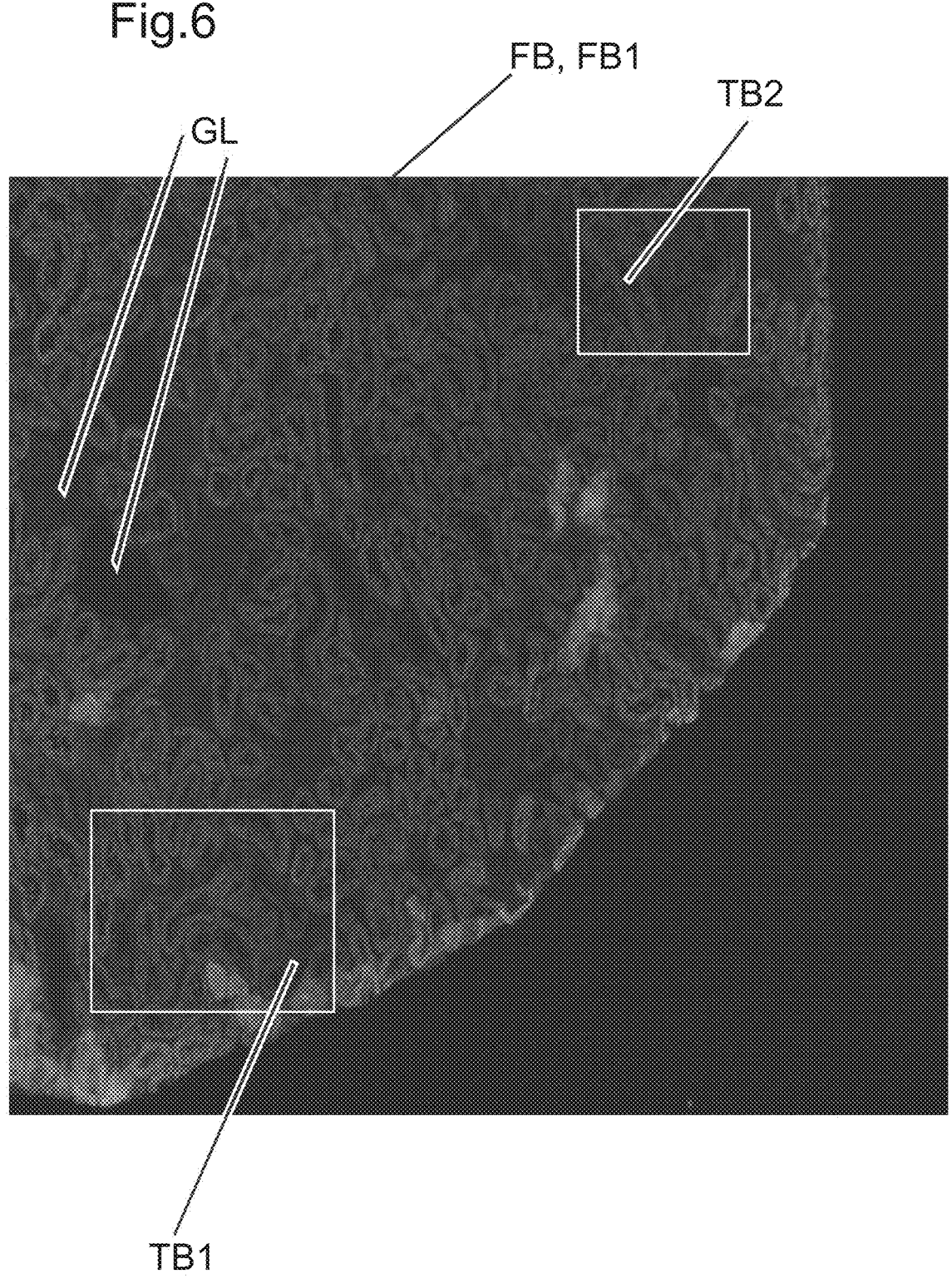
FIG. 6 shows a first fluorescence image.
Figure 7:
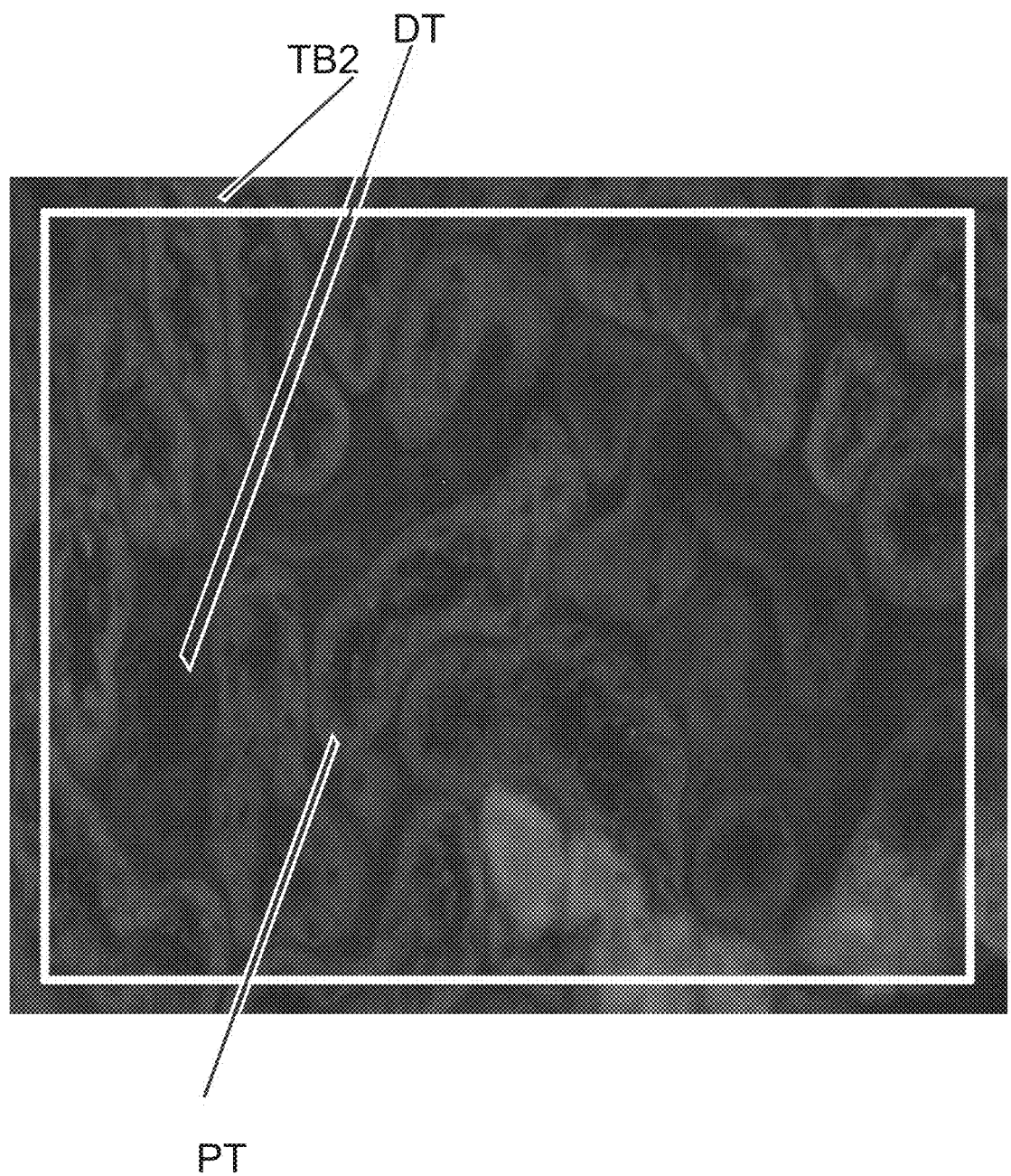
FIG. 7 shows a sub-region of the first fluorescence image.

FIG. 6 shows a first fluorescence image FB1, FB which represents an organ section of a kidney of a rat on a slide, wherein a so-called LKM pattern. In sub-regions TB1, TB2, an LKM pattern is present at least in part, as depicted with magnification for the sub-region TB1 in FIG. 7.

Figure 8:
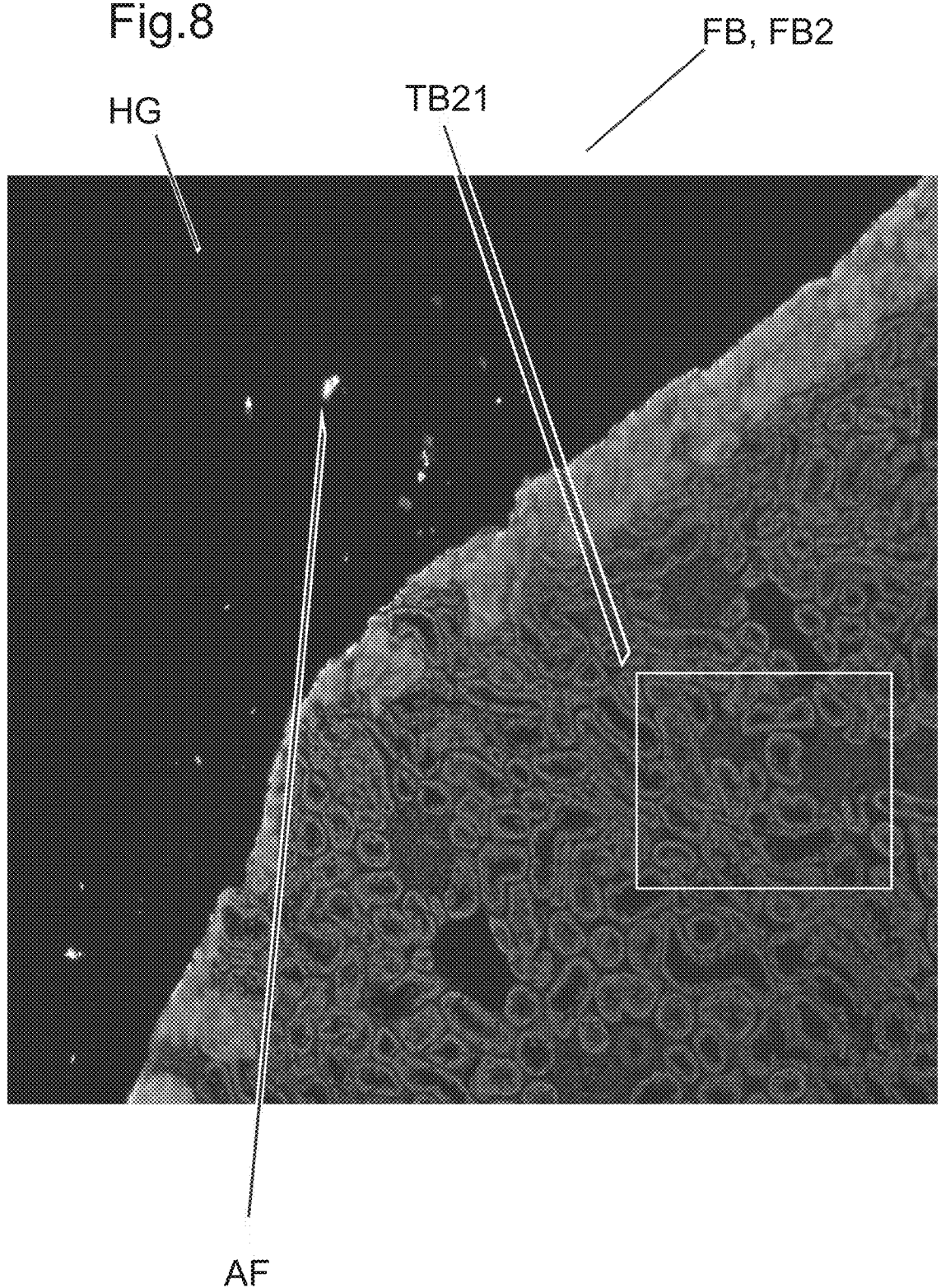
FIG. 8 shows a second fluorescence image.
Figure 9:
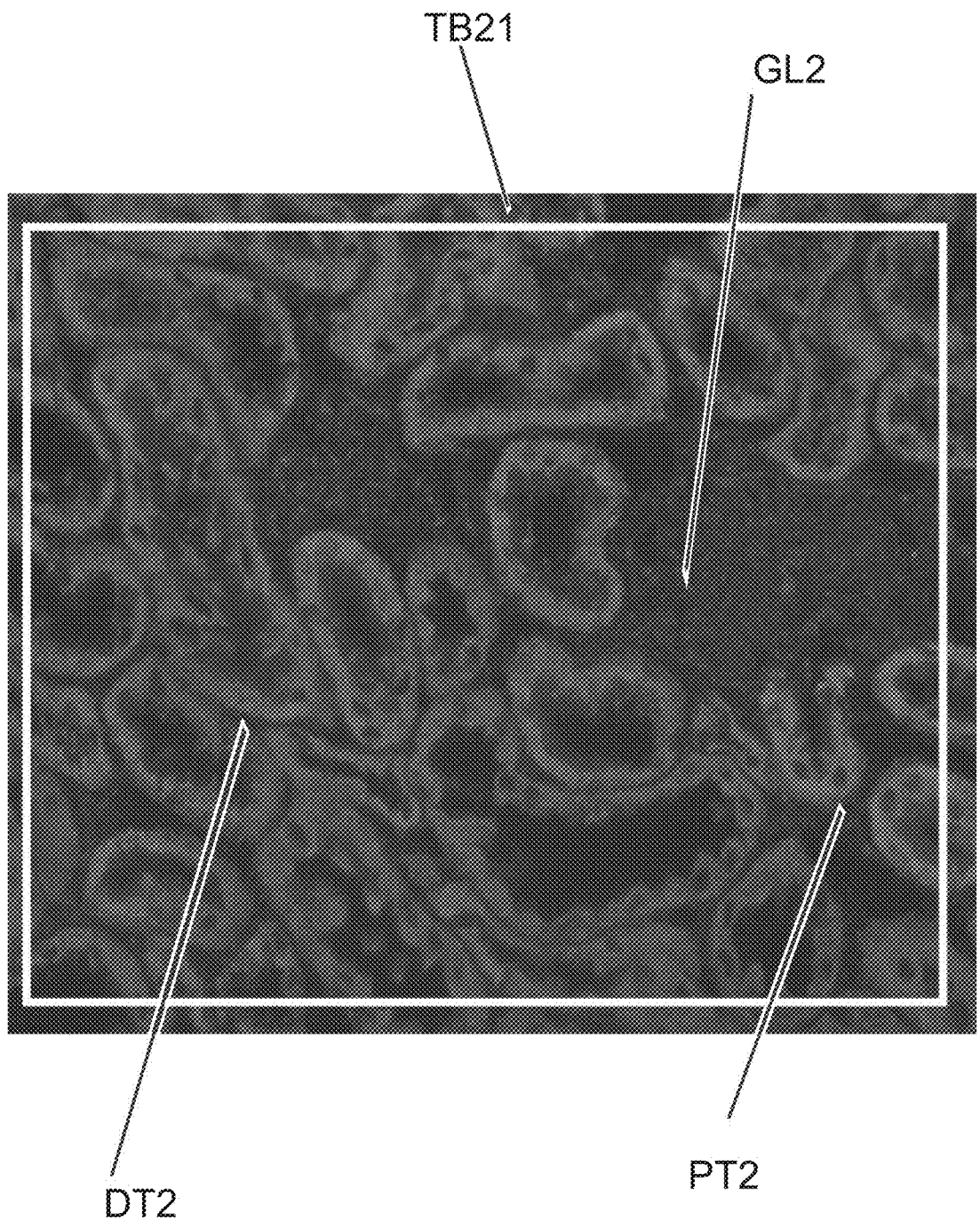
FIG. 9 shows a sub-region of the second fluorescence image.

FIG. 8 shows a second sub-image FB2, FB, on which a so-called AMA pattern is present as a pattern type, as depicted with magnification in FIG. 9 for a sub-image region TB21.

Figure 11A:
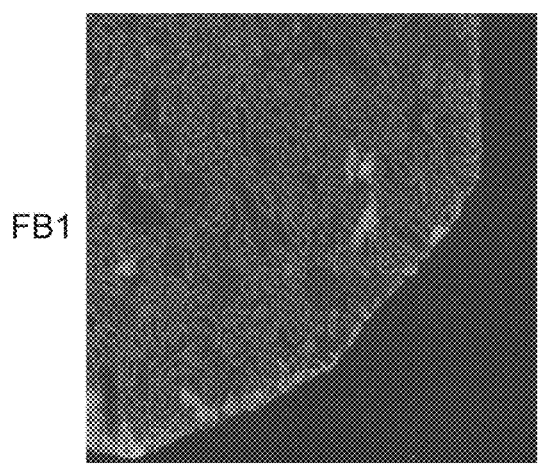
FIGS. 11A-11F show respective fluorescence images having respectively corresponding sub-areas relevant to respective formation of fluorescence pattern types.
Figure 11B:
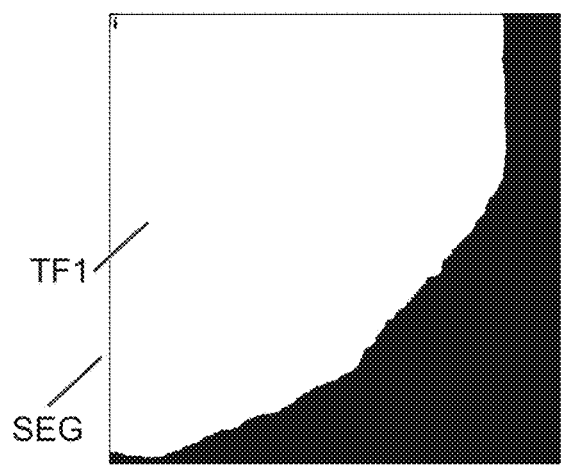
Figure 11C:
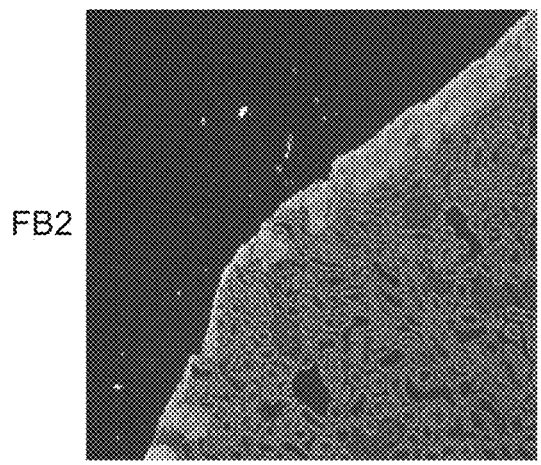
Figure 11D:
Figure 11E:
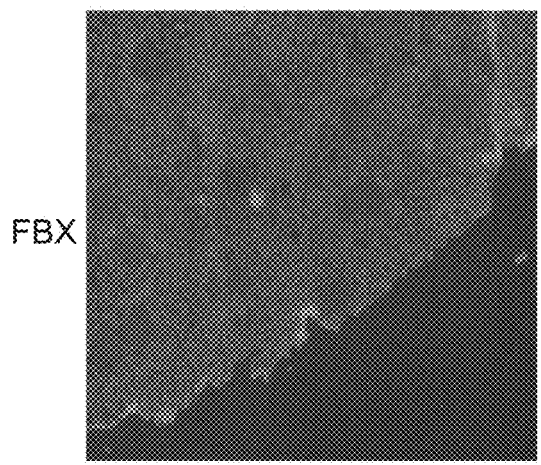

The first fluorescence image FB1 is depicted again in FIG. 11A and the second fluorescence image FB2 in FIG. 11C. FIG. 11E shows a further fluorescence image FBX, in which none of the fluorescence pattern types LKM, AMA is present. In principle, it is possible for multiple different fluorescence pattern types to be present at the same time. However, in the examples of the fluorescence images FB1 and FB2 from FIGS. 6 and 8, respectively, only a single pattern is present in each case.

Figure 1:
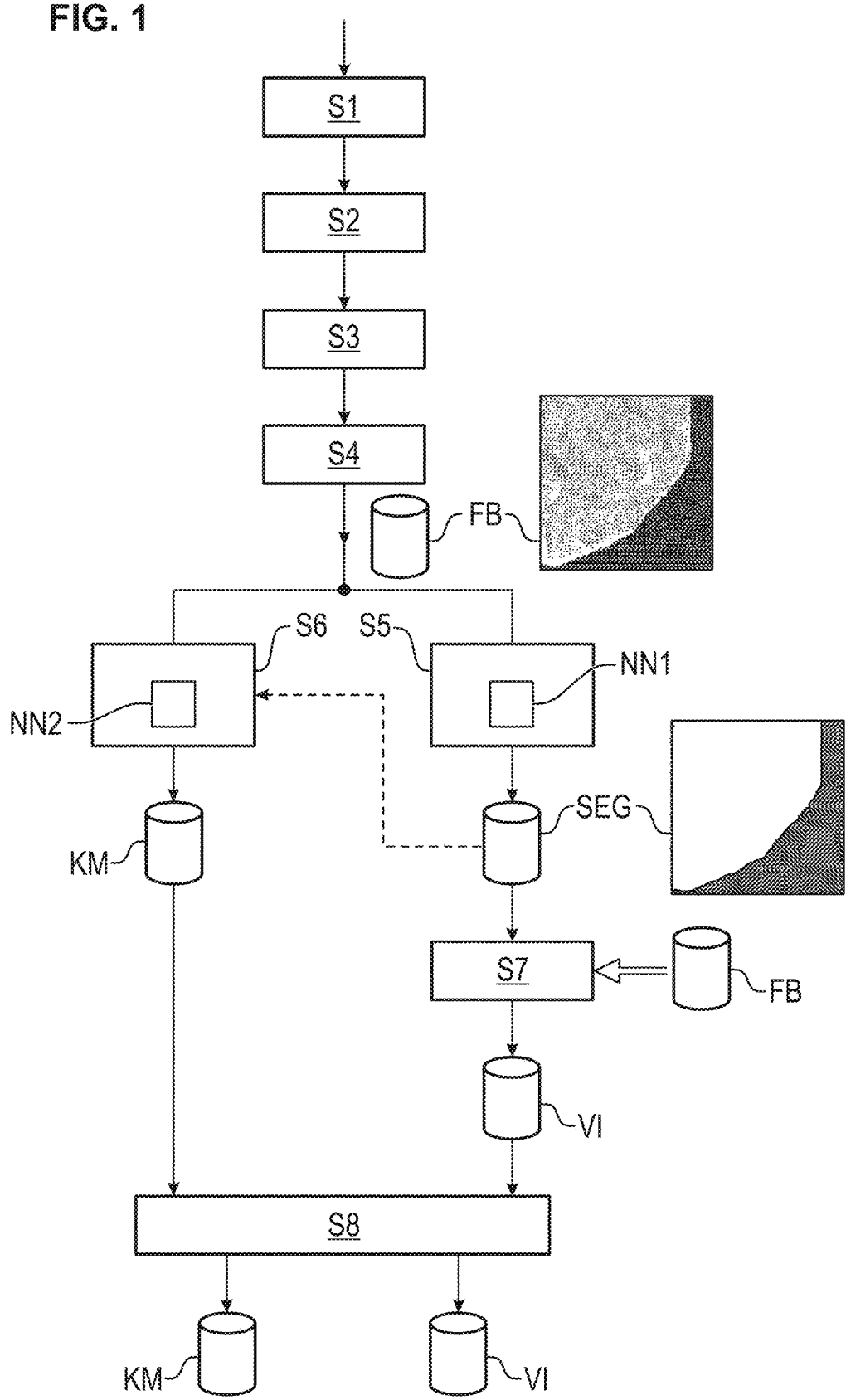
FIG. 1 shows steps of the method according to the invention as per a first embodiment.

FIG. 1 shows steps of the method according to the invention as per a preferred embodiment. In a first step S1, what takes place is provision of an organ section on a slide. In a second step S2, what takes place is incubation of the organ section with a liquid patient sample which potentially comprises primary antibodies. In a step S3, what takes place is incubation of the organ section with secondary antibodies which have been labelled with a fluorescent dye. In a step S4, what takes place is acquisition of a fluorescence image FB of the organ section in a color channel corresponding to the fluorescent dye. This involves especially irradiation of the slide with excitation radiation. What then takes place in a step S5 is determination, by segmentation of the fluorescence image FB by means of a first neural network NN1, of a sub-area of the fluorescence image FB that is relevant to formation of at least one fluorescence pattern type. Segmentation information SEG is obtained as a result. Said segmentation information SEG indicates the particular sub-area of the fluorescence image.

In the preferred example of the organ section being an organ section of a kidney of a rat, the sub-area of the fluorescence image is that area occupied by the organ section on the fluorescence image, as depicted in FIG. 1 by way of example and also depicted in FIG. 11B as an example of a sub-area TF1 or segmentation information SEG for the example of the first fluorescence image FB1 from FIG. 11A.

Figure 13:
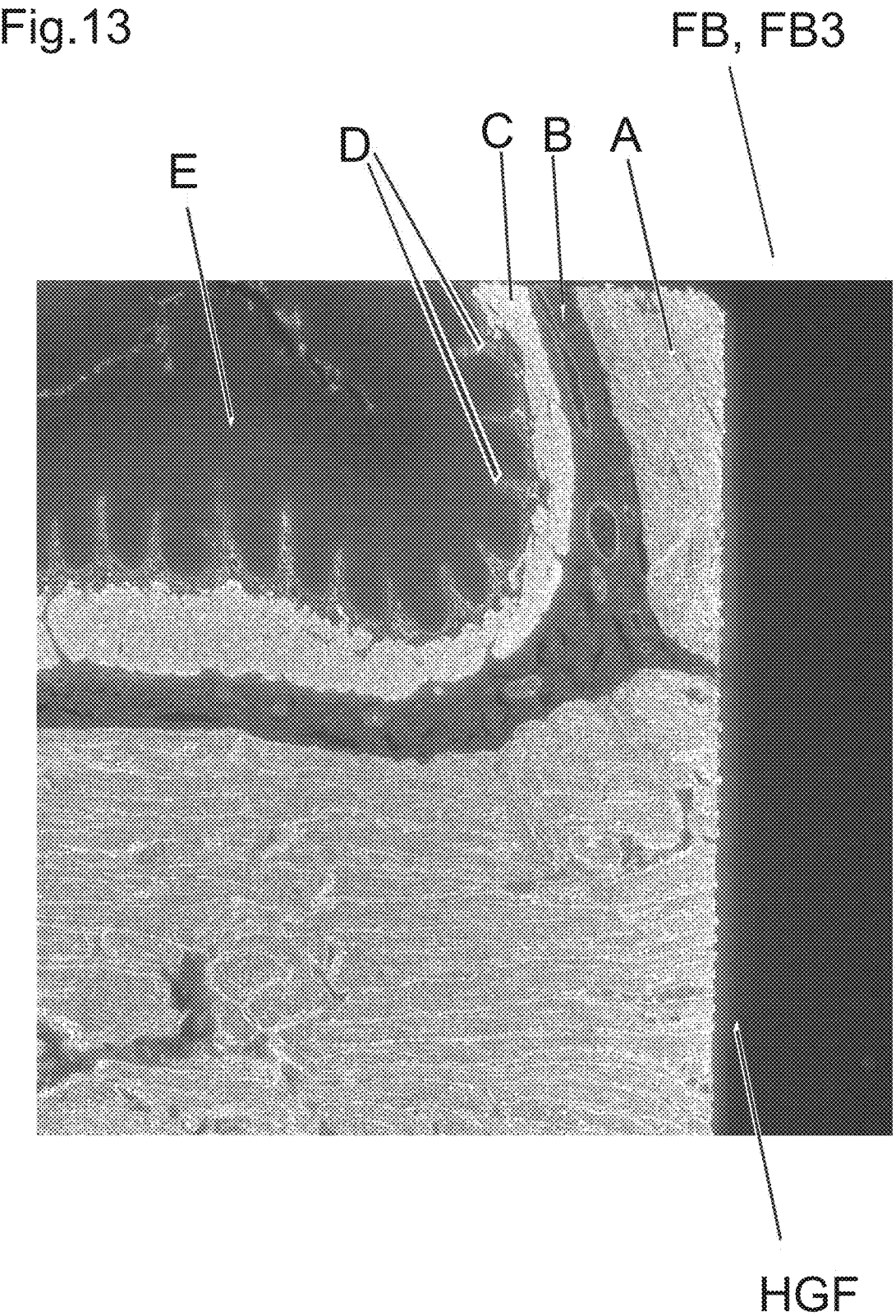
FIG. 13 shows a third fluorescence image.

In the preferred example of the organ section being an organ section of an esophagus of a simian, as depicted in the third fluorescence image FB3 from FIG. 13, the sub-area of the fluorescence image is a sub-area of the organ section that is depicted as a white region as sub-area TF3 or segmentation information SEGA for the third fluorescence image FB3 in FIG. 15D. Here, the sub-area of the fluorescence image is thus a subdivision area of the organ section or a certain partial surface area of the organ section.

In a step S6 from FIG. 1, a measure of confidence or multiple measures of confidence KM that indicate(s) an actual presence of the fluorescence pattern type or actual presences of the fluorescence pattern types is/are determined on the basis of the fluorescence image FB by means of a second neural network NN2.

For the example of a rat kidney, presences of the different fluorescence pattern types LKM and AMA can be detected and respective corresponding measures of confidence can be determined. Said measures of confidence are then given as measure-of-confidence information KM in FIG. 1.

In a step S7, validity information VI that indicates a degree of a validity of the measure of confidence or measures of confidence KM is determined on the basis of the previously determined sub-area or the previously determined segmentation information. In a step S8, the measure of confidence or measures of confidence KM and the validity information VI is output.

Preferably, the method is thus designed for detection of respective potential presences of respective fluorescence pattern types on an organ section by means of immunofluorescence microscopy and digital image processing. Said fluorescence pattern types are preferably an LKM pattern and an AMA pattern for an organ section in the form of a rat kidney. What thus preferably takes place here is determination, by segmentation of the fluorescence image FB1 by means of a first neural network NN1, of a sub-area TF1 of the fluorescence image FB1 that is potentially relevant to formation of the fluorescence pattern types. Furthermore, what preferably takes place is determination, on the basis of the fluorescence image FB1 by means of a second neural network NN2, of respective measures of confidence KM that indicate respective actual presences of the respective fluorescence pattern types. What preferably takes place is determination, on the basis of the previously determined sub-area TF1, of validity information VI that indicates a degree of a validity of the measures of confidence KM. What preferably takes place is output of at least a subset of the respective measures of confidence KM of the respective actual presences of the respective fluorescence pattern types and of the validity information VI.

In the exemplary embodiment from FIG. 1, what preferably takes place is the determination of the measure of confidence or measures of confidence KM only on the basis of the fluorescence image FB. For the example of the fluorescence image FB1 from FIG. 6, what was processed in the case of detection results explained below was the entire fluorescence image FB1 by the neural network NN2 in order to determine the measures of confidence. Preferably, as depicted by a dashed arrow in FIG. 1, the segmented fluorescence image or the segmentation information SEG can likewise enter the neural network NN2 in step S6 in addition to the fluorescence image FB and the neural network NN2 can thus determine the measure of confidence or measures of confidence on the basis of the fluorescence image FB and the previously determined sub-area TF1 or the segmentation information SEG. The neural network NN2 can then thus take into greater account the image information of the sub-fluorescence image corresponding to the detected sub-area TF1. As a result, what can then be preferably achieved is that image information and artefacts in the so-called background image region outside the relevant organ section are not taken into account by the second neural network NN2. In relation to this, FIG. 8 shows exemplary artefacts AF in the background region HG of the second fluorescence image FB2.

Figure 2:
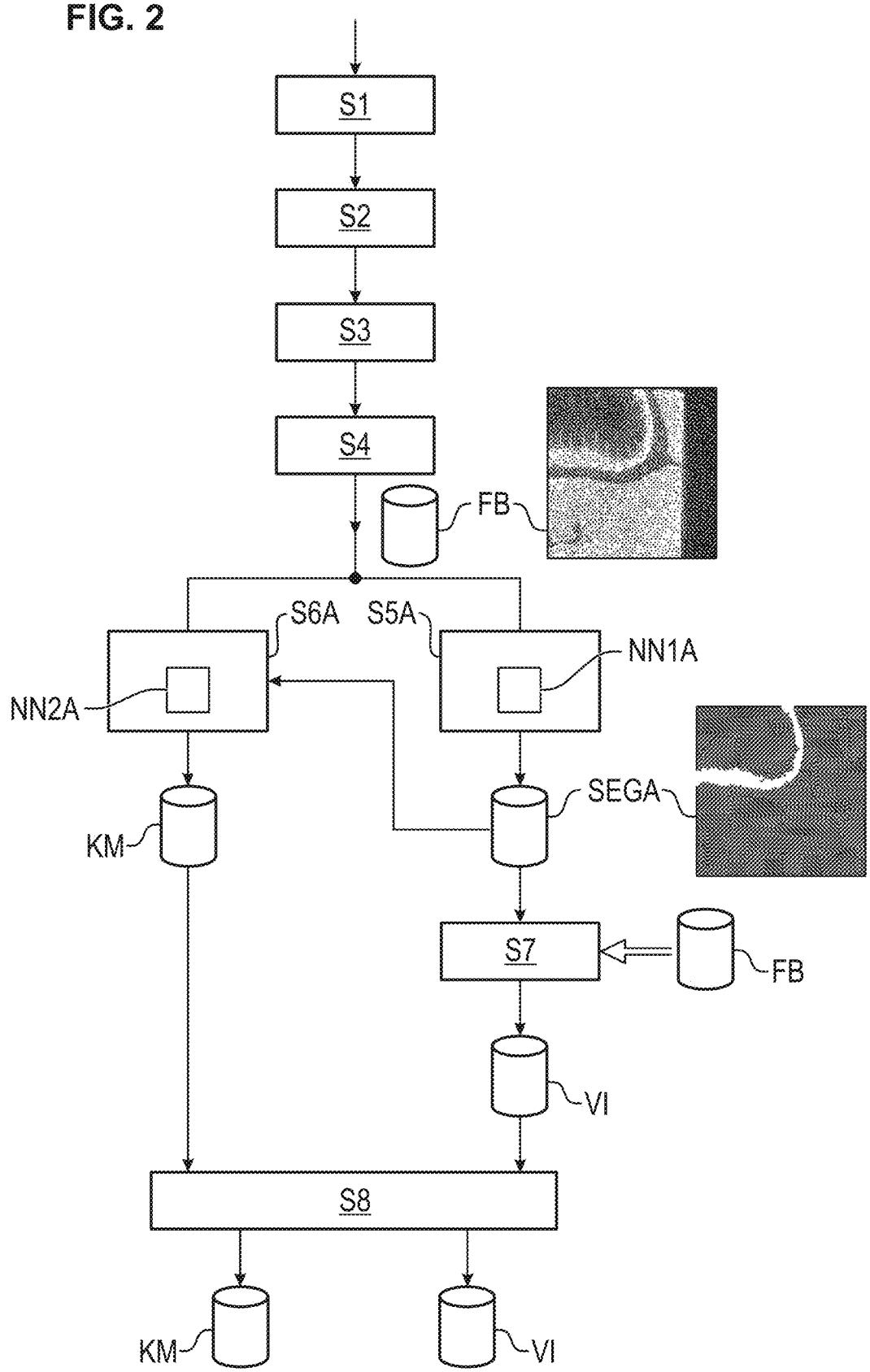
FIG. 2 shows steps of the method according to the invention as per a second embodiment.

FIG. 2 shows a preferred embodiment of the method according to the invention. The embodiment of the method according to the invention in FIG. 2 can preferably be used for fluorescence images of organ sections of an esophagus of simians. Steps S1 to S4 correspond to steps S1 to S4 from FIG. 1.

Figure 12:
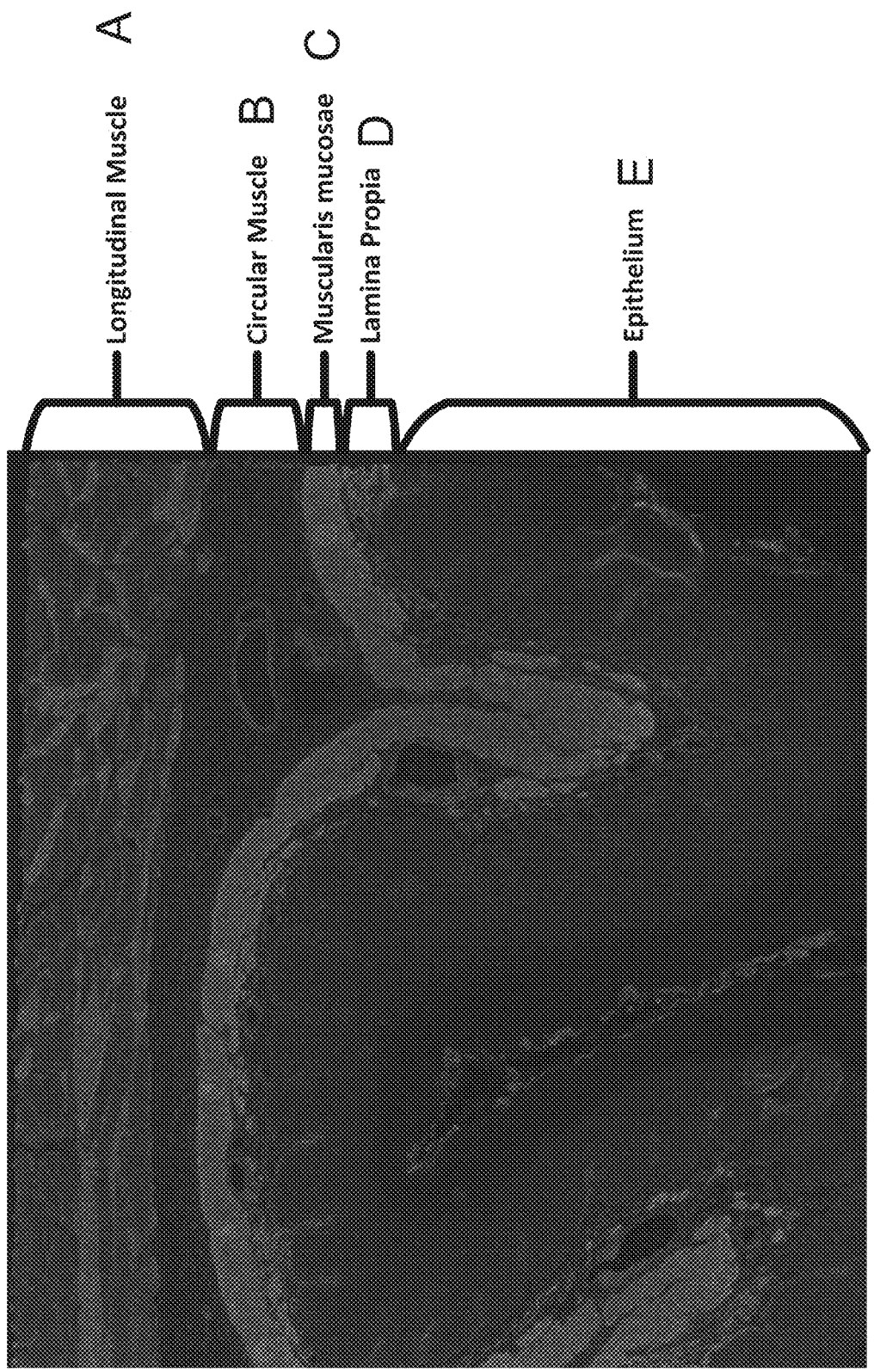
FIG. 12 shows a division of different layers of an organ section of an esophagus.

FIG. 12 elucidates the peculiarity in the task of determining a presence of a fluorescence pattern in the case of an organ section in the form of an esophagus organ section of a simian. Such an organ section of an esophagus comprises different sub-areas A, B, C, D, E of the organ section.

One sub-region or sub-area of the esophagus is the longitudinal musculae A. A further sub-region or further sub-area is the circula musculae B. A further sub-region or further sub-area is the muscularis mucosae C. A further sub-region or further sub-area is lamina propria D. A further sub-region or further sub-area is epithelium E.

FIG. 13 shows, for the fluorescence image FB3, such indication of relevant sub-regions or sub-areas A, B, C, D, E of the organ section and also a background region HGF of the fluorescence image FB3, in which no organ section is present.

In the case of the esophagus, the sub-area or the sub-region C, muscularis mucosae, is relevant to formation of the fluorescence pattern type Endomysium, whereas the other sub-areas or other sub-regions A, B, D, E are not relevant to the detection of the fluorescence pattern type Endomysium despite possible staining or fluorescences.

As shown in FIG. 2, what is first determined in a step S5A by a first neural network NN1A for the fluorescence image FB3—see FIG. 15A—is a sub-area or segmentation information SEG3, as depicted in FIG. 15B, with different sub-areas or segmentation levels A, B, C, D, E representing the relevant sub-areas of corresponding organ layers.

In a step S6A, what is then determined by means of a second neural network NN2A on the basis of the previously determined sub-area TF3 or the segmentation information SEGA—see FIG. 15D—and on the basis of the fluorescence image FB is a measure of confidence KM that indicates the presence of the fluorescence pattern type Endomysium.

By means of the sub-area TF3 or the segmentation information SEGA, the second neural network NN2A can then take a relevant fluorescence image region FB33, depicted in FIG. 15C, into greater account for detecting the presence of the fluorescence pattern type Endomysium and determining a corresponding measure of confidence. The neural network NN2A can then thus process to a greater extent the image information of the sub-fluorescence image corresponding to the detected sub-area TF3. As a result, what can then be preferably achieved is that image information in non-relevant image regions outside the relevant organ segment, muscularis mucosae, is not taken into account by the second neural network NN2A.

Figure 14A:
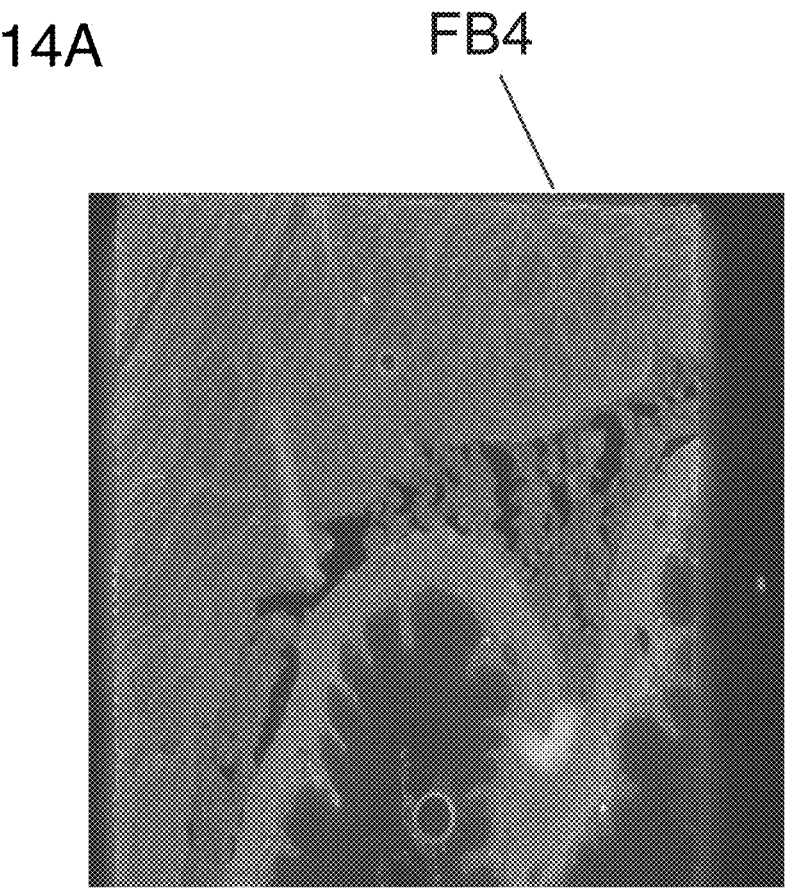
FIGS. 14A and 14B show further fluorescence images.

FIG. 14A shows a further fluorescence image FB4 as a fourth fluorescence image which, in the region muscularis mucosae, has only weak staining or a weak Endomysium pattern.

Figure 14B:
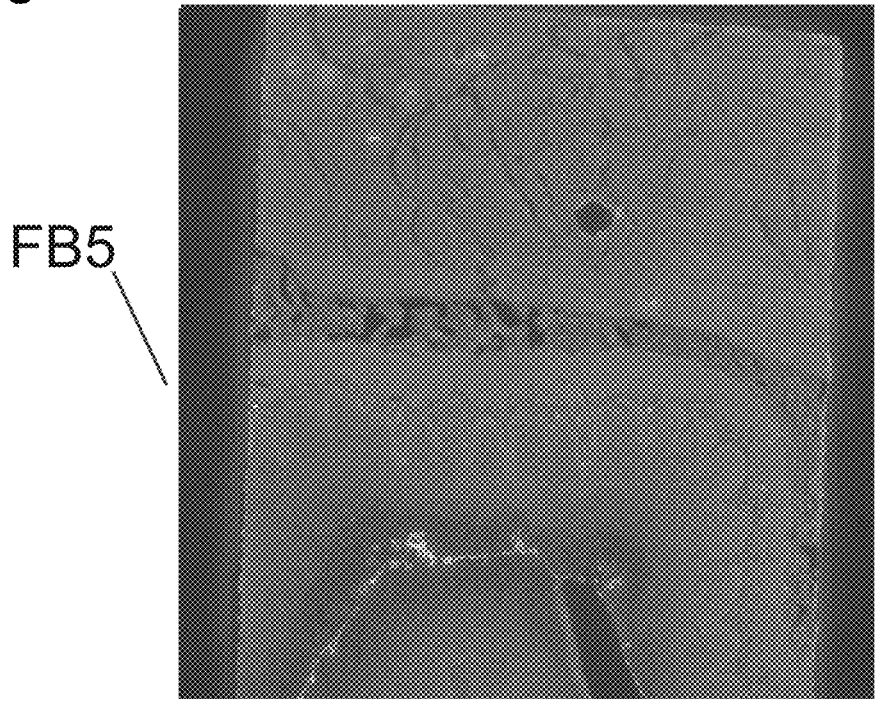
Figure 16A:
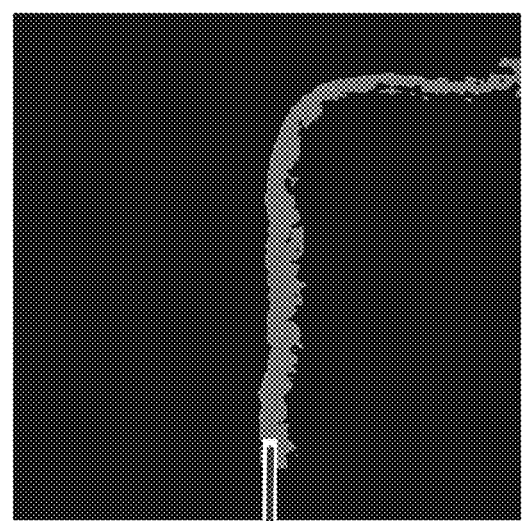
FIGS. 16A-16D show corresponding images or corresponding areas in an analogous manner to FIGS. 15A-15D based on a fourth fluorescence image.
Figure 16B:
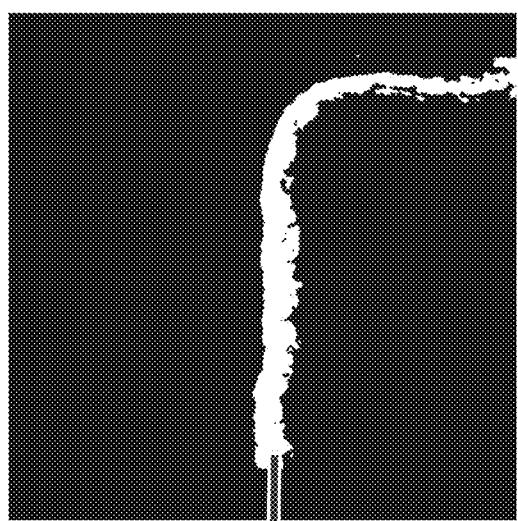
Figure 16C:
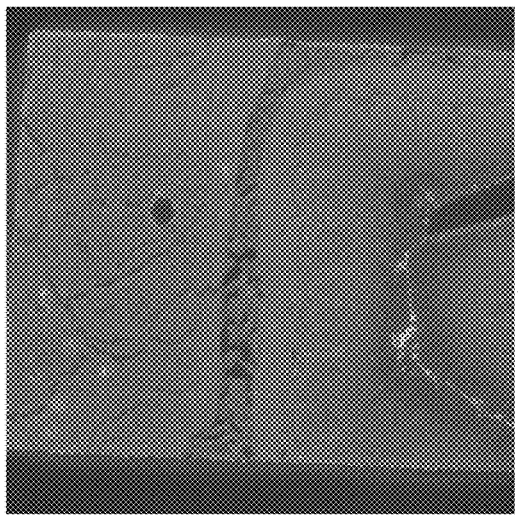
Figure 16D:
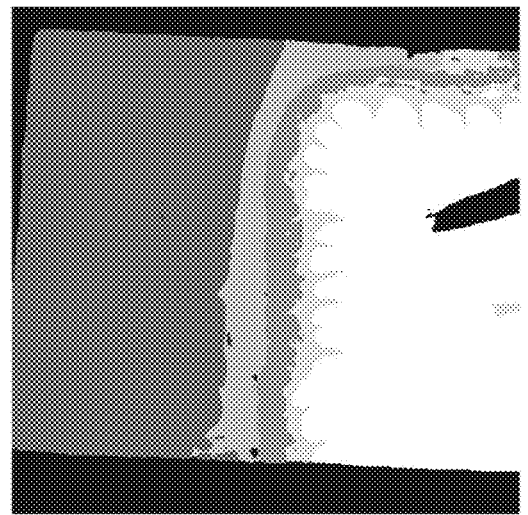

FIG. 14B shows a fifth fluorescence image FB5 of an organ section of an esophagus, there being no staining of the region muscularis mucosae due to the Endomysium pattern in said fluorescence image FB5. Said fifth fluorescence image FB5 is depicted again in FIG. 16A. In relation to this, FIG. 16B shows a segmentation result SEG5 due to segmentation of the fluorescence image FB5 by means of the first neural network. In relation to this, FIG. 16D shows the segmentation information SEGA then ascertained, which indicates the sub-area TF5 as a white region. In relation to this, FIG. 16C shows, in grey shading, the image region FB55 to be used by the second neural network.

The performance of the proposed method becomes clear through a simultaneous look at the fluorescence image region FB55 in the event of a so-called negative case compared to the fluorescence image region FB33 from FIG. 15C in a positive case, since the fluorescence image region FB33 is stained distinctly more brightly than the fluorescence image region FB55.

Figure 11F:
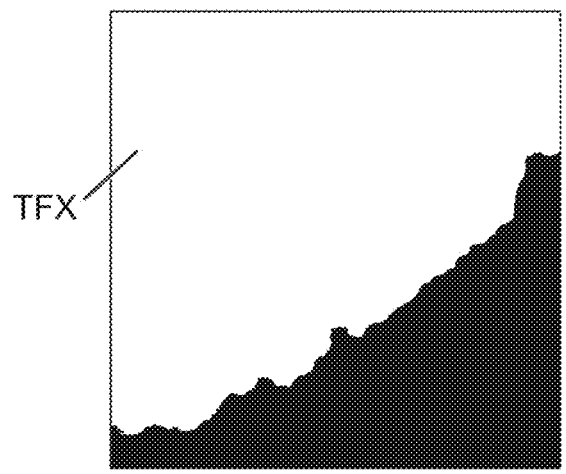

FIG. 11E shows, in a fluorescence image FBX, a section of a rat kidney for a negative case. Here too, a sub-area TFX relevant to formation of fluorescence pattern types, which is depicted in FIG. 11F, can be reliably detected.

Figure 3:
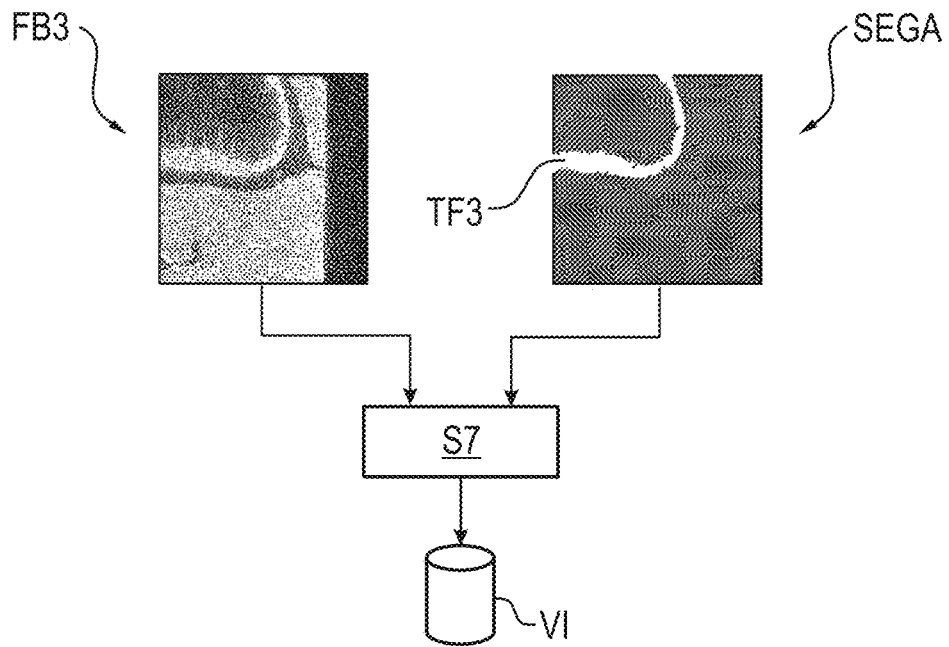
FIG. 3 shows a step for ascertaining validity information.

FIG. 3 shows a preferred embodiment of step S7, in which the validity information VI is determined. Here, this is depicted for the example of a fluorescent image FB3 of an esophagus as organ section. In step S7, the information entered are both the fluorescence image FB3 and the segmentation information SEGA indicating the sub-area TF3 potentially relevant to formation of a fluorescence pattern.

In step S7, a proportion of a planar coverage of the fluorescence image FB3 due to the sub-area TF3 is then determined. This is especially a percentage coverage of the fluorescence image FB3 due to the sub-area TF3. By simple determination of the size of the total area of the fluorescence image FB3 and of the size of the sub-area TF3, said proportion of the planar coverage of the fluorescence image FB3 due to the sub-area TF3 can be determined, preferably as a percentage. If said proportion of the planar coverage of the fluorescence image due to the sub-area is above a provided, predetermined threshold value SWVI, it is decided that the planar representation of the fluorescence image due to the sub-area is sufficient. In this case, the symbolic value 1 is then preferably output as validity information VI. The symbolic value 1 preferably represents the statement "valid". If the proportion of the planar coverage of the fluorescence image due to the sub-area is below the specified, predetermined threshold value SWVI, a symbolic value 0 is then preferably output as validity information VI. The symbolic value 0 preferably represents the information "not valid". What can thus be output as validity information VI is a value "valid" or a value "not valid". The threshold value SWVI can preferably be the value of 20-25% for a percentage of a planar coverage for the example of a rat kidney. The threshold value SWVI can preferably be the value of 10% for a percentage of a planar coverage for the example of an esophagus of a simian.

Figure 4:
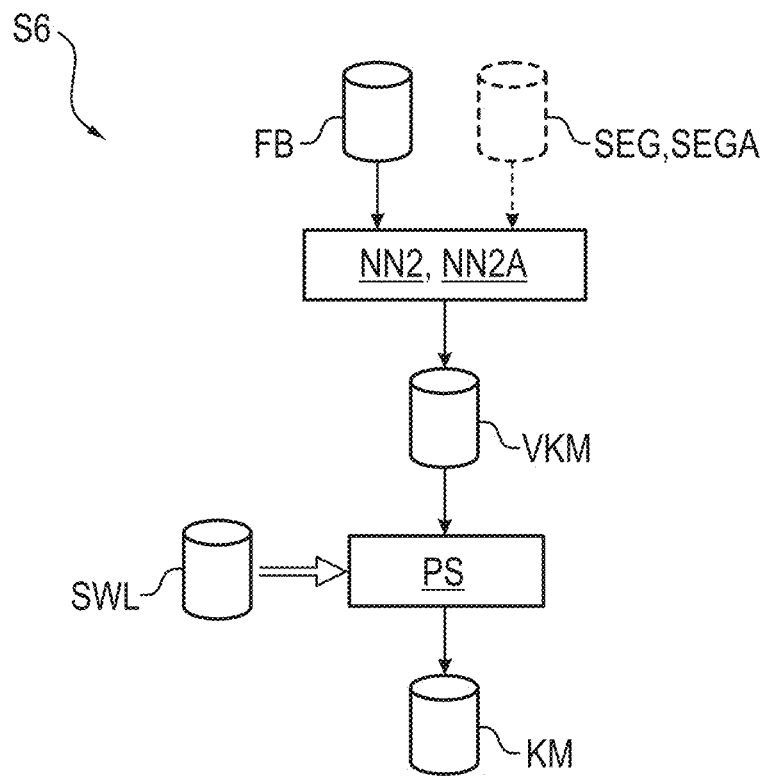
FIG. 4 shows preferred sub-steps for ascertaining one or more measures of confidence.

FIG. 4 shows details on determining one or more measures of confidence on the basis of the fluorescence image. A second neural network NN2, NN2A receives the fluorescence image FB and preferably additionally the segmented fluorescence image or the relevant corresponding segmentation information SEG, SEGA.

The second neural network NN2, NN2A then ascertains one or more provisional measures of confidence VKM.

Provisional measure-of-confidence information VKM can then be ascertained for, for example, three classes with index i=1 . . . 3 as:

$$\overrightarrow{VKM}=[VKM_1, VKM_2, VKM_3].$$

Here, a single entry, $VKM_i$, i=1 . . . 3, represents a measure of confidence for the relevant class with the index i. A first class is, for example, a class representing a presence of an LKM pattern and a second class is, for example, a class representing a presence of an AMA pattern. A third class is, for example, a class representing an absence of an LKM pattern and a simultaneous absence of an AMA pattern and is a so-called negative class.

The provisional measures of confidence, $VKM_i$, i=1 . . . 3, can be so-called "sigmoidal values," which are ascertained by the second neural network NN2, NN2A.

In a checking step PS, the measure(s) of confidence KM is/are then ascertained, preferably as:

$$\overrightarrow{KM}=[KM_1, KM_2, KM_3].$$

Here, a threshold value SWL can be specified as a predetermined threshold value. Said threshold value SWL can, for example, be 0.5 in value.

A measure of confidence, $KM_i$, i=1 . . . 3, is then ascertained on the basis of the preferred rule.

The measures of confidence thus ascertained, $\overrightarrow{KM}=[KM_1, KM_2, KM_3]$, are then preferably output. The checking step PS is preferably part of the neural network NN2, NN2A.

$$KM_i = \begin{cases} VKM_i & \text{if } VKM_i > SWL \\ \text{otherwise } 0 \end{cases}$$

Preferably, prior to output, a pattern presence in principle is then decided if one of the measures of confidence of the patterns, especially the patterns LKM and AMA, is greater than zero, $KM_i>0$, i=1 . . . 2, and then preferably in such a case of a positive pattern presence in principle, the measure of confidence for the case "negative" is automatically set to zero: $KM_3:=0$.

If the measure of confidence of the case "negative" is greater than zero, $$KM_3>0,$$

and if the two measures of confidence of the patterns for i=1,2 are equal to zero, $$KM_i=0, i=1 \ldots 2,$$

the decision made is "negative" and the measures of confidence are output. Preferably, only the measure of confidence for "negative", $KM_3$, is output.

If all measures of confidence are equal to zero, $$KM_i=0, i=1 \ldots 3,$$

a warning can preferably be output.

Figure 5:
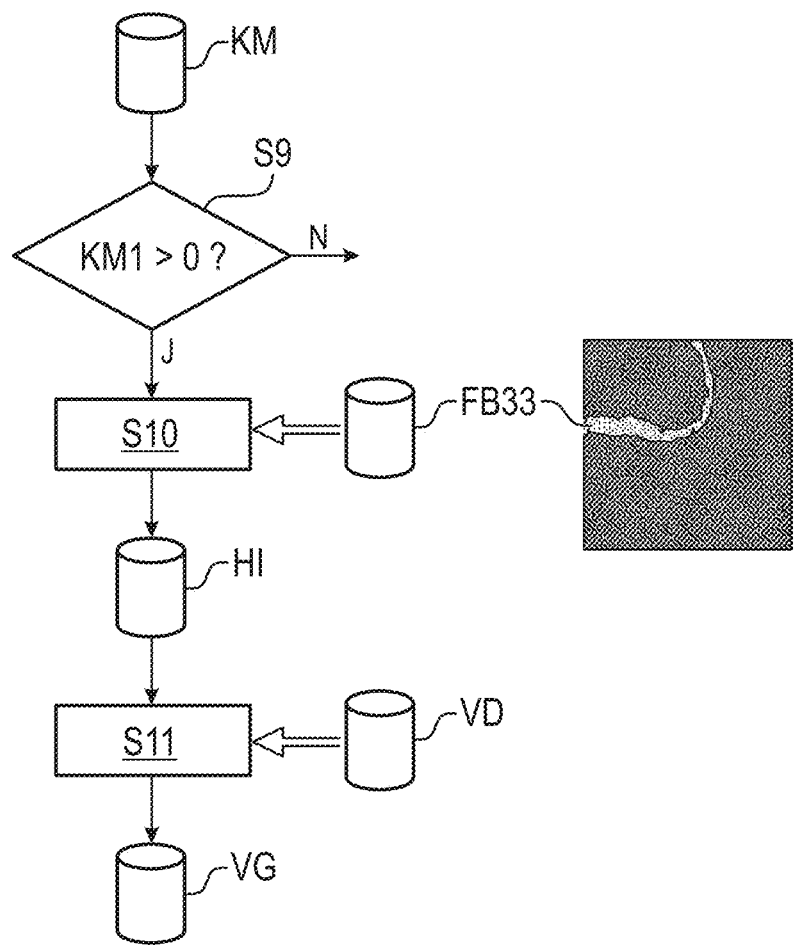
FIG. 5 shows preferred steps for ascertaining a maximum degree of dilution of a patient sample at which incubation of an organ section with the patient sample still leads to a presence of the fluorescence pattern type.

FIG. 5 preferentially shows steps for determining a degree of brightness of the previously determined and relevant sub-area in the fluorescence image.

If a fluorescence pattern type is determined as actually present or if a presence of a pattern is thus indicated by a measure of confidence KM, what is then ascertained is a degree of brightness of the sub-area of the fluorescence image that corresponds to the previously determined sub-area.

In a step S9, what is preferably first checked is whether the value is greater than 0.5 for a measure of confidence of a fluorescence pattern to be detected, for example the measure of confidence KM1 for the pattern with index i=1. If this is the case, a branch is made towards a step S10. In step S10, use is made of that sub-area FB33 which belongs to the corresponding fluorescence image FB3 and corresponds to the previously determined sub-area TF3 potentially relevant to formation of the fluorescence pattern type. What is then preferably carried out in step S10 is pixel statistics on this relevant fluorescence image region FB33. The 85% quartile of the brightness values is determined from the sub-image FB33. The brightness values can, for example, be quantized within the range from 0 to 255. This entire quantization range of the brightness values from 0 to 255 can then be subdivided equidistantly into five sub-value ranges. The first range then ranges from 0 to 51. The further ranges follow in corresponding equidistant steps, the uppermost fifth range ending at 255.

On the basis of the degree of brightness in the form of the 85% quartile, it is then possible to estimate a maximum degree of dilution of the patient sample at which incubation of the organ section with the patient sample still leads to a presence of a or the fluorescence pattern type. The information HI to be determined, as the 85% quartile, is then appropriately assigned in a step S11 to one of the sub-ranges or the five sub-ranges. The ascertained sub-range or the index of the ascertained sub-range determines an increment, proceeding from the present dilution of the patient sample for the generation of the fluorescence image, for defining a degree of dilution at which the patient sample would only just lead to a positive pattern or to a presence of the fluorescence pattern type. The degree of dilution VD of the sample from the incubation is thus provided as secondary information. In the case of a dilution or a degree of dilution VD of 1:10, it is then possible in the case of a series of 10-fold dilutions of the graduation 10, 32, 100, 320, 1000, 3200, 10 000, 32 000 to go further proceeding from the value of 10 on the basis of an ascertained increment, for example 2, and two steps, and a dilution of 100 can then be ascertained as a degree of dilution at which incubation of the organ section with the patient sample would only just lead to a presence of the fluorescence pattern type. This is then the ascertained degree of dilution VG. It can be output together with the other items of information, for example in a step S8; see FIG. 1 or FIG. 2.

Figure 26A:
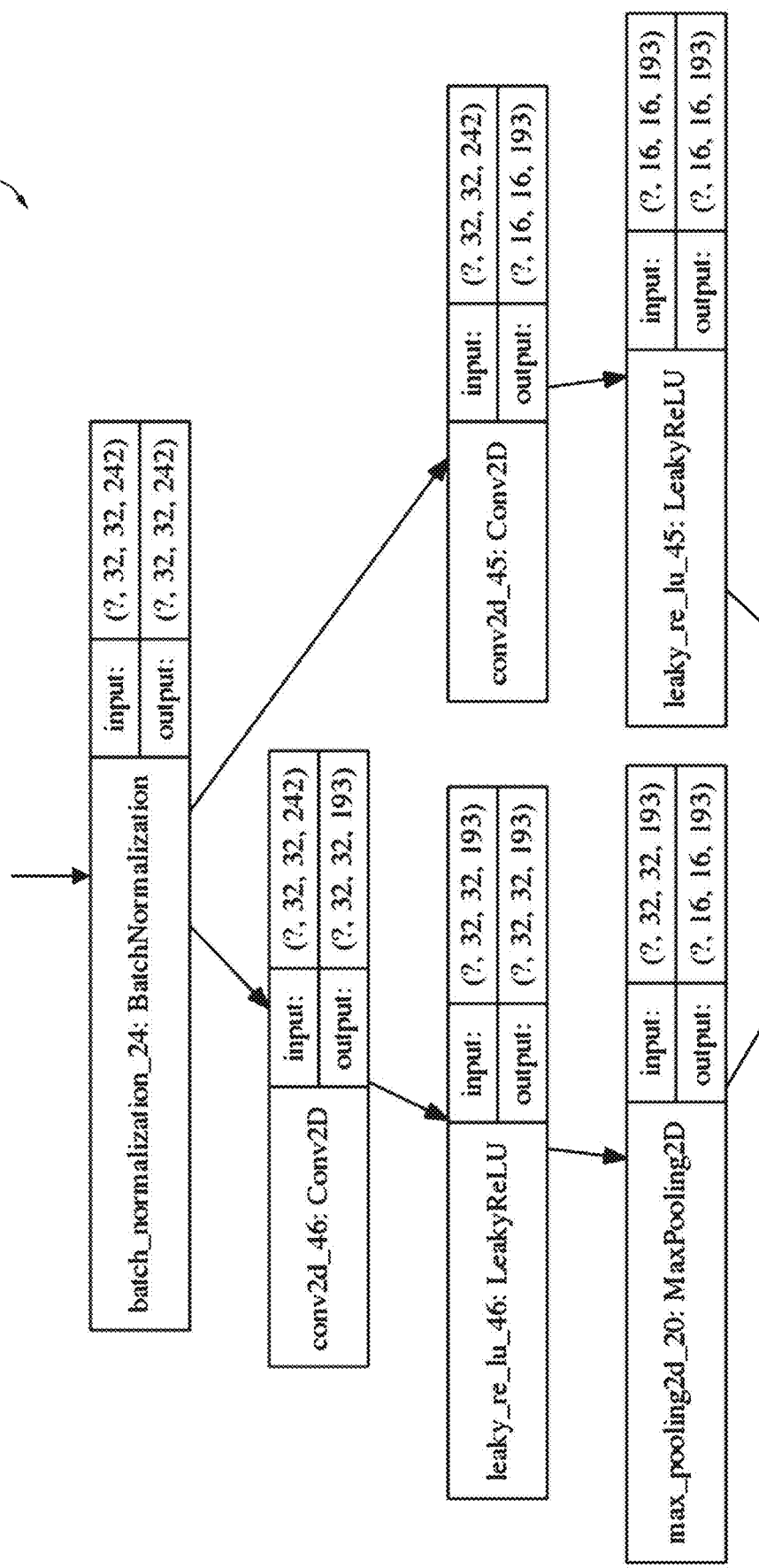
Figure 26C:
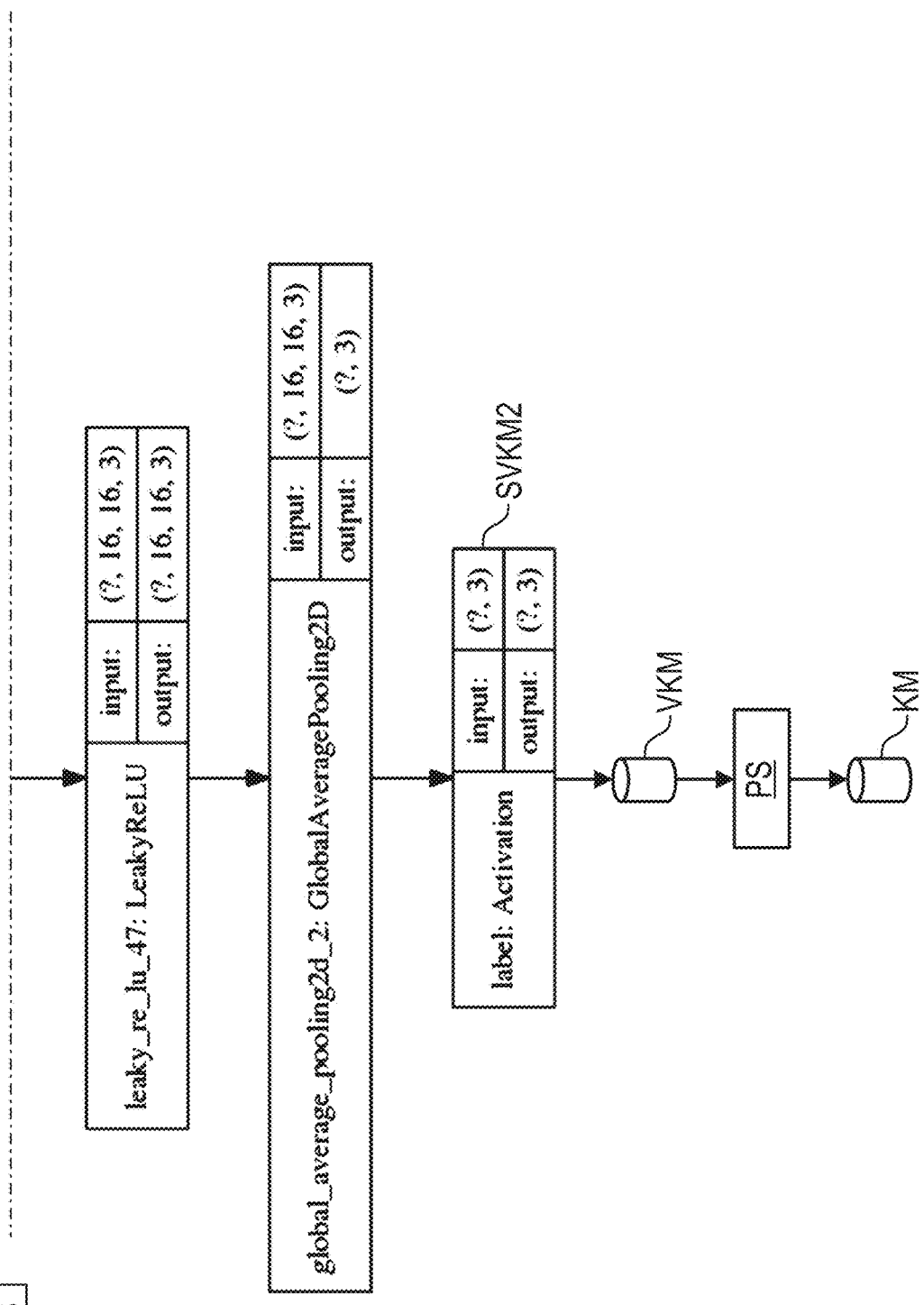
Figure 27A:
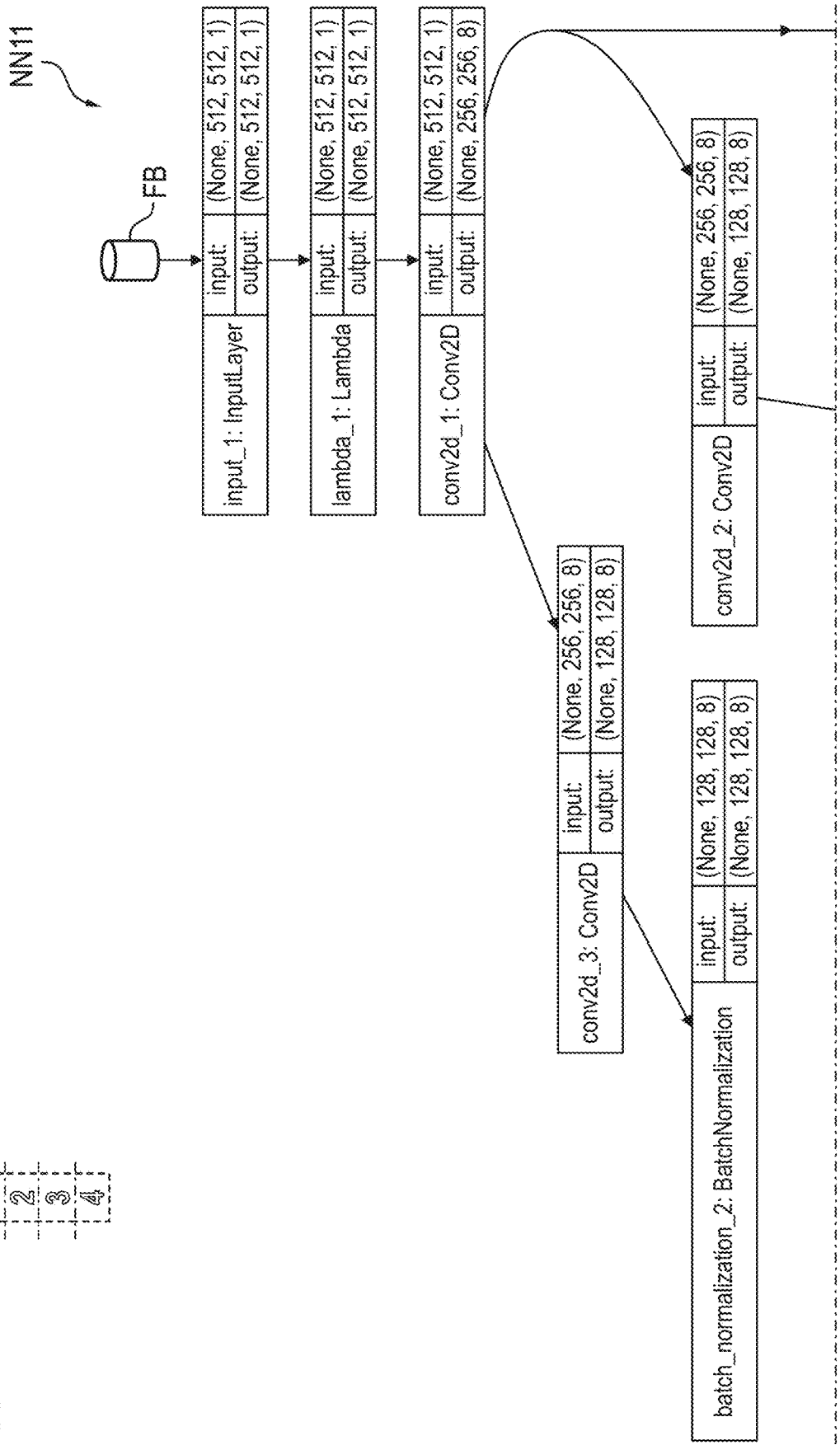
Figure 27B:
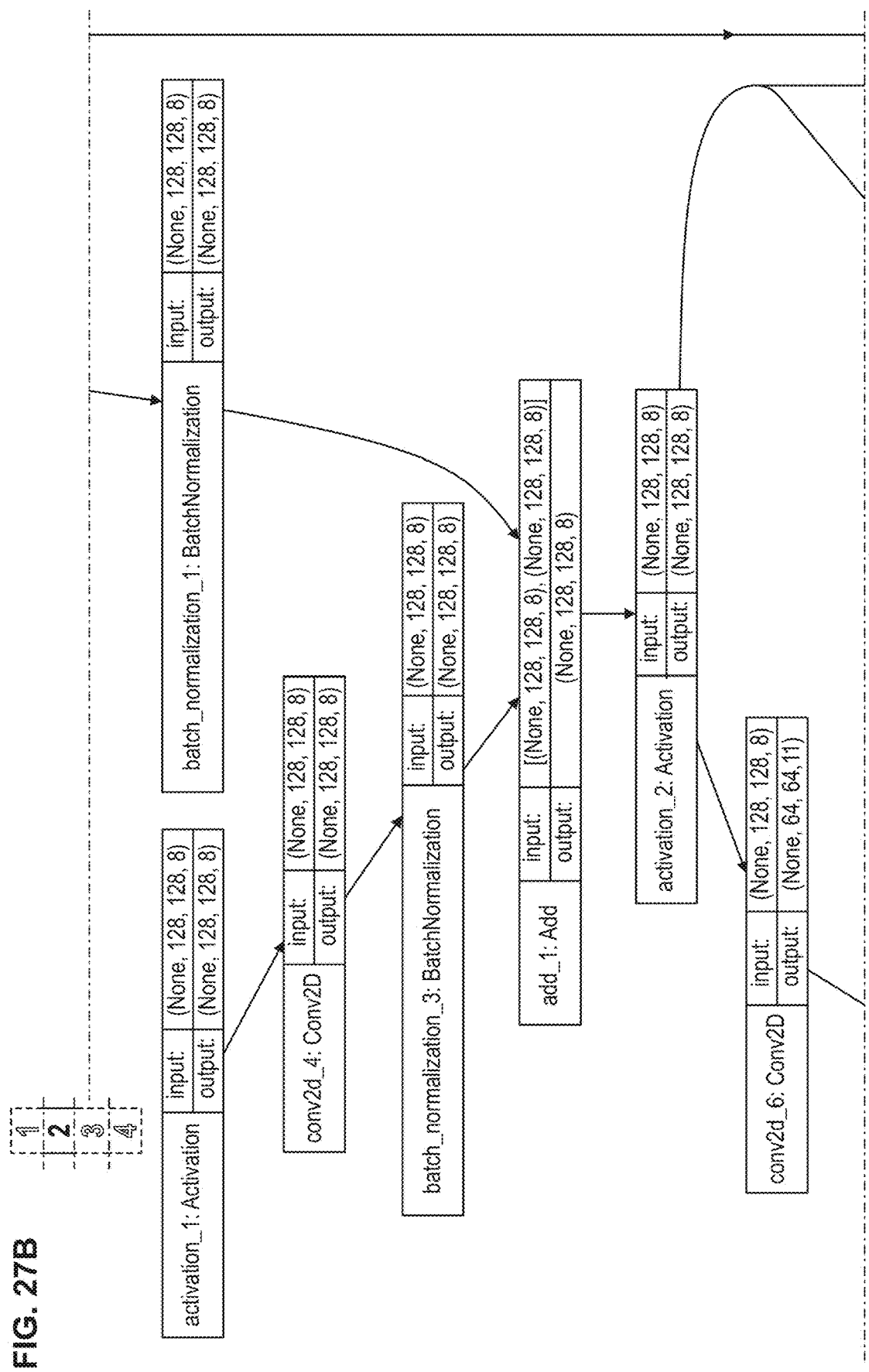
Figure 27C:
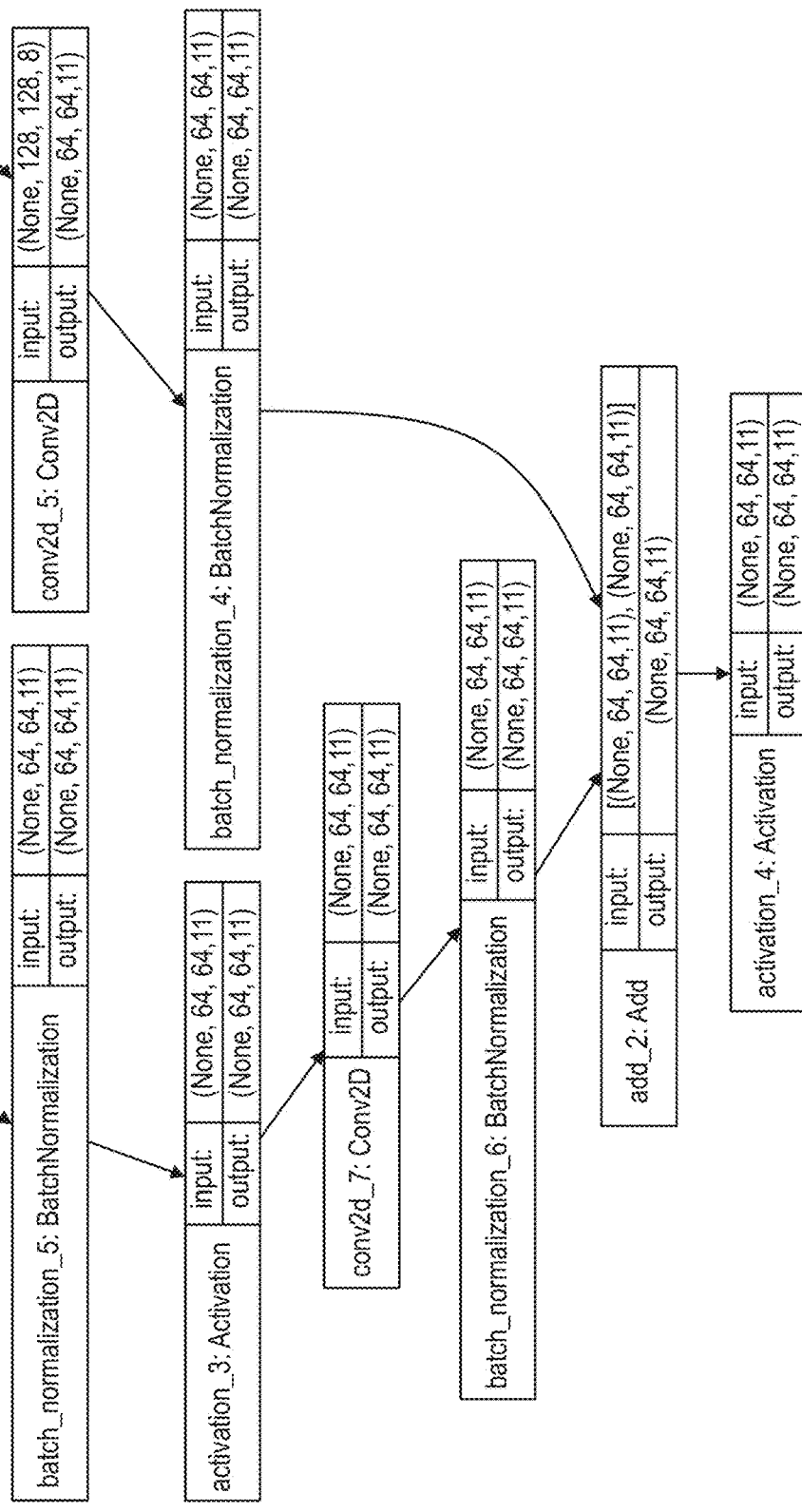
Figure 27D:
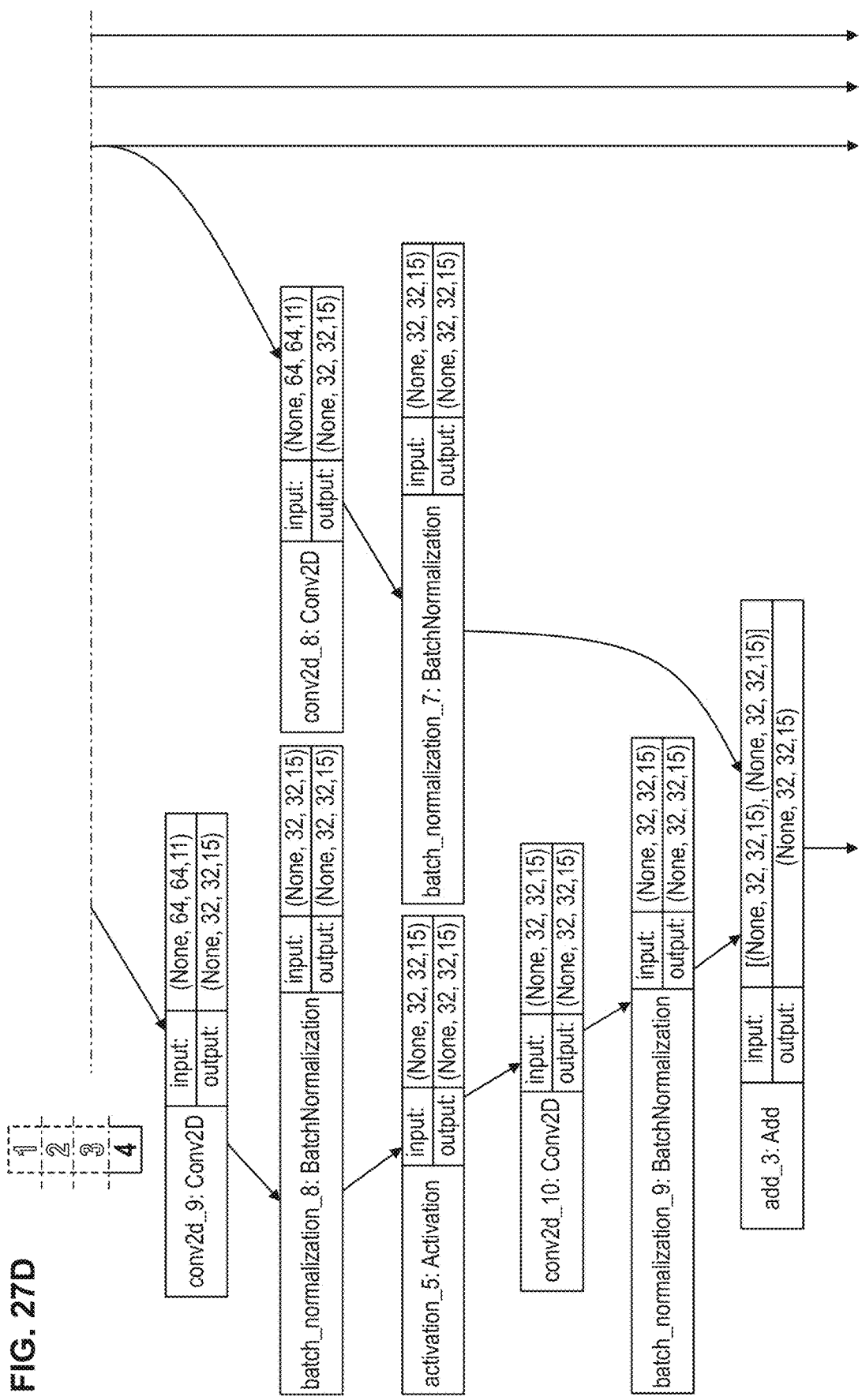

FIGS. 24, 25 and 26 show sub-elements NN21, NN22, NN23 which, considered together in a relevant sequence, form the second neural network NN2 from FIG. 1 for the example of the organ section as a rat kidney. The fluorescence image FB is received by the first part NN21 from FIG. 24, the fluorescence image FB preferably having been scaled beforehand to a dimensionality of 2048×2048.

The entire network NN2 is formed by a sequence of a plurality of steps or processing operations of the parts NN21, NN22, NN23, and different types of steps occur. For each processing step, the type of step is specified in detail here in the left-hand region of the relevant rectangle, so that a person skilled in the art can reproduce the processing. Furthermore, for each processing step, the dimensionality of the respective input variable and the respective output variable is respectively specified. It is thus specified in detail for each individual step how the processing should be appropriately carried out. Here, for each individual step, the dimensionality of the input variable can be gathered in the top row "Input" in the subsequent brackets via the second and the third entry. Furthermore, what can be gathered via the fourth entry is how many input variables are received in the step concerned. For example, 8 variables of dimensionality 2048×2048 are received in the step BSP. Here, in said step BSP, a two-dimensional convolution is carried out such that there are 12 output variables which each have a dimensionality of 1024×1024. This thus indicates that 12 convolution kernels are used in the course of the two-dimensional convolution and that furthermore the input variables are scaled down by a factor of 2 by means of a relevant striding.

For each processing step and the parameters respectively entered there, a person skilled in the art can thus clearly deduce how said processing step is to be configured.

In the third part NN23 from FIG. 26 of the neural network NN2, an output variable VKM having 3 scalar values is then generated in a step SVKM2, which output variable VKM represents the provisional measures of confidence VKM_i for the 3 classes, class index i, with i=1 for LKM pattern, i=2 for AMA pattern and i=3 for negative, as already described above. In a checking step PS as already described above, the measures of confidence KM are then ascertained.

Figure 28A:
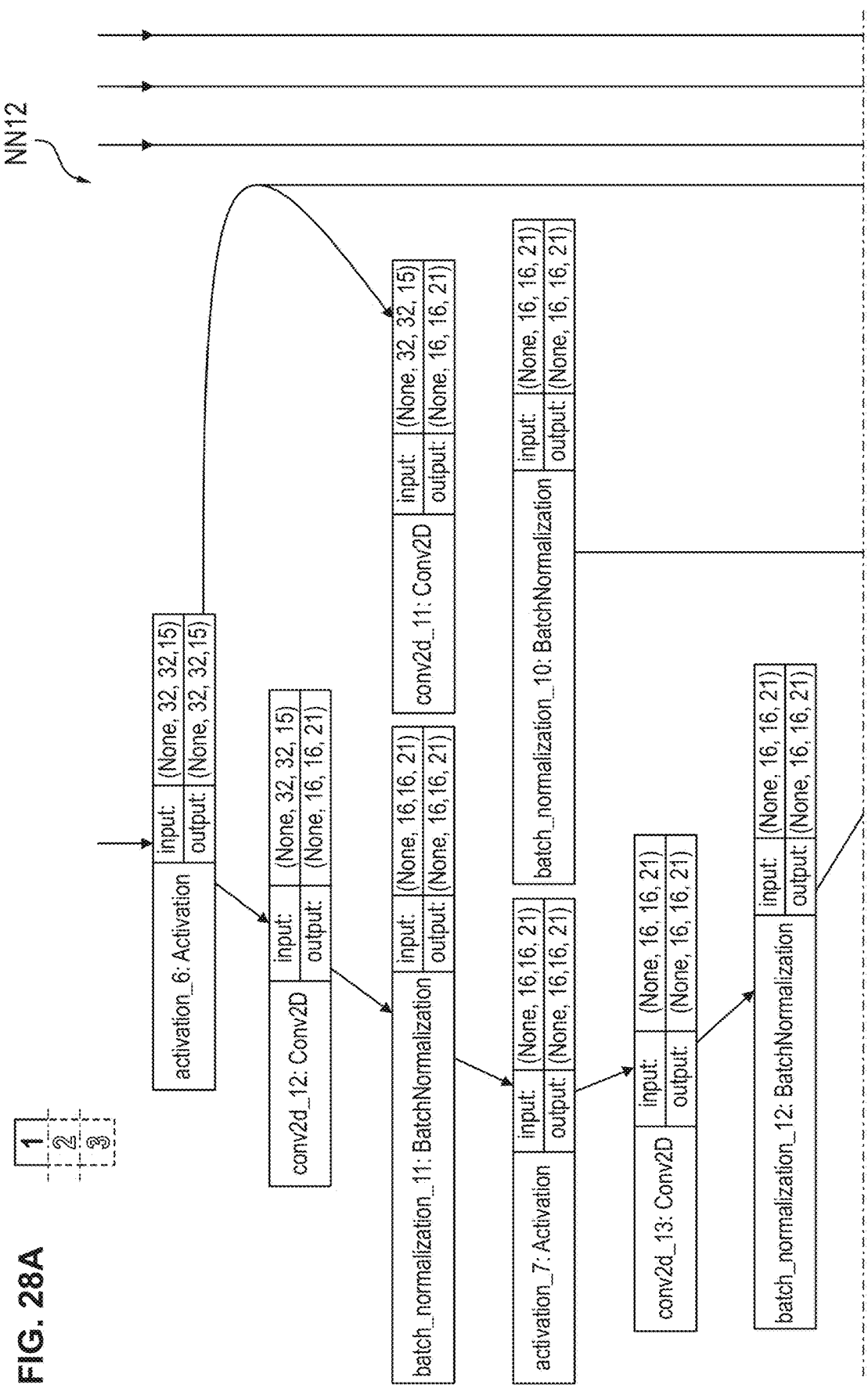
Figure 28B:
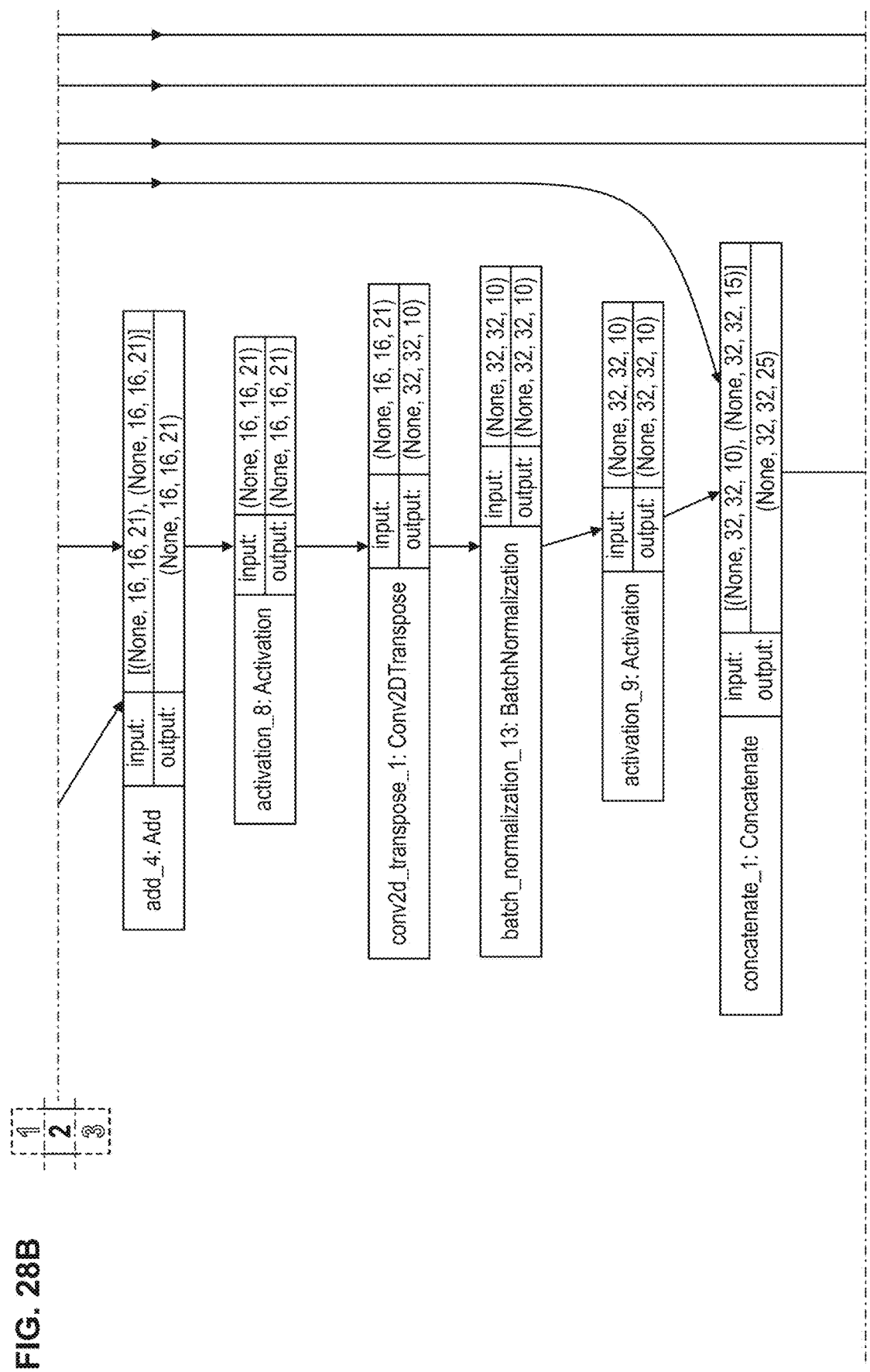
Figure 28C:
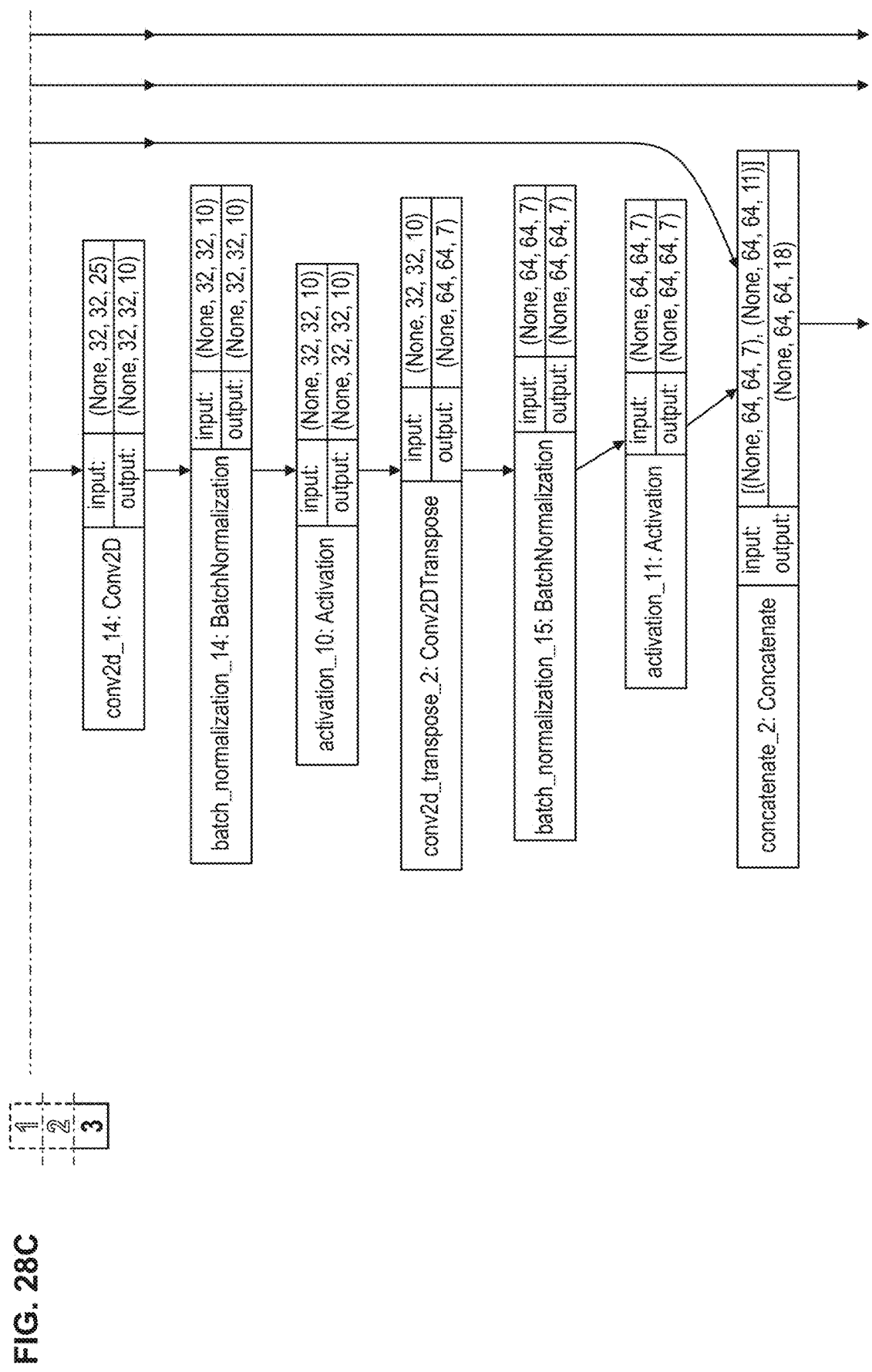
Figure 29A:
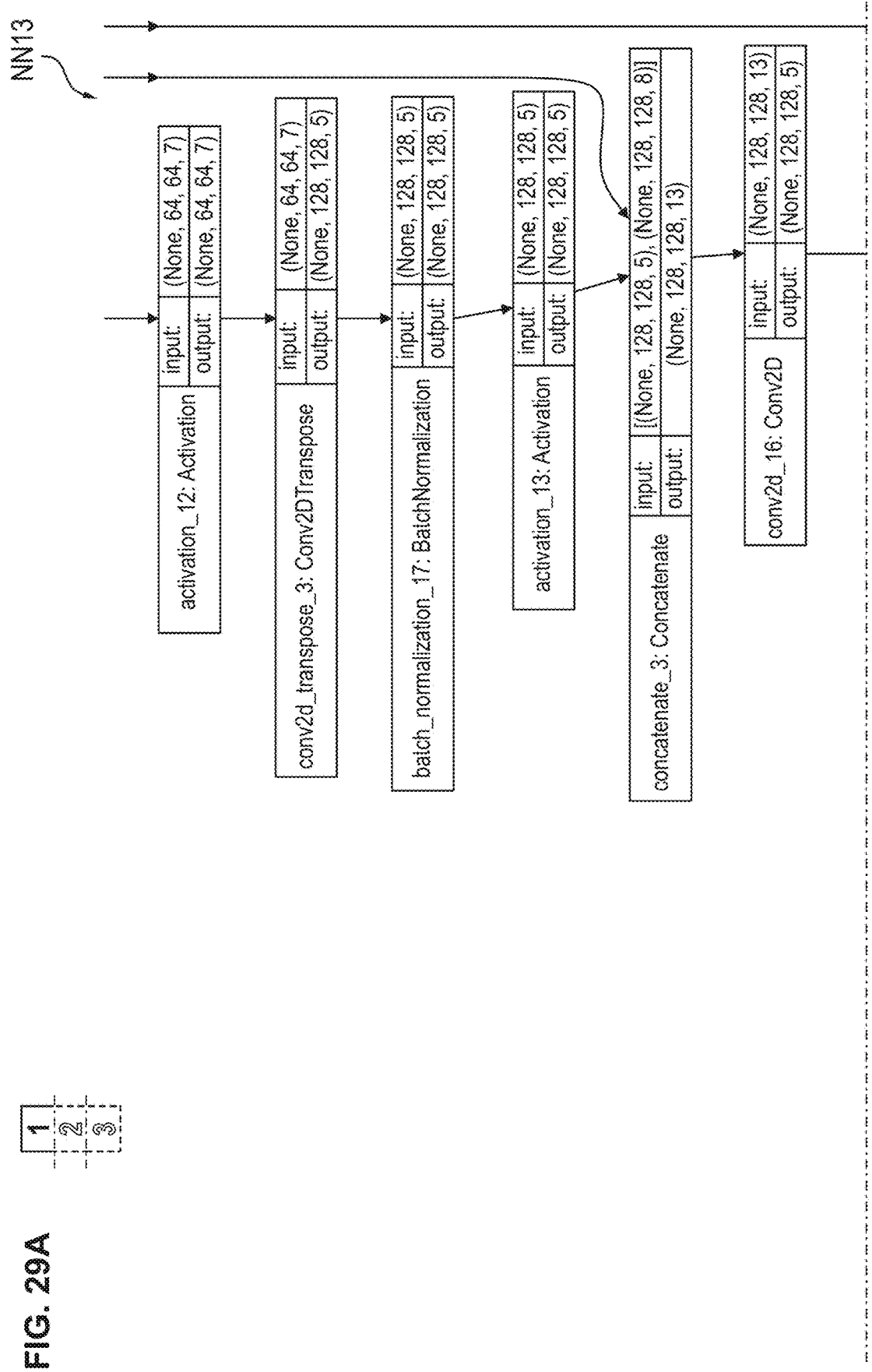
Figure 29B:
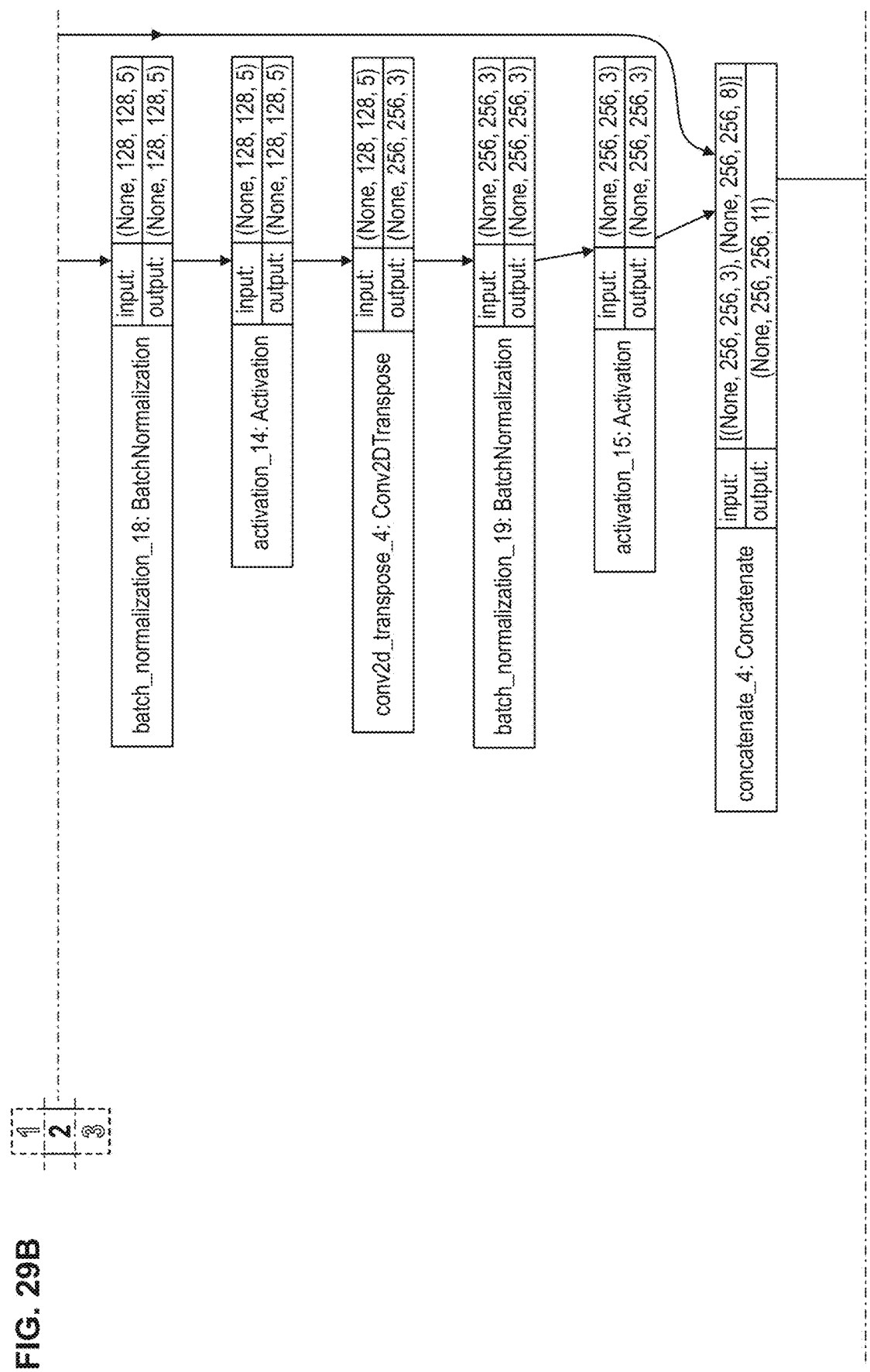
Figure 29C:
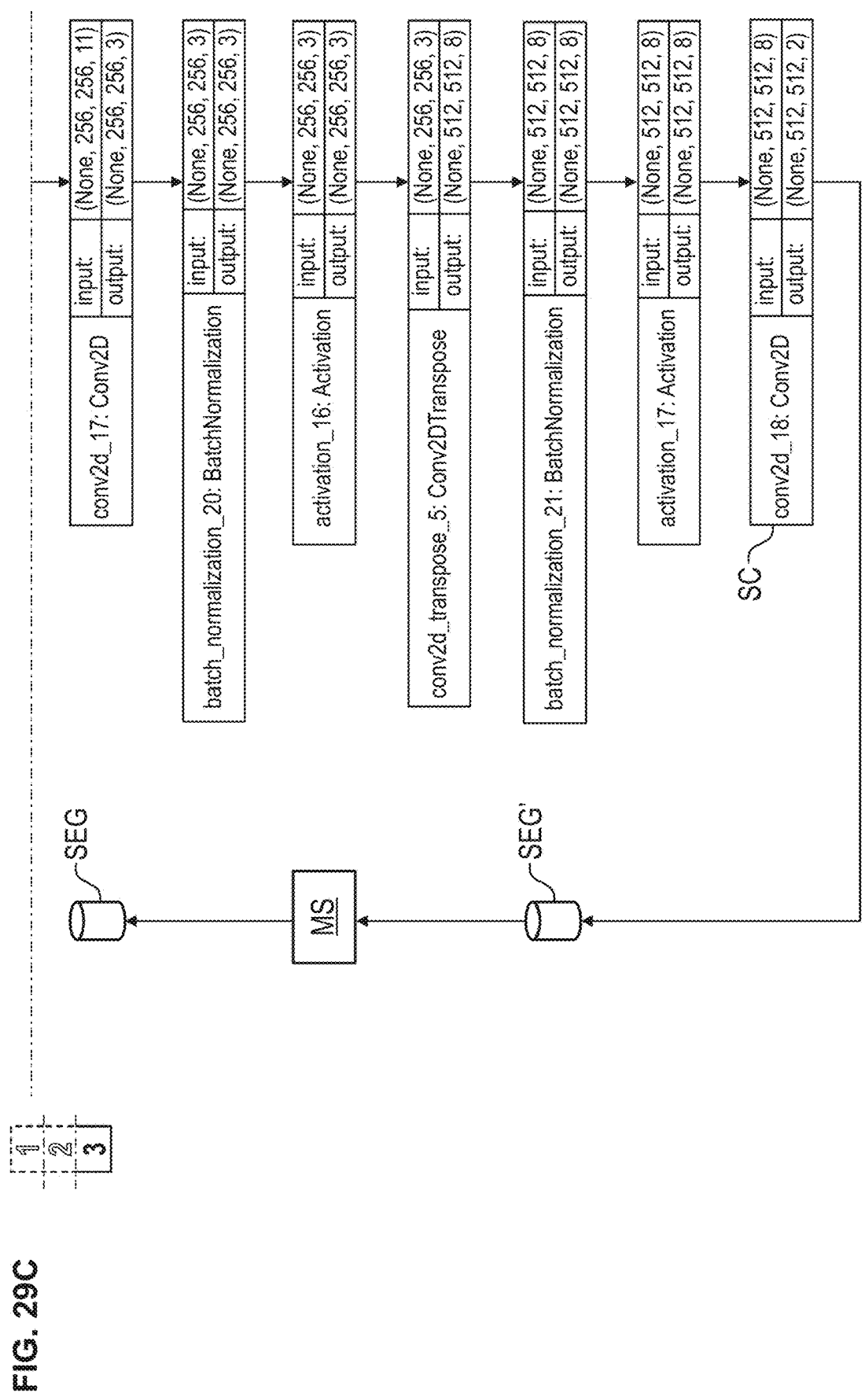

FIGS. 27, 28 and 29 show relevant sub-networks NN11, NN12, NN13 which, considered together, form the first neural network NN1 from FIG. 1 for the example of an organ section of a rat kidney. In the first part NN11, the fluorescence image FB is received, the fluorescence image FB preferably having been scaled down to a dimensionality of 512×512. For the sub-networks NN11, NN12 and NN13 depicted here, respective processing steps are also stated in detail.

In the third part NN13 from FIG. 29, segmentation information SEG' having 2 classes is then generated in a step SC. Here, for each relevant pixel of the fluorescence image FB of the dimensionality 512×512, the segmentation information SEG' of the dimensionality 512×512×2 respectively provides 2 values with index k=1,2, which respectively specify a measure of confidence with index k=1,2 of the relevant pixel belonging to one of the classes k=1 "Organ" and to the other class k=2 "Background". Through a maximum decision MS based on the two measure-of-confidence values with index k=1,2, a decision can then be made for a particular pixel as to the class to which the relevant pixel belongs, in order to generate segmentation information SEG.

Figure 30A:
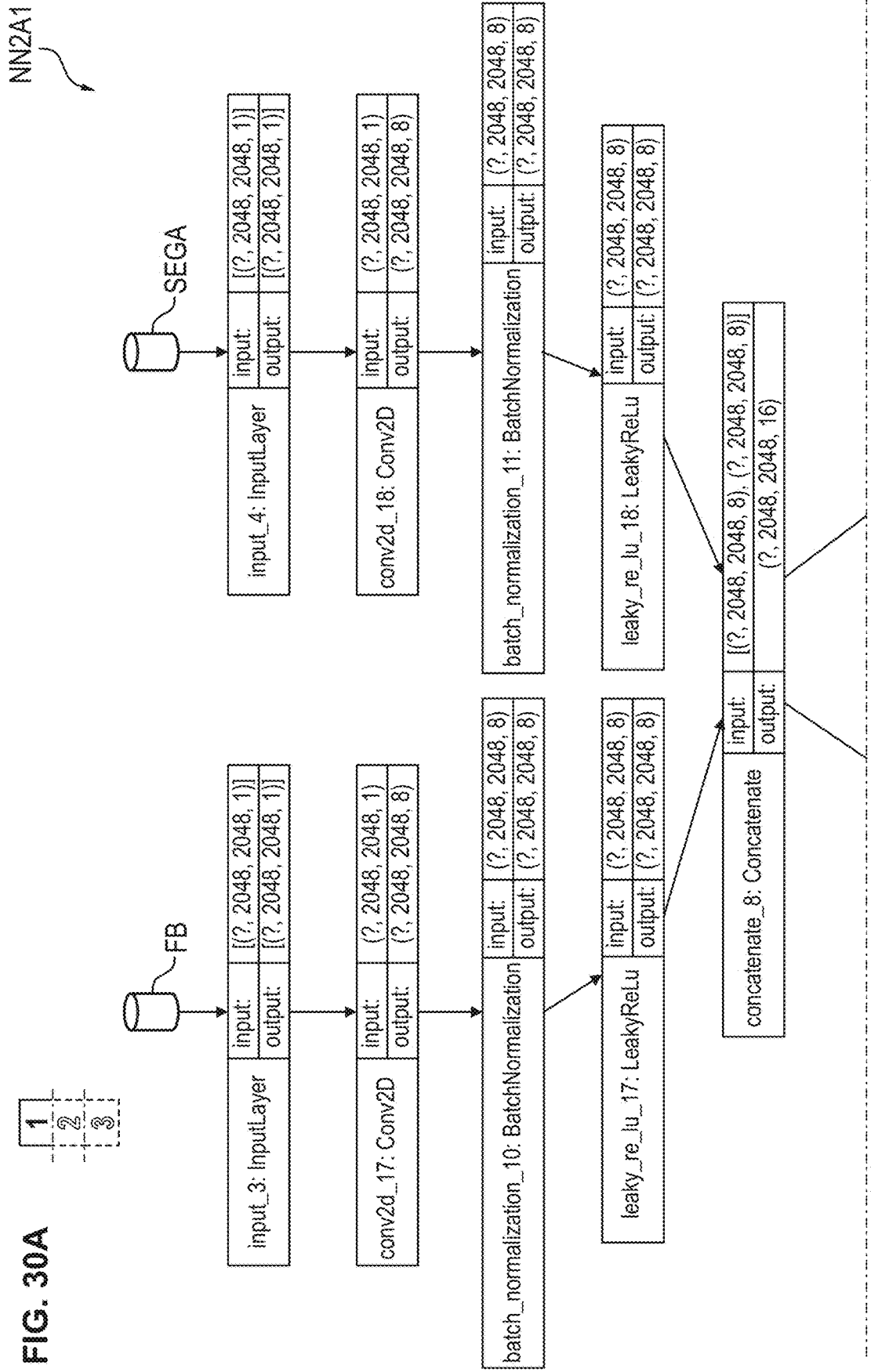
Figure 30B:
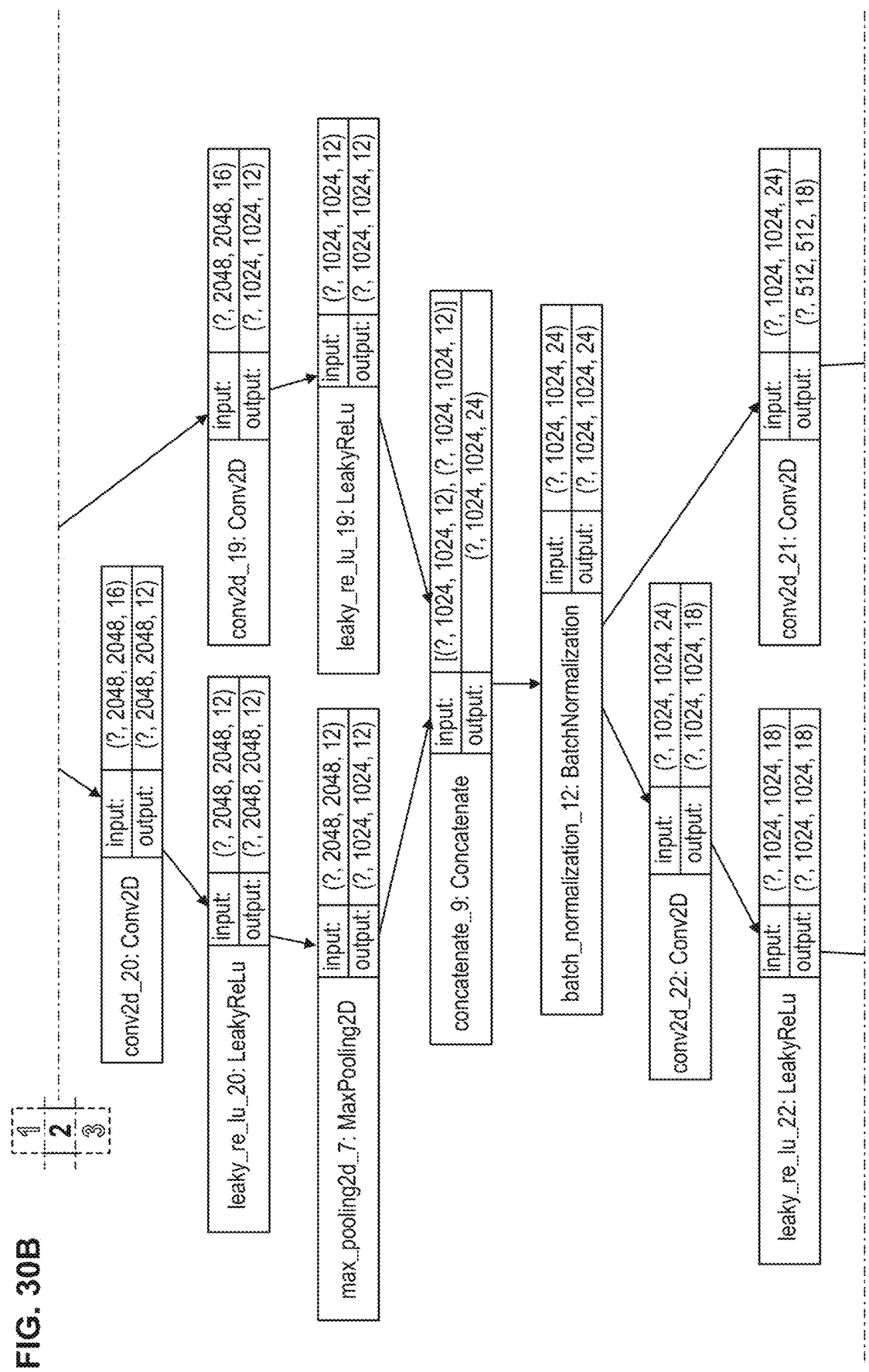
Figure 30C:
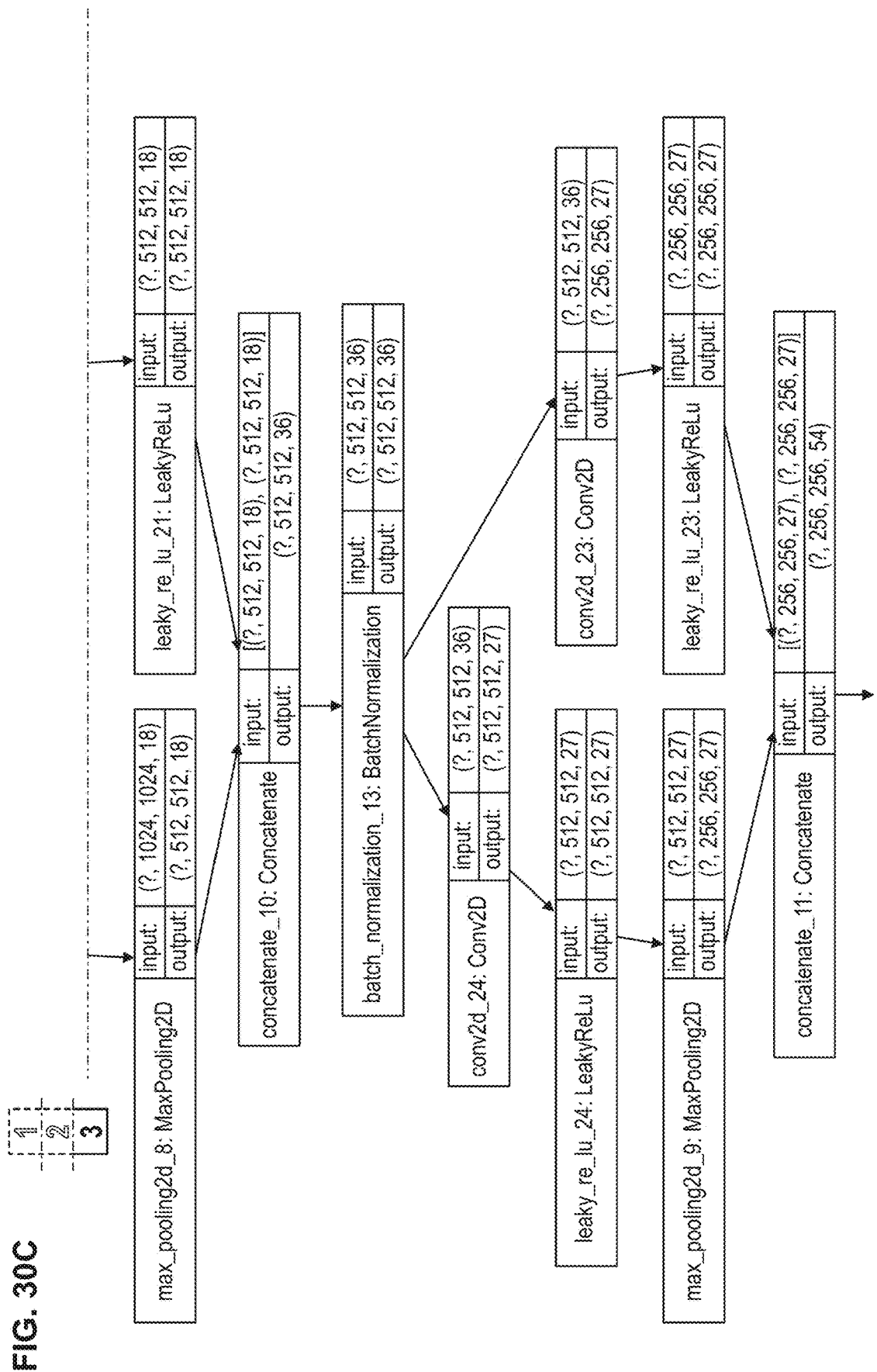
Figure 31A:
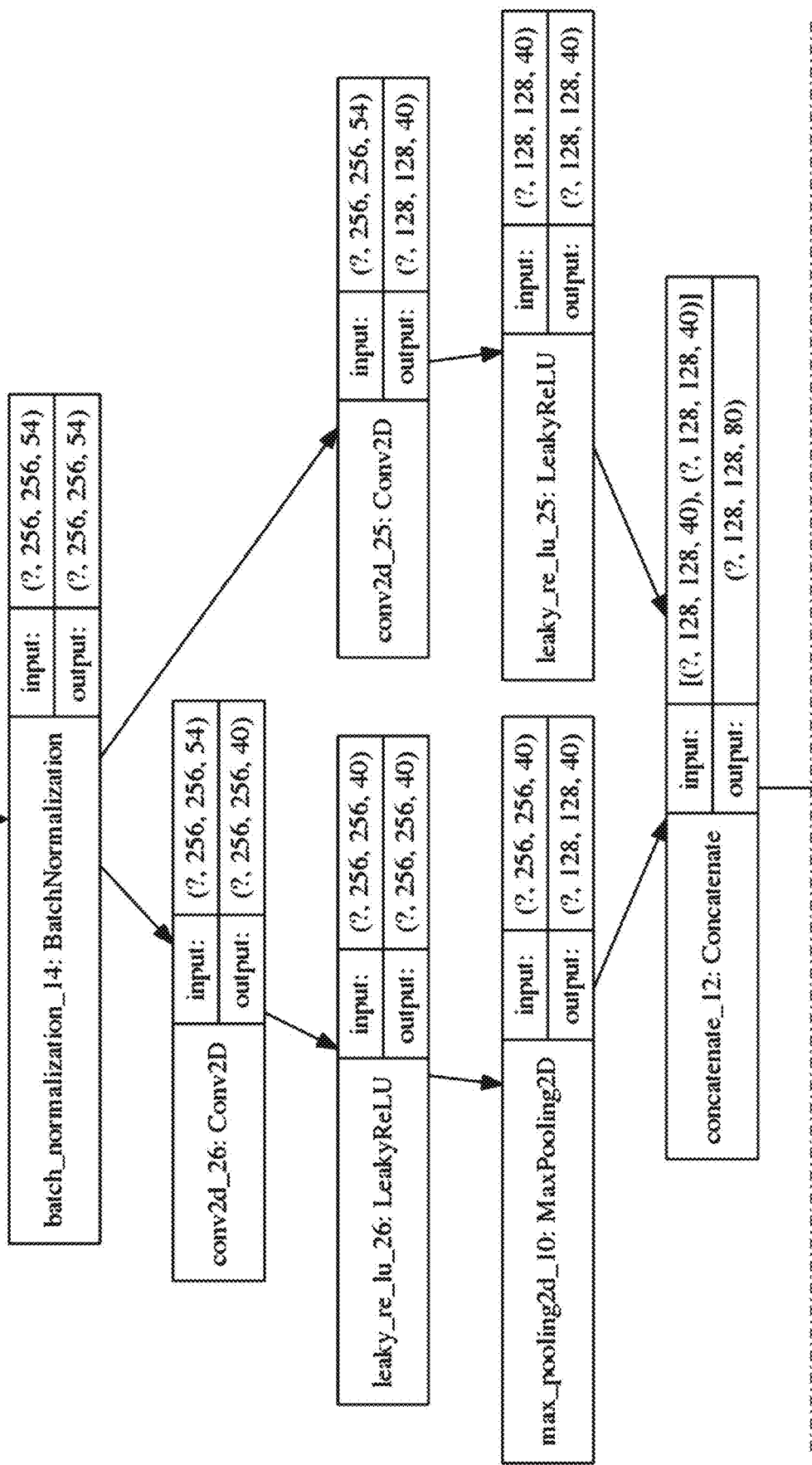
Figure 31B:
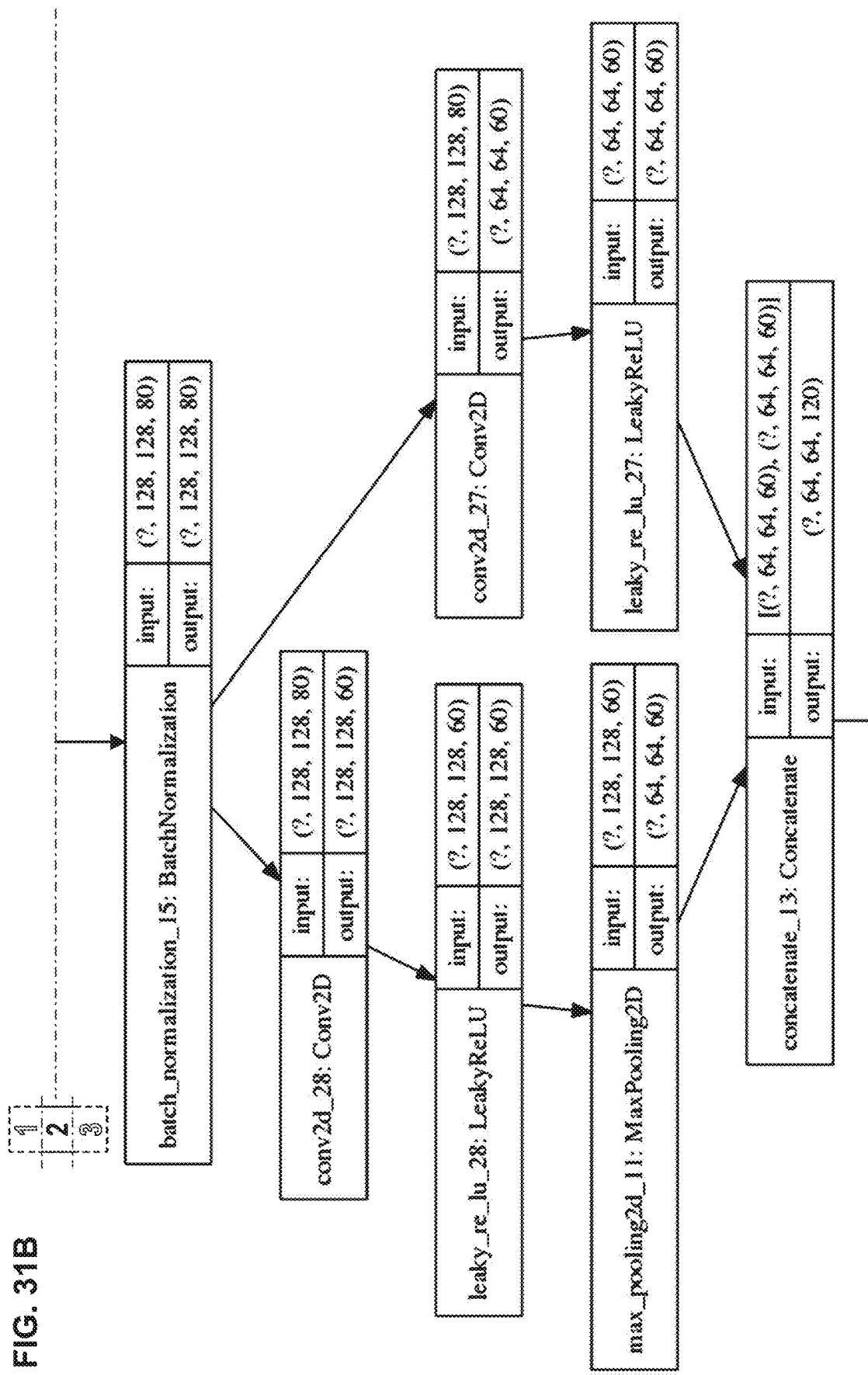
Figure 31C:
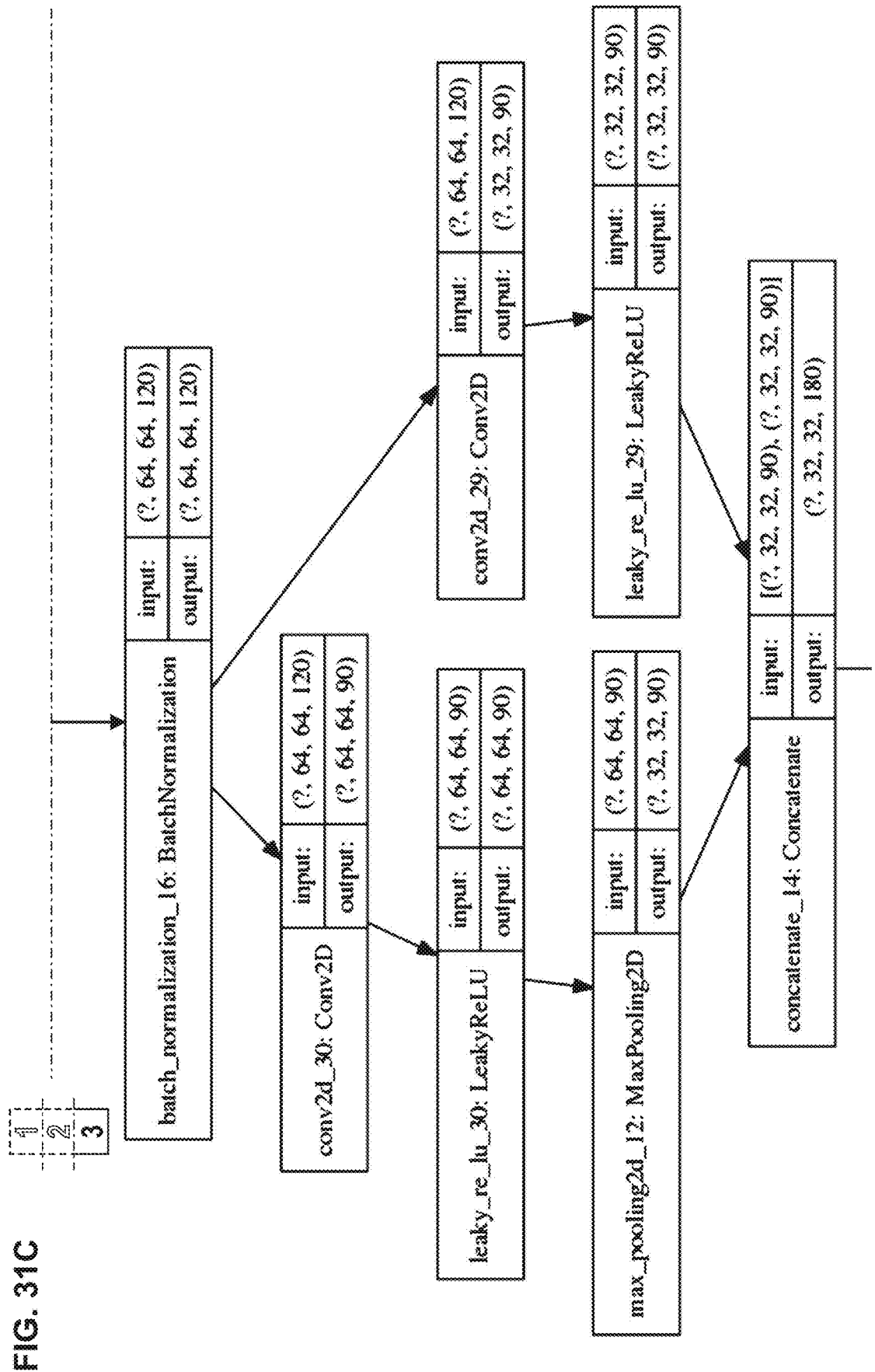
Figure 32A:
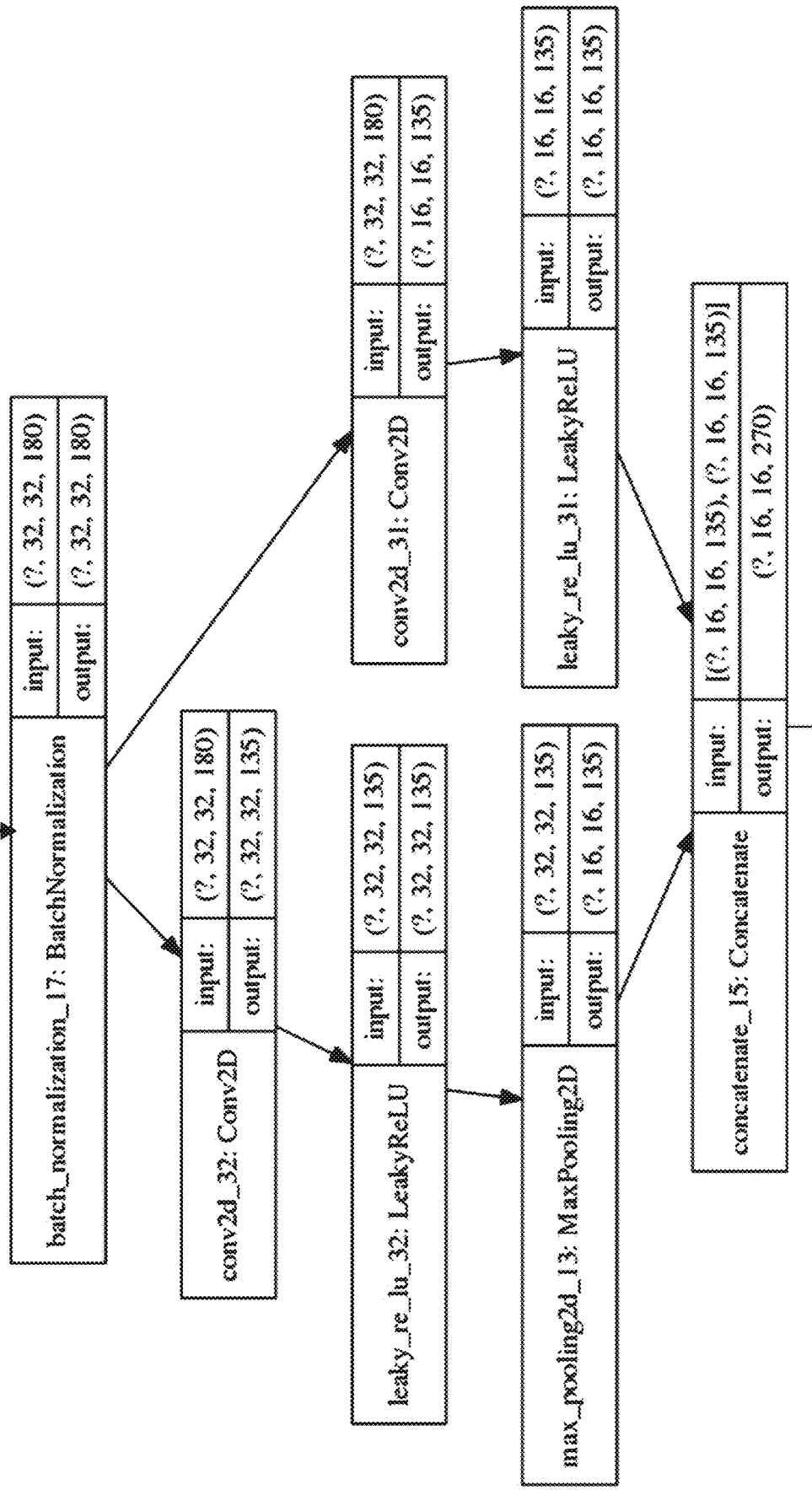
Figure 32B:
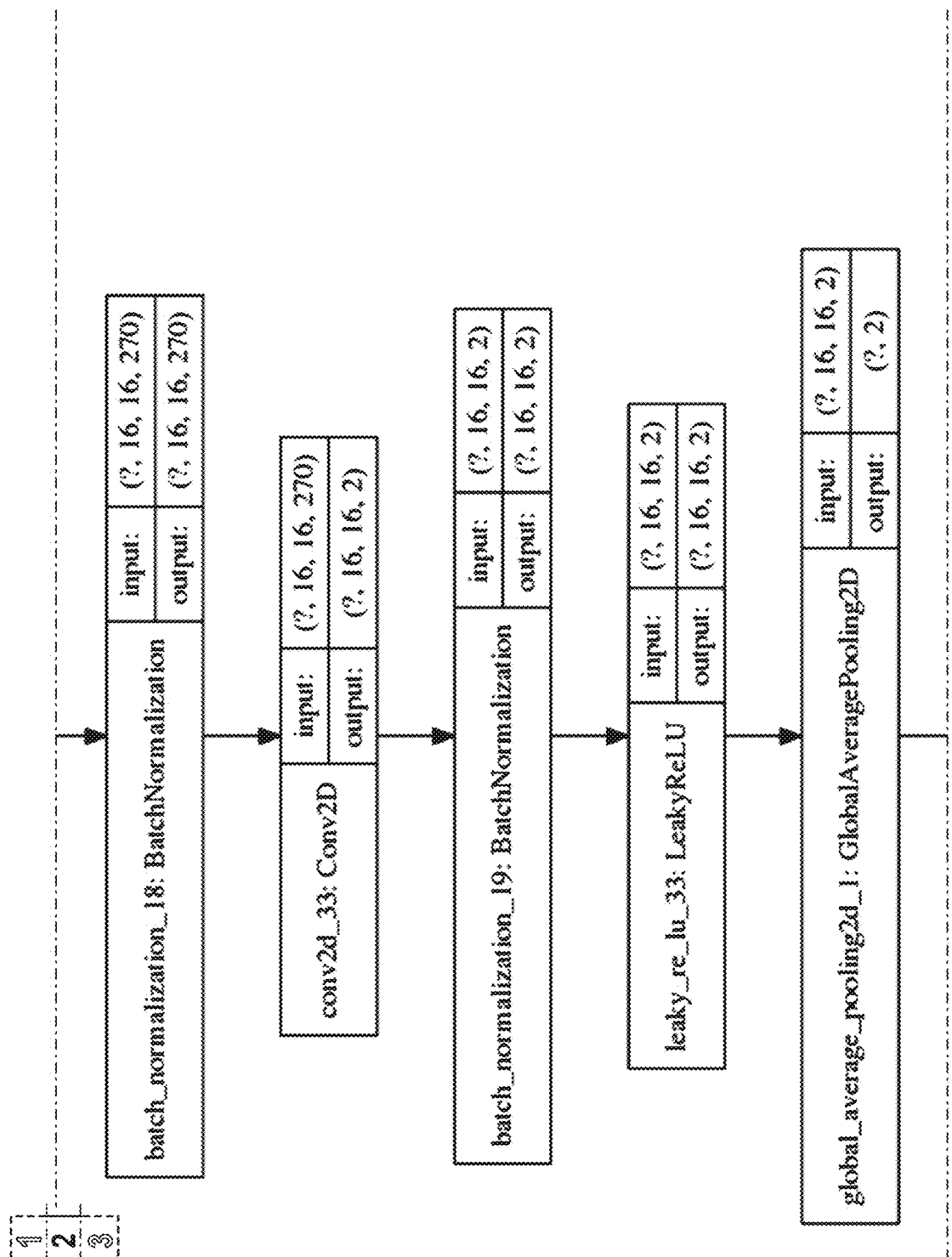
Figure 32C:
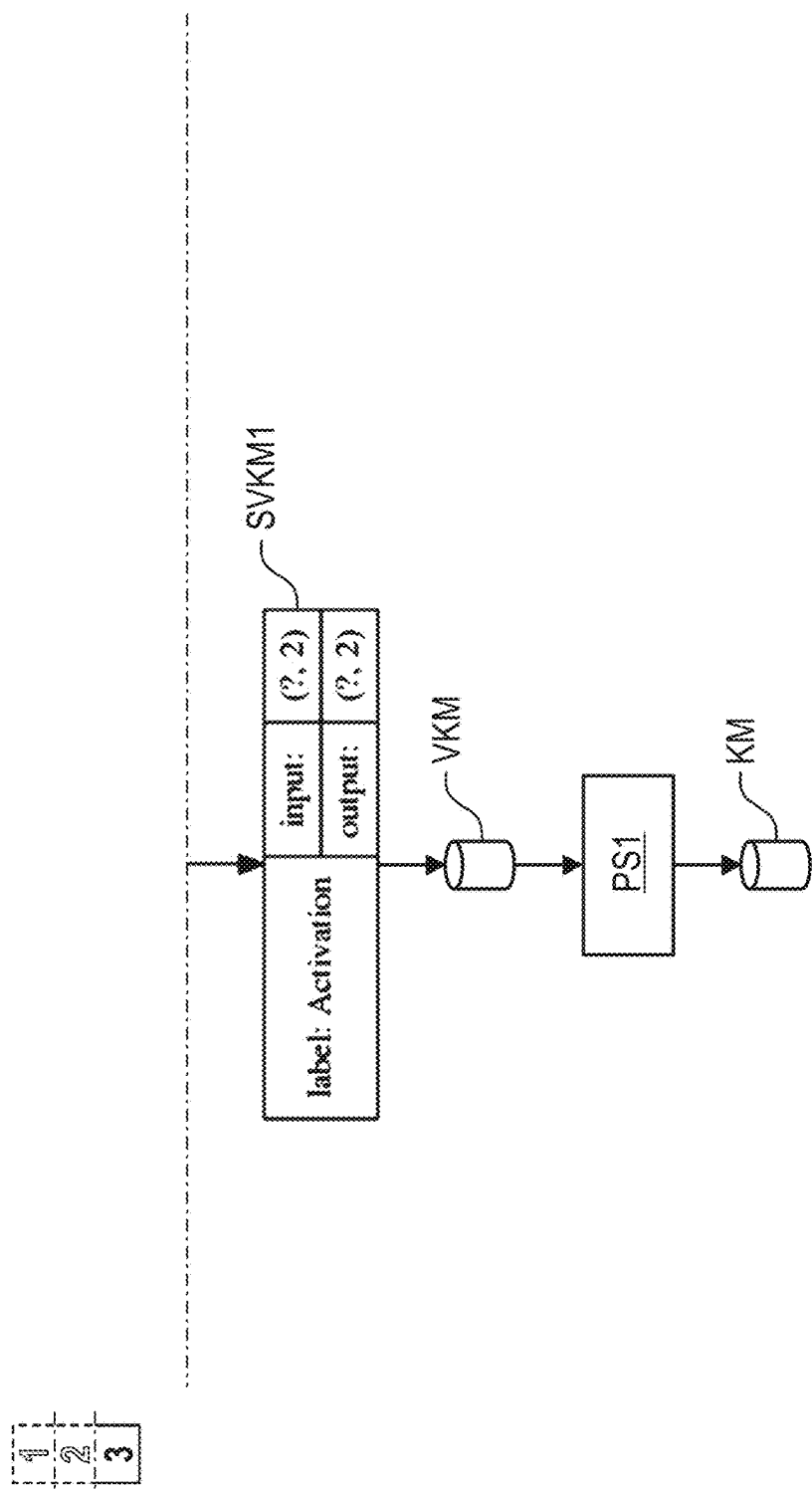
Figure 33A:
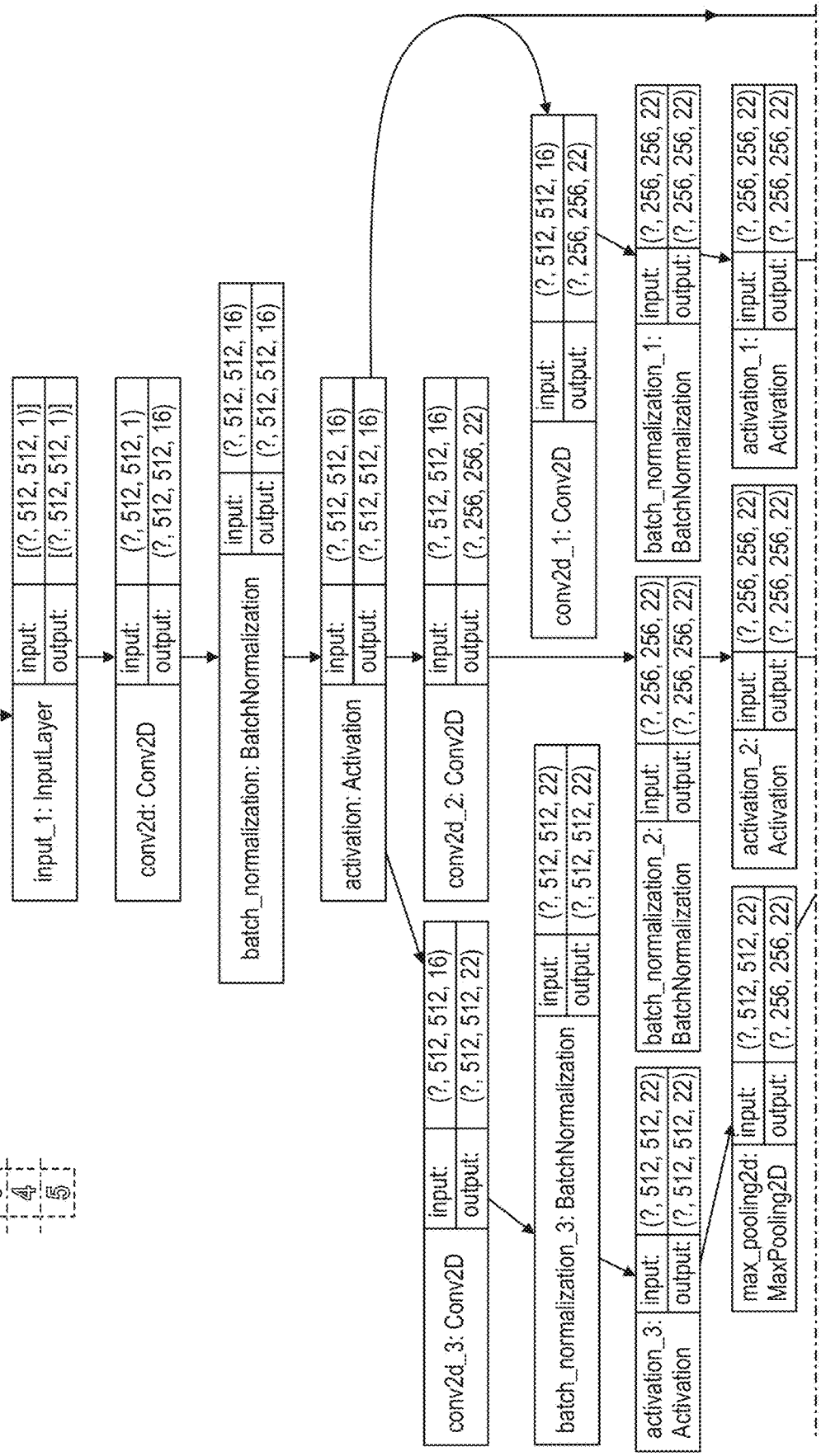
Figure 33B:
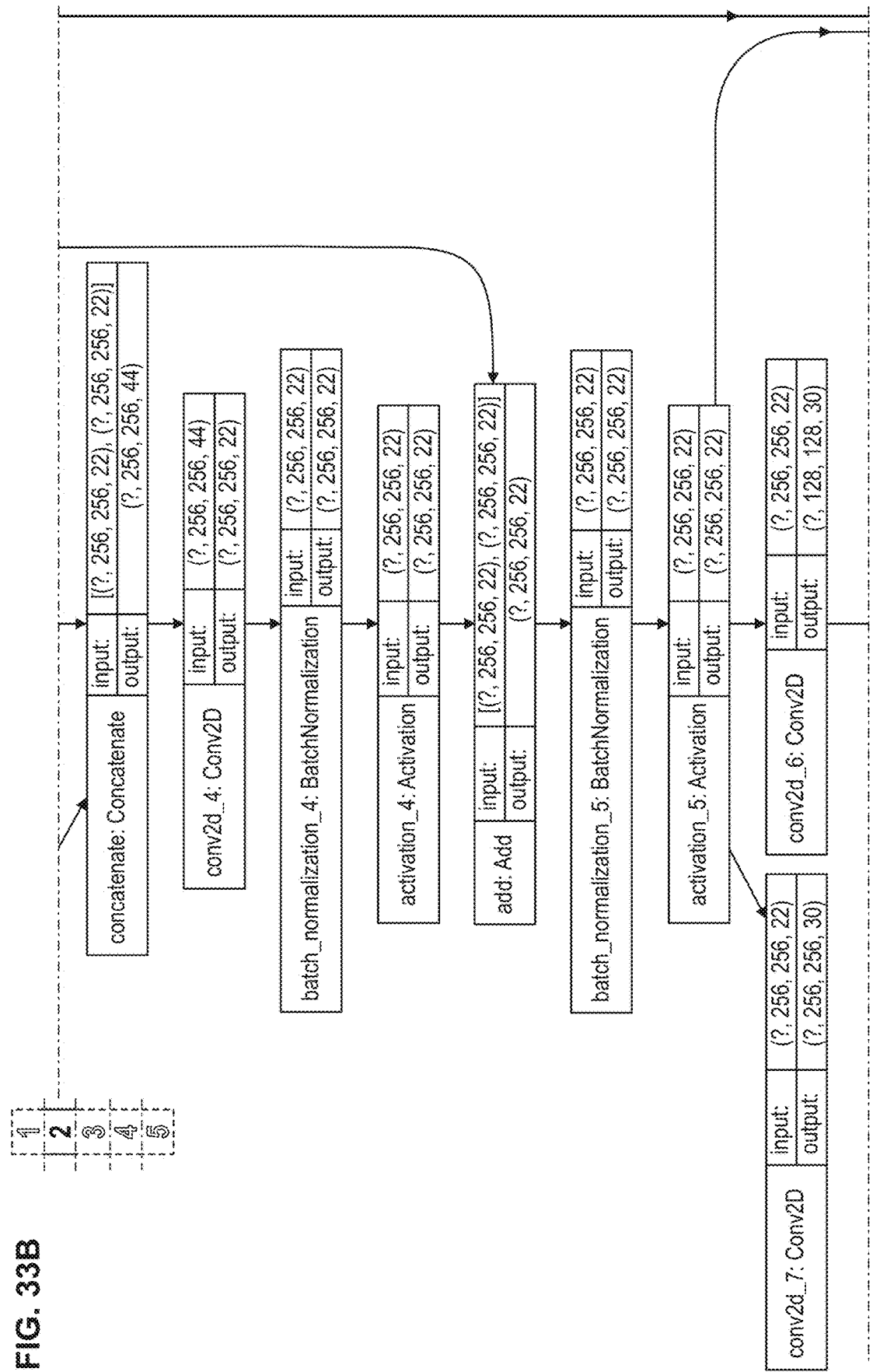
Figure 33C:
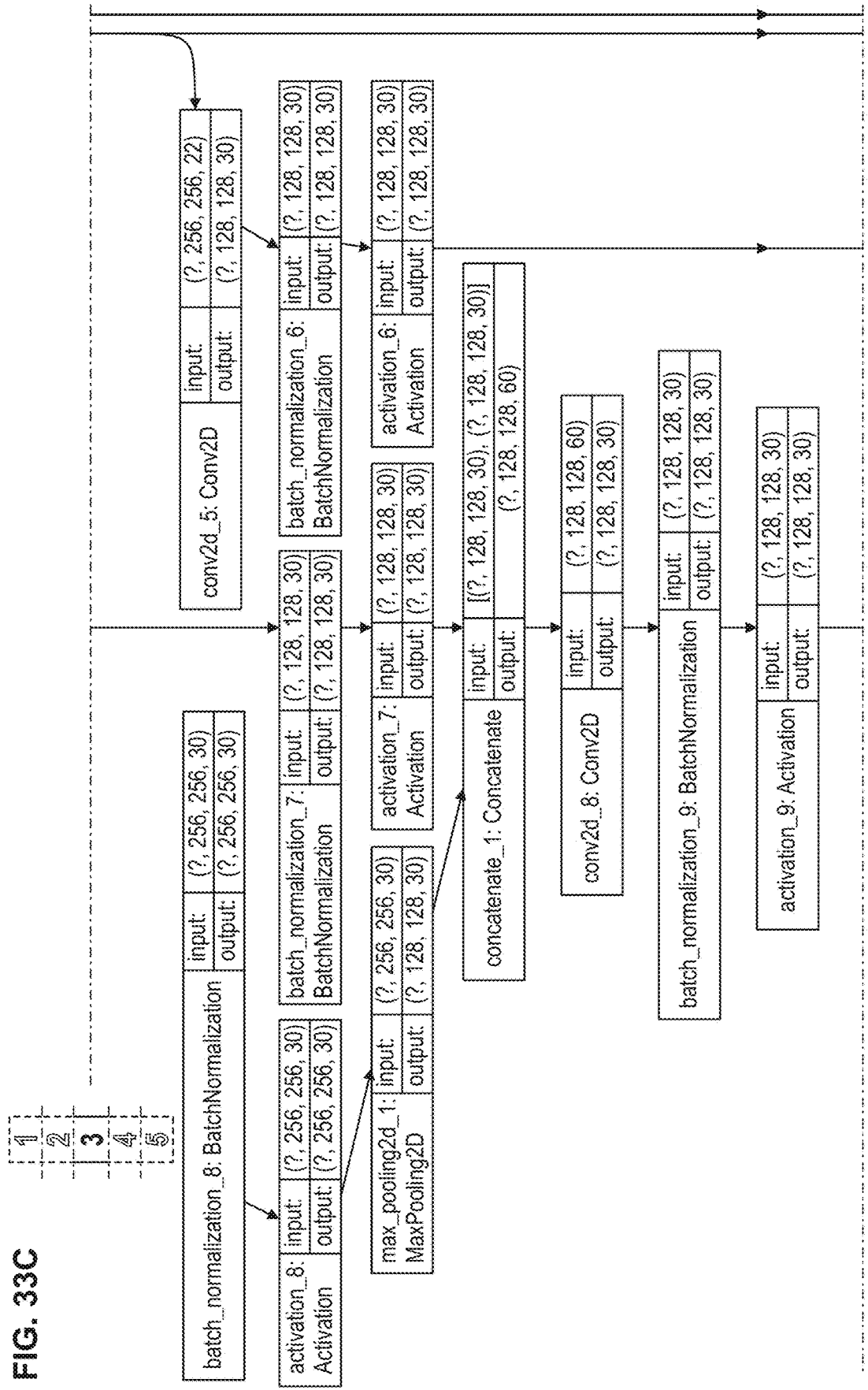
Figure 33D:
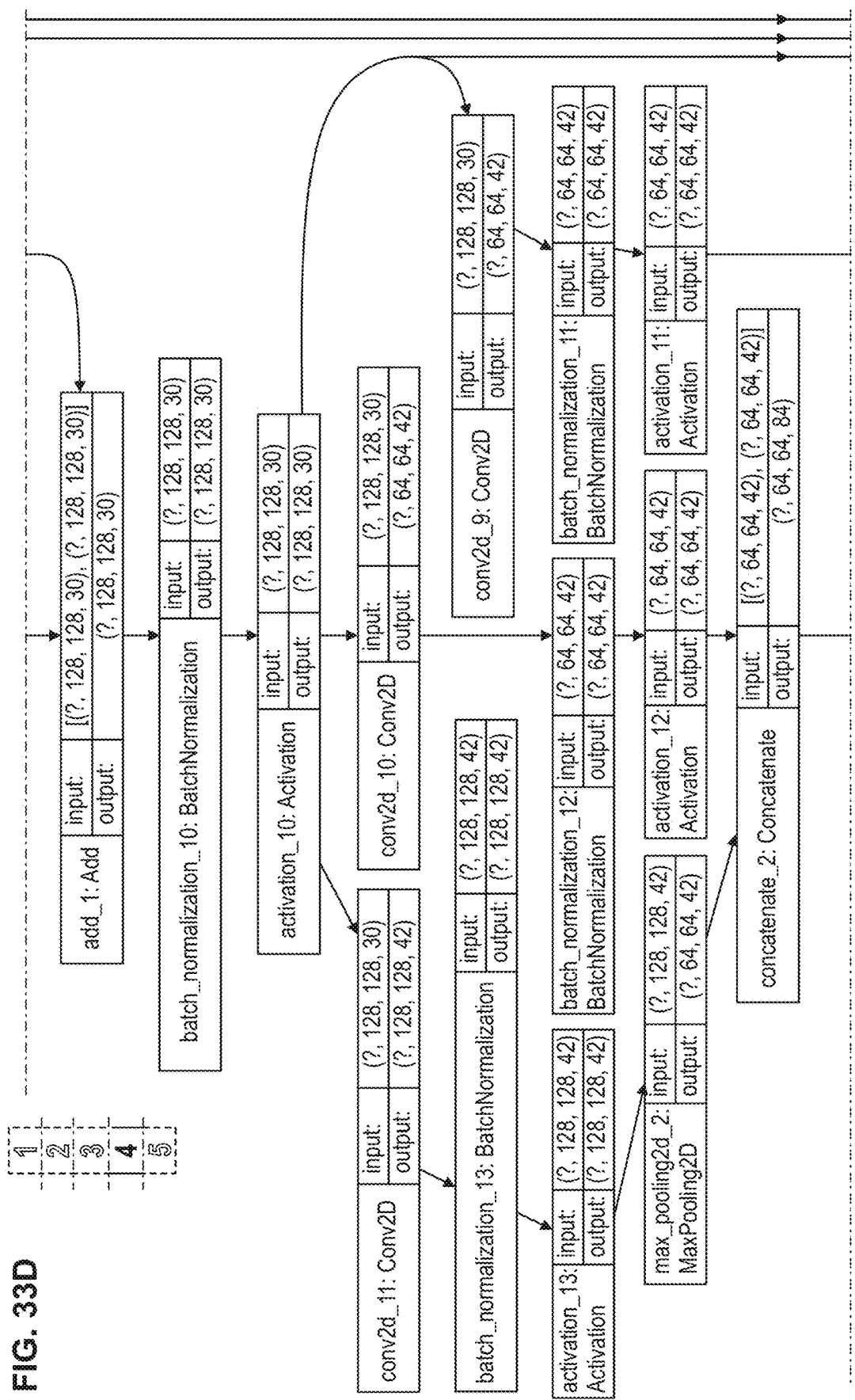
Figure 33E:
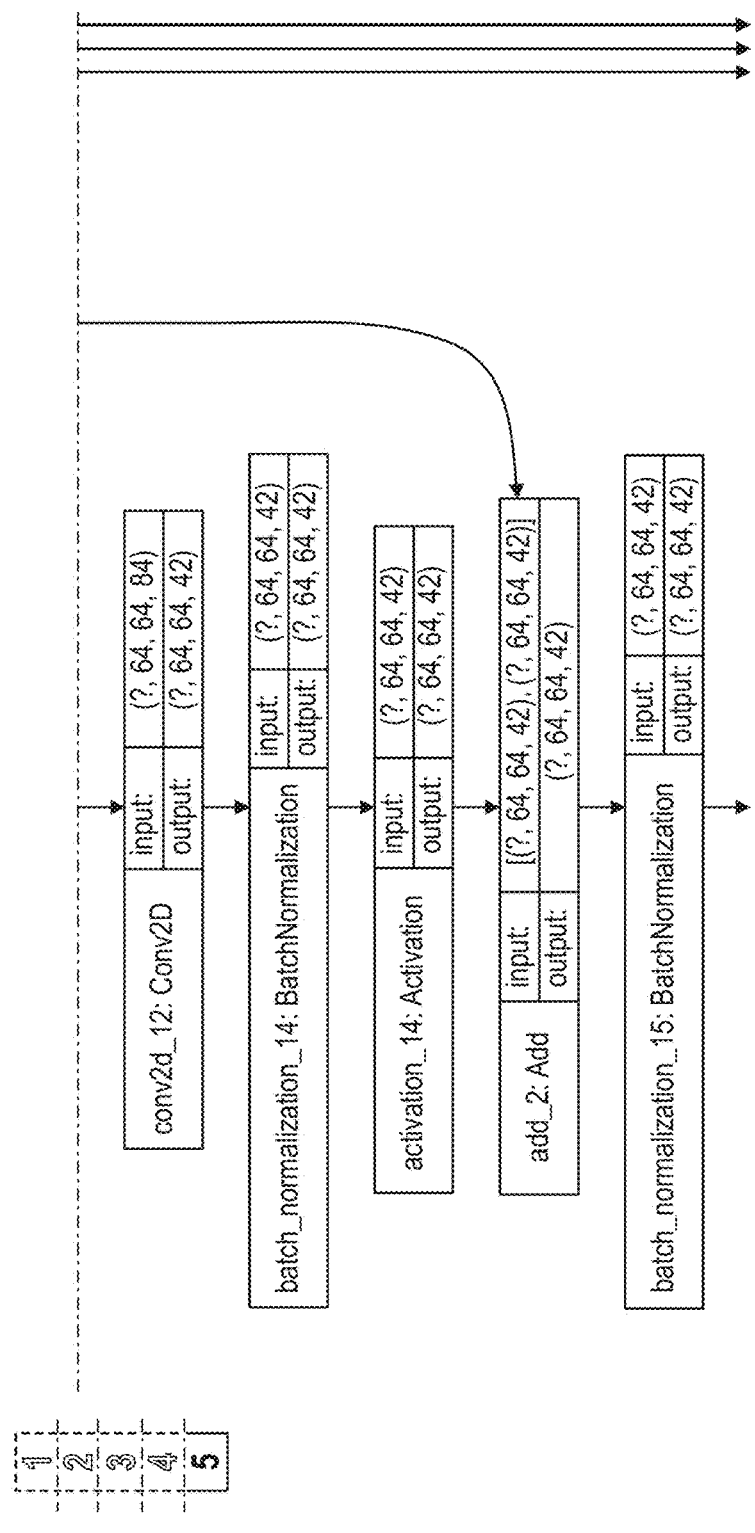
Figure 34A:
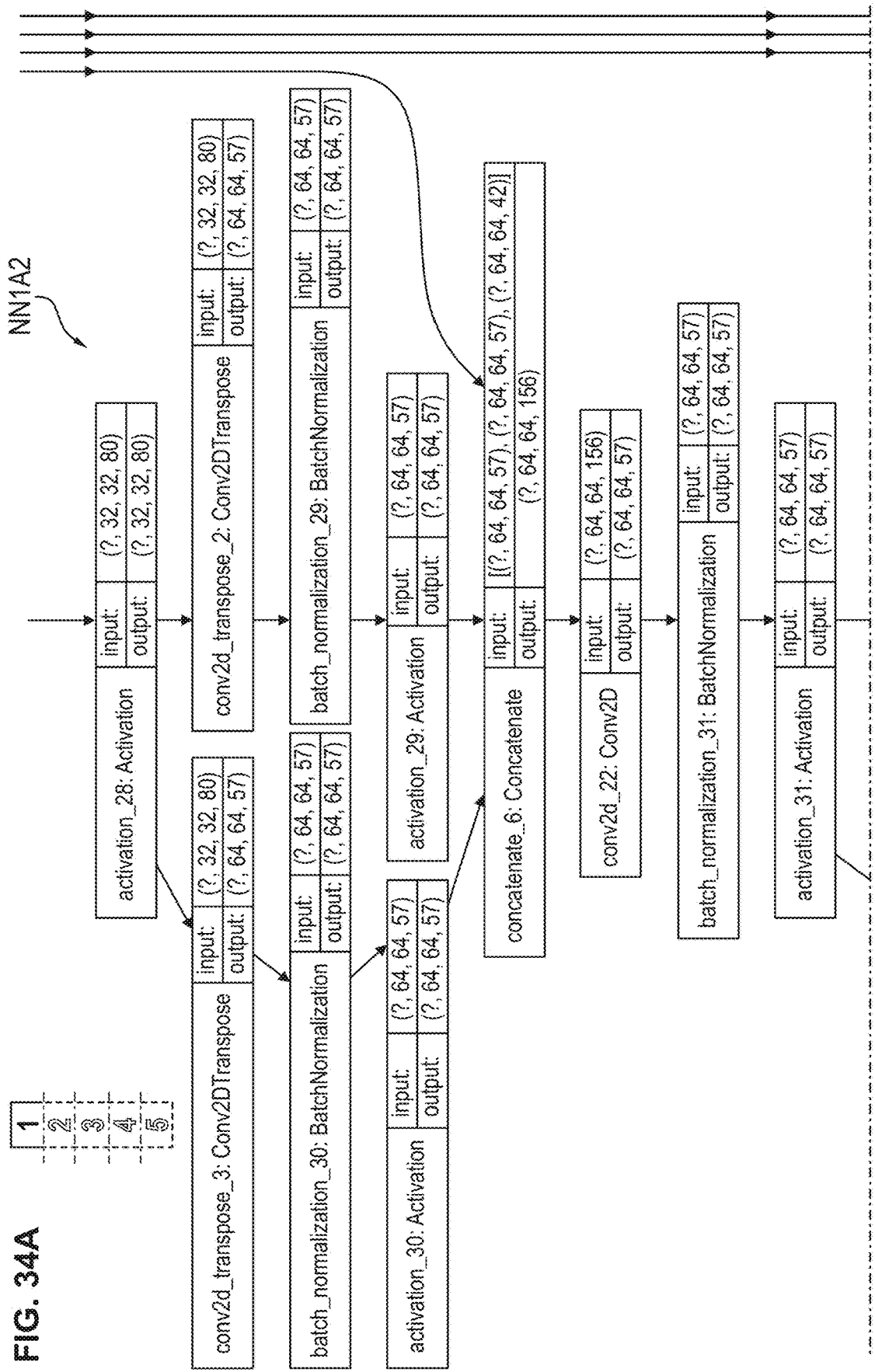
Figure 34B:
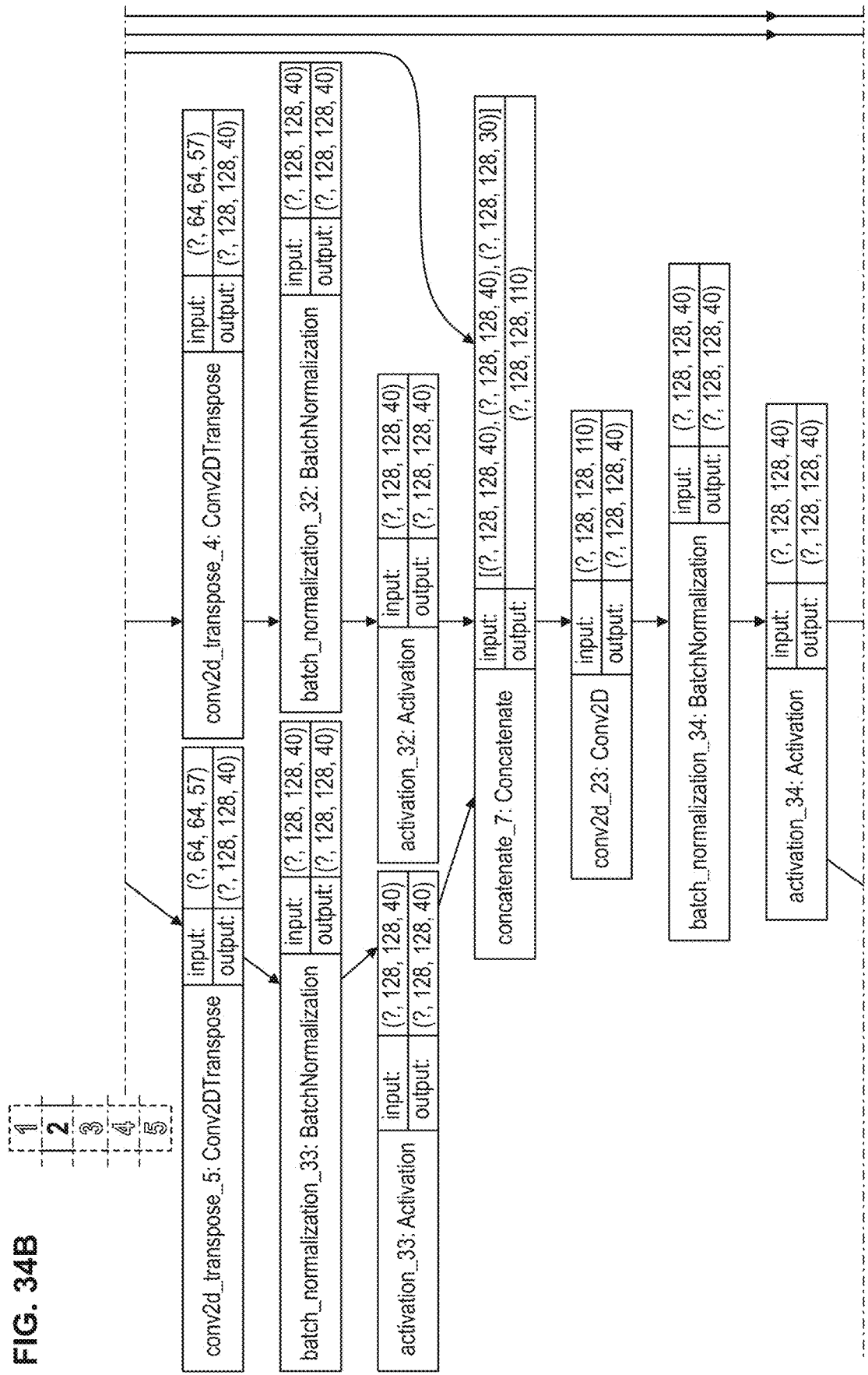
Figure 34C:
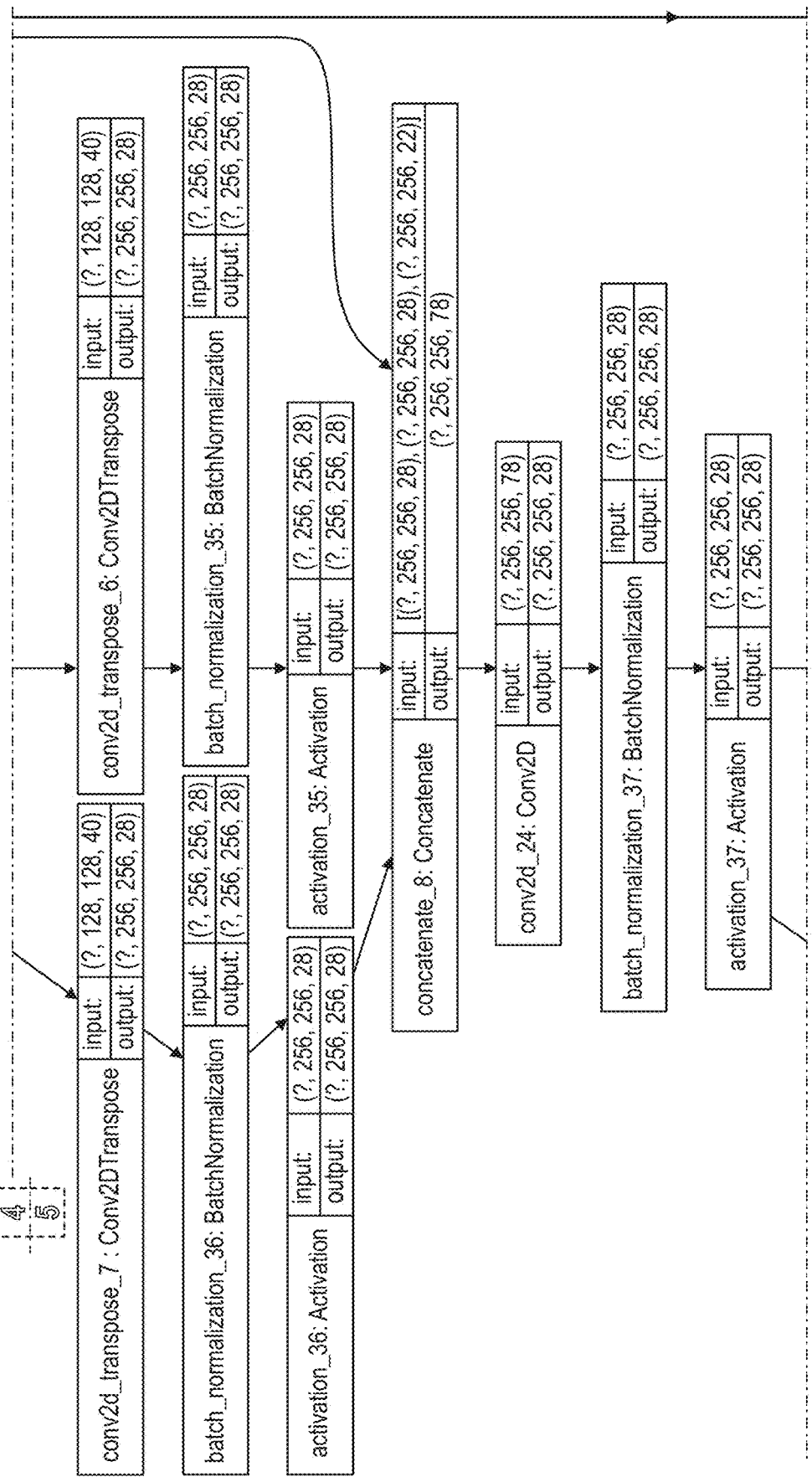
Figure 34D:
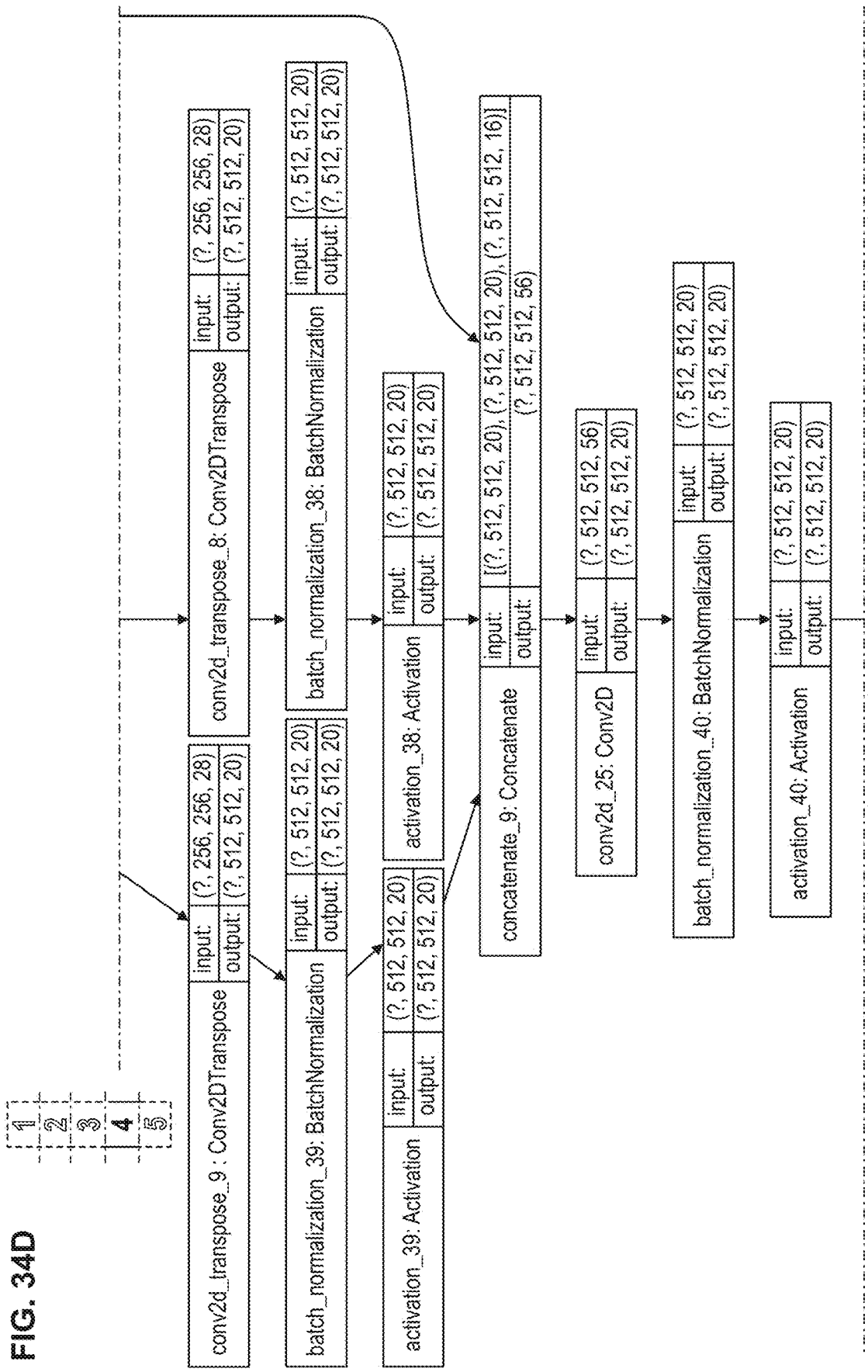
Figure 34E:
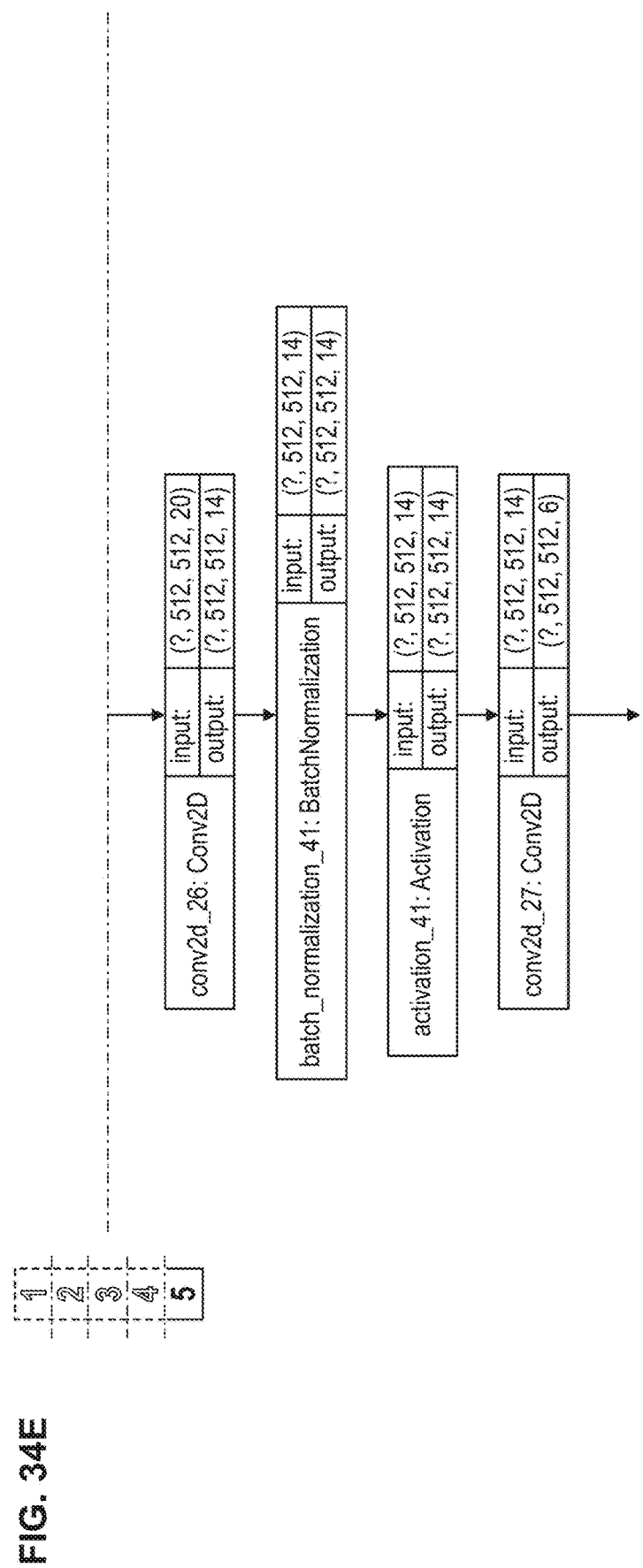
Figure 35A:
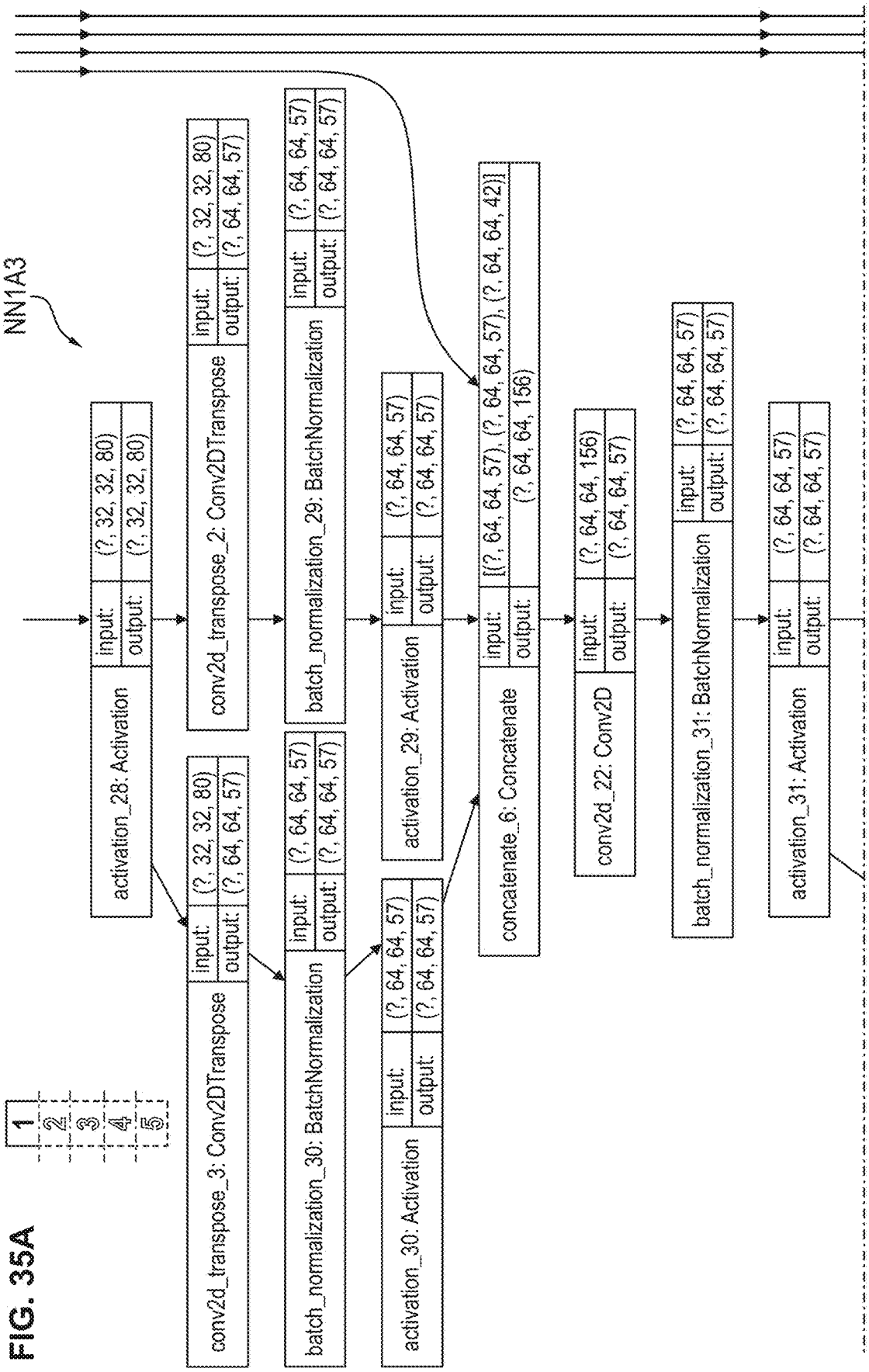
Figure 35B:
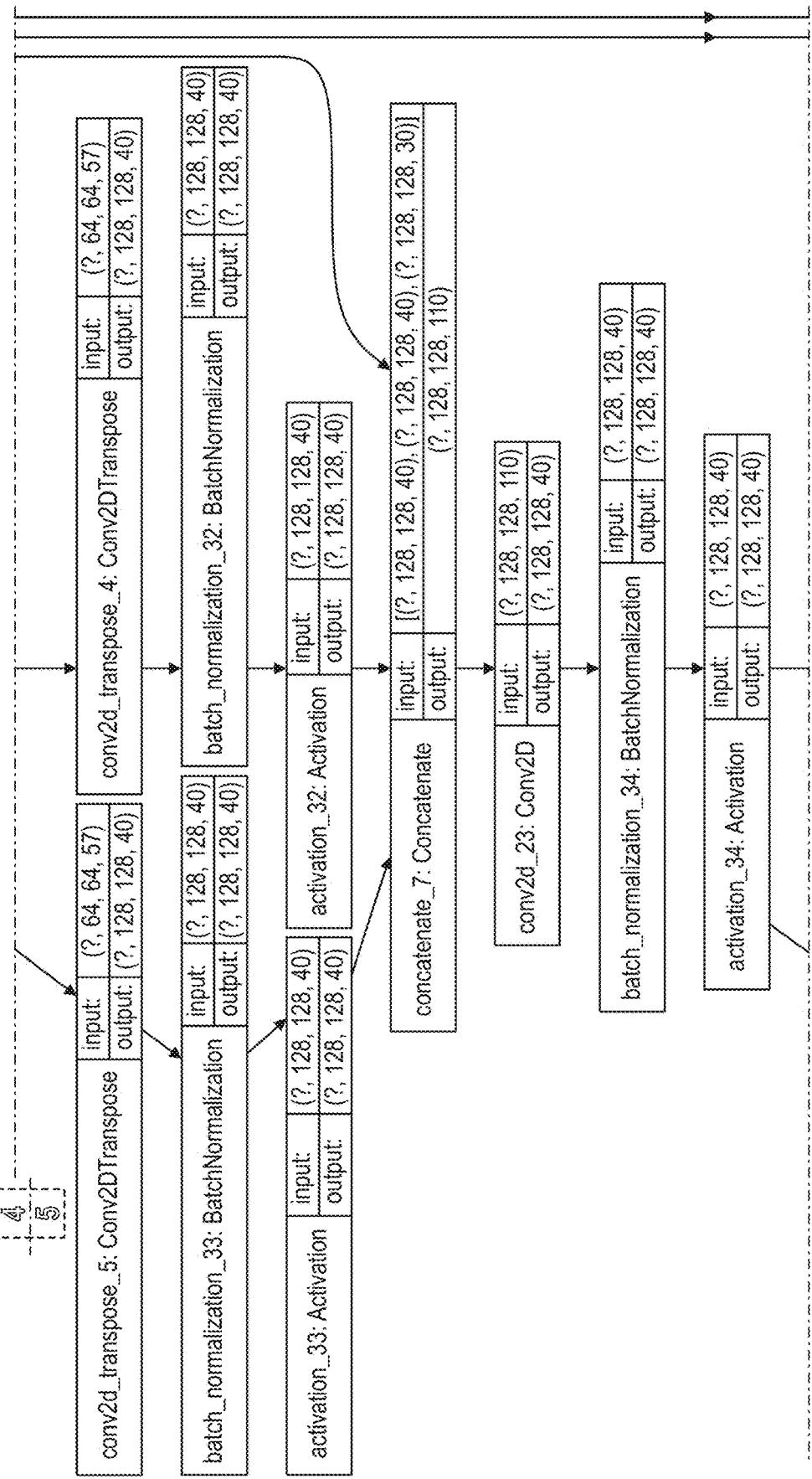
Figure 35C:
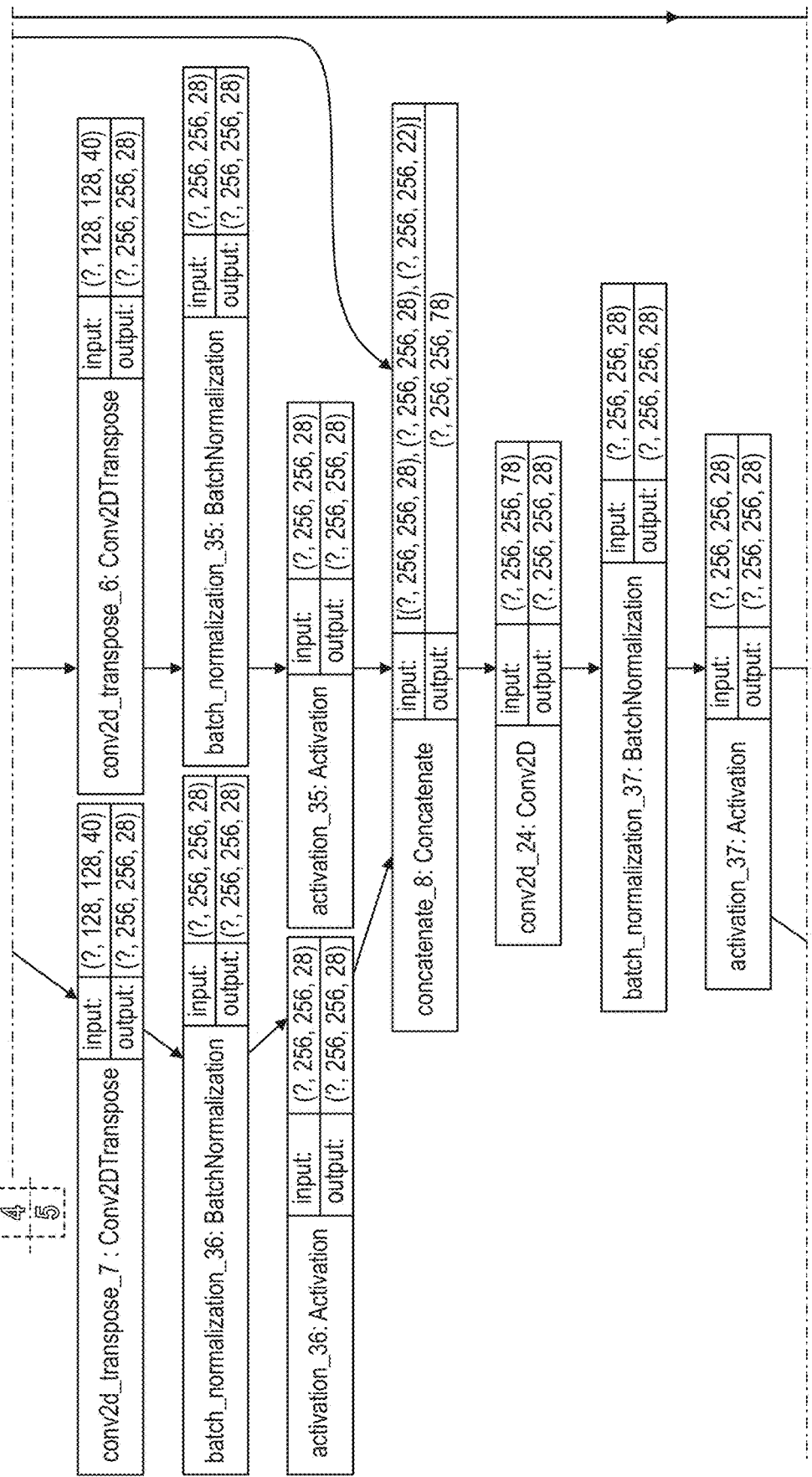
Figure 35D:
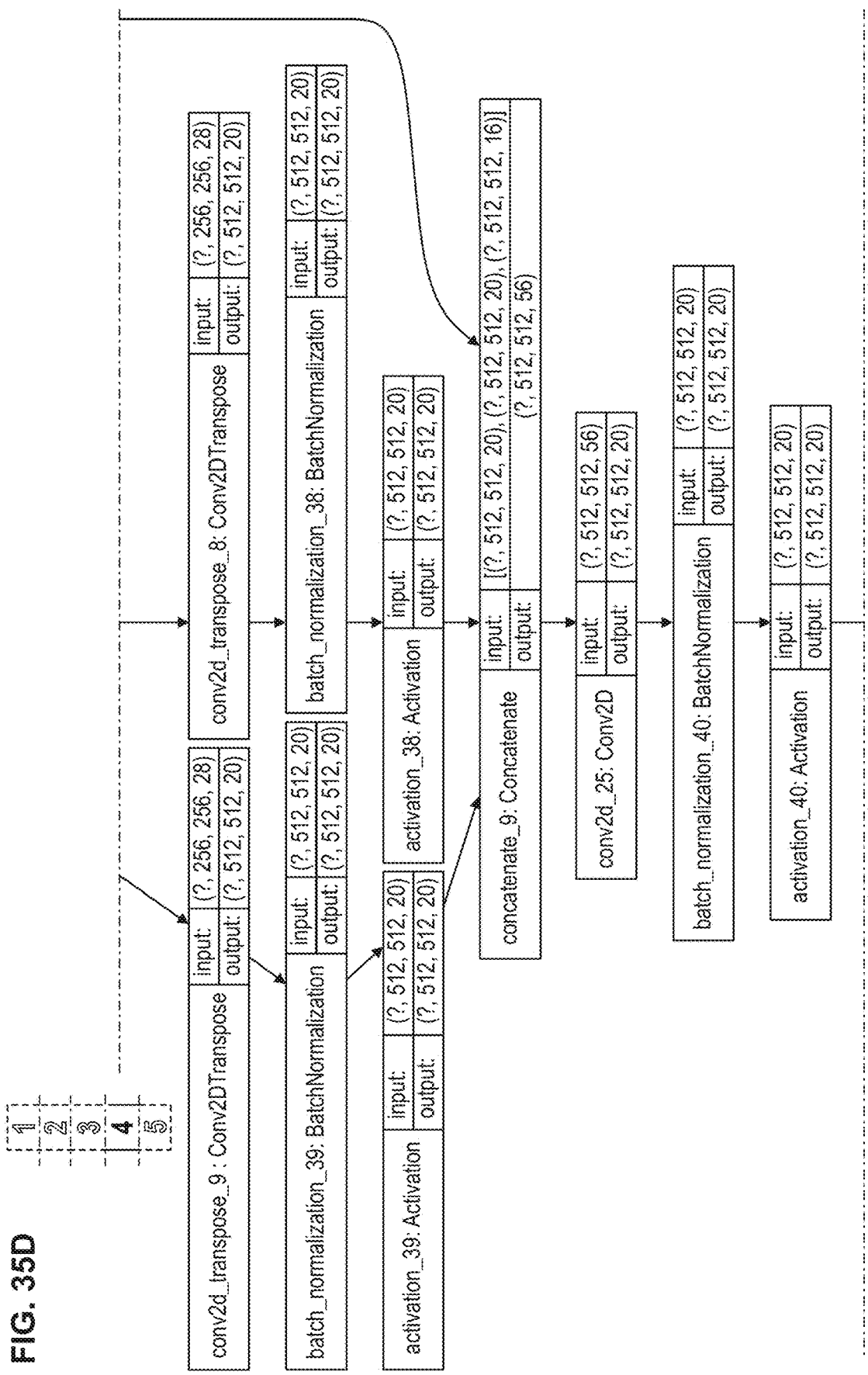
Figure 35E:
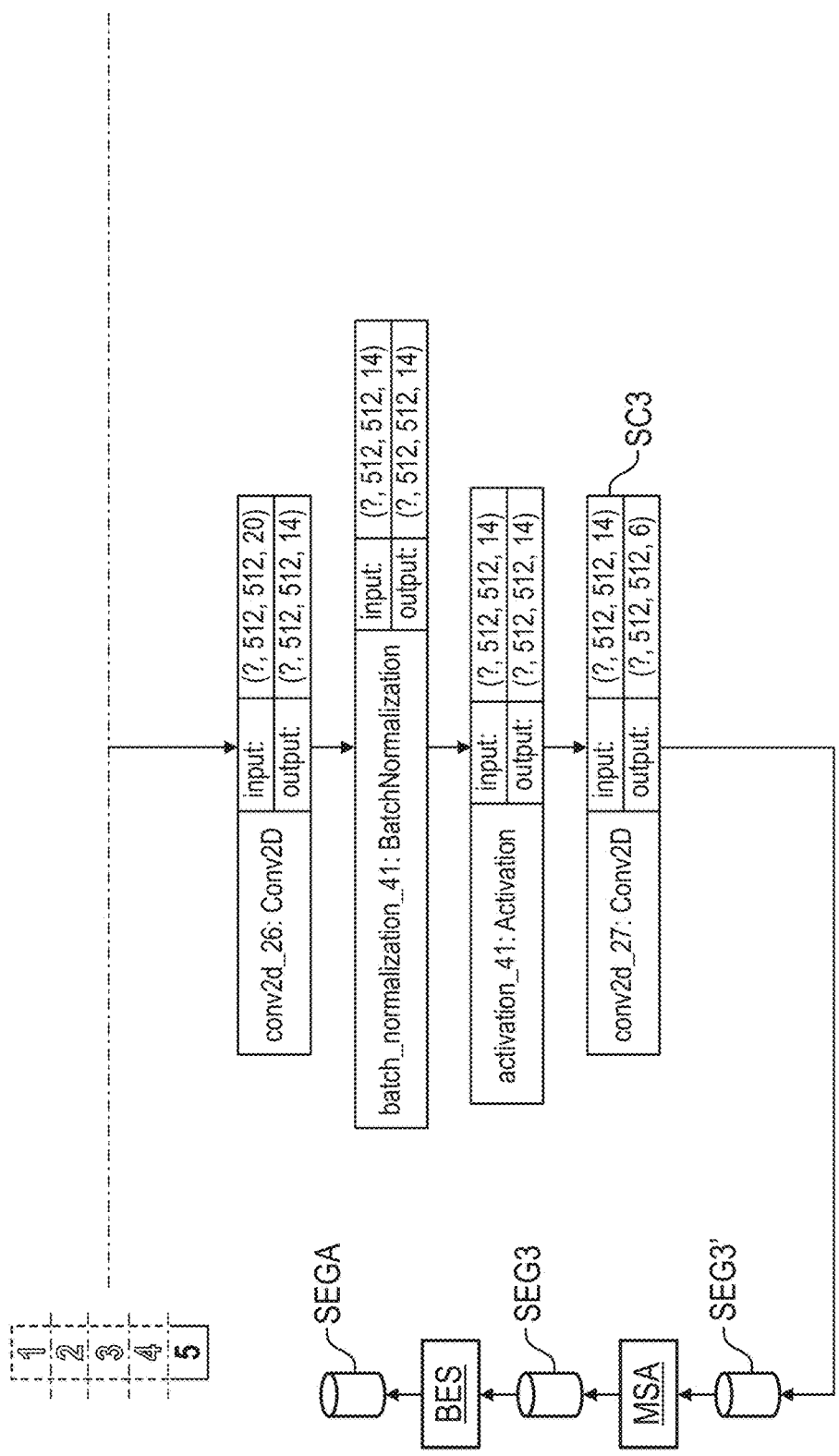

The sub-networks NN2A1, NN2A2, NN2A3 from FIGS. 30, 31, 32 form together an embodiment of a neural network NN2A, as depicted in FIG. 2. Here too, the respective processing steps are again specified in detail. The fluorescence image FB is received by the first part NN2A1, the fluorescence image FB preferably having been scaled beforehand to a dimensionality of 2048×2048. Furthermore, the segmentation information SEGA is received by the first part NN2A1, the segmentation information SEGA preferably having been scaled beforehand to a dimensionality of 2048×2048.

In the third part NN2A3 from FIG. 32, an output variable VKM having 2 scalar values is then generated in a step SVKM1, which output variable VKM represents the provisional measures of confidence VKM_i for the 2 classes, class index i=1 . . . 2, with i=1 for endomysium pattern and i=2 for negative. In a checking step PS, measures of confidence KM can then be ascertained by means of a threshold-value decision.

FIGS. 33, 34, 35 show parts NN1A1, NN1A2, NN1A3 of a neural network NN1A from FIG. 2 for segmentation of a fluorescence image for the example of the organ section as an esophagus of a simian. Here too, each individual processing step is again specified in detail.

In FIG. 33, the fluorescence image FB is preferably received in a dimensionality of 512×512 in the first step, the fluorescence image FB preferably having been appropriately scaled beforehand.

At the end of the third part NN1A3—see FIG. 35—of the neural network NN1A from FIG. 2, segmentation information SEG3', which is depicted in FIG. 15B by way of example, is then output in a step SC3. Here, for the 5 classes or the 5 sub-areas A, B, C, D, E and for a further sixth class as background area HGF, the segmentation information SEG3' provides respective probabilities as output variables, based in each case on an individual image of 512×512 pixels, and so, for each pixel from image information of the dimension 512×512, it is then possible through a maximum decision MSA based on the measures of confidence of a particular pixel to decide the class to which the pixel belongs, in order to obtain the relevant sub-area or the segmentation information SEG3, which is depicted in FIG. 15B. From this, it is then possible in a determination step BES to obtain by means of index selection the segmentation information SEGA, depicted as SEGA in FIG. 15D by way of example.

Figure 17:
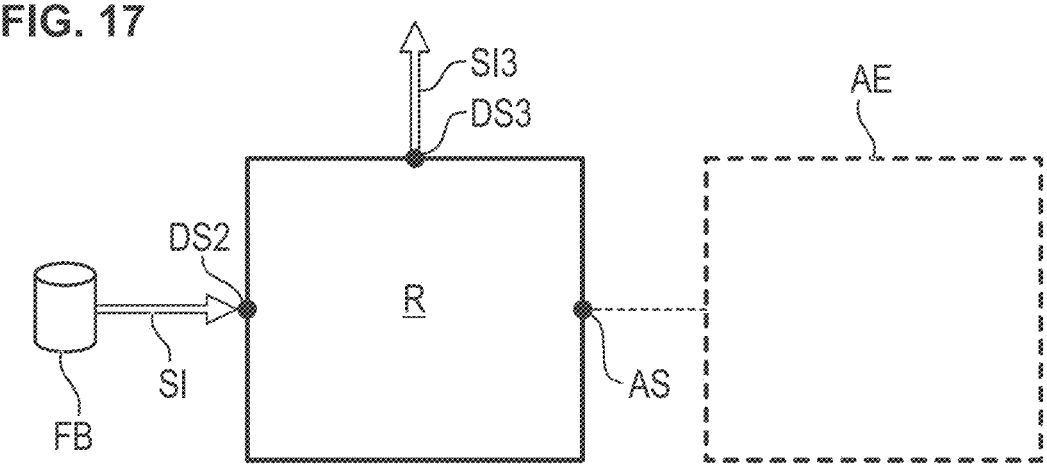
FIG. 17 shows a computing unit according to the invention as per a preferred embodiment.

FIG. 17 shows a computing unit according to the invention that preferably receives, according to a preferred embodiment, a fluorescence image FB as a data signal SI via a data interface DS2. The computing unit R can then ascertain the above-described information items KM, VI and provide them as a data signal SI3 via a data interface DS3. Preferably, this can be done via a cabled or wireless data network. Particularly preferably, the computing unit R comprises an output interface AS for output of the information items KM, VI via an output unit AE. The output unit AE is preferably a display unit for visual display of the aforementioned information items.

Figure 18:
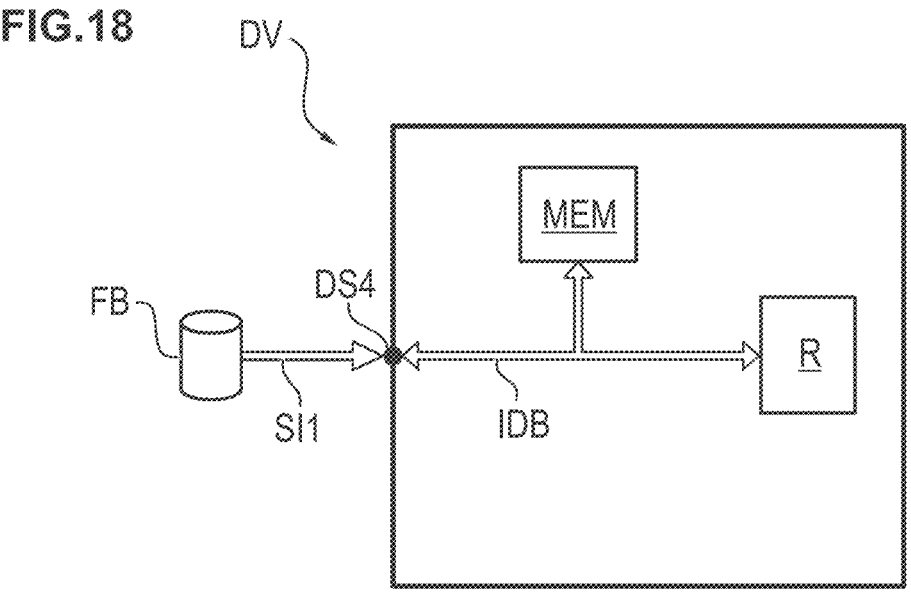
FIG. 18 shows a data network device according to the invention as per a preferred embodiment.

FIG. 18 shows a data network device DV according to the invention as per a preferred embodiment. The data network device DV receives the fluorescence image FB as a data signal SI1 via a data interface DS4. The data network device DV comprises an above-described computing unit R and also a storage unit MEM. The computing unit R, a storage unit MEM and the data interface DS4 are preferably connected to one another via an internal data bus IDB.

Figure 19:
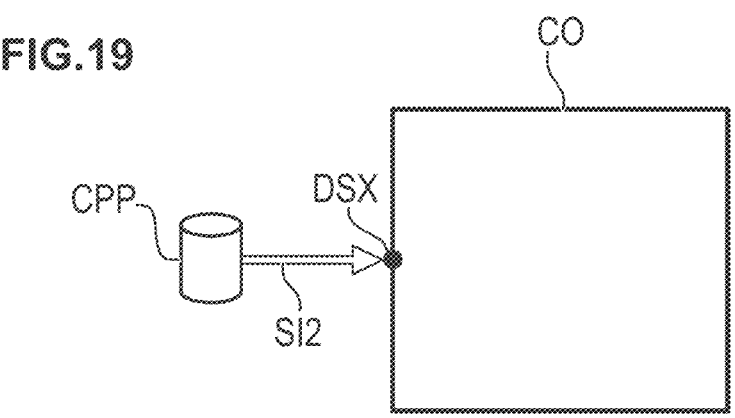
FIG. 19 shows a computer program product according to the invention and a data carrier signal according to the invention.
Figure 24A:
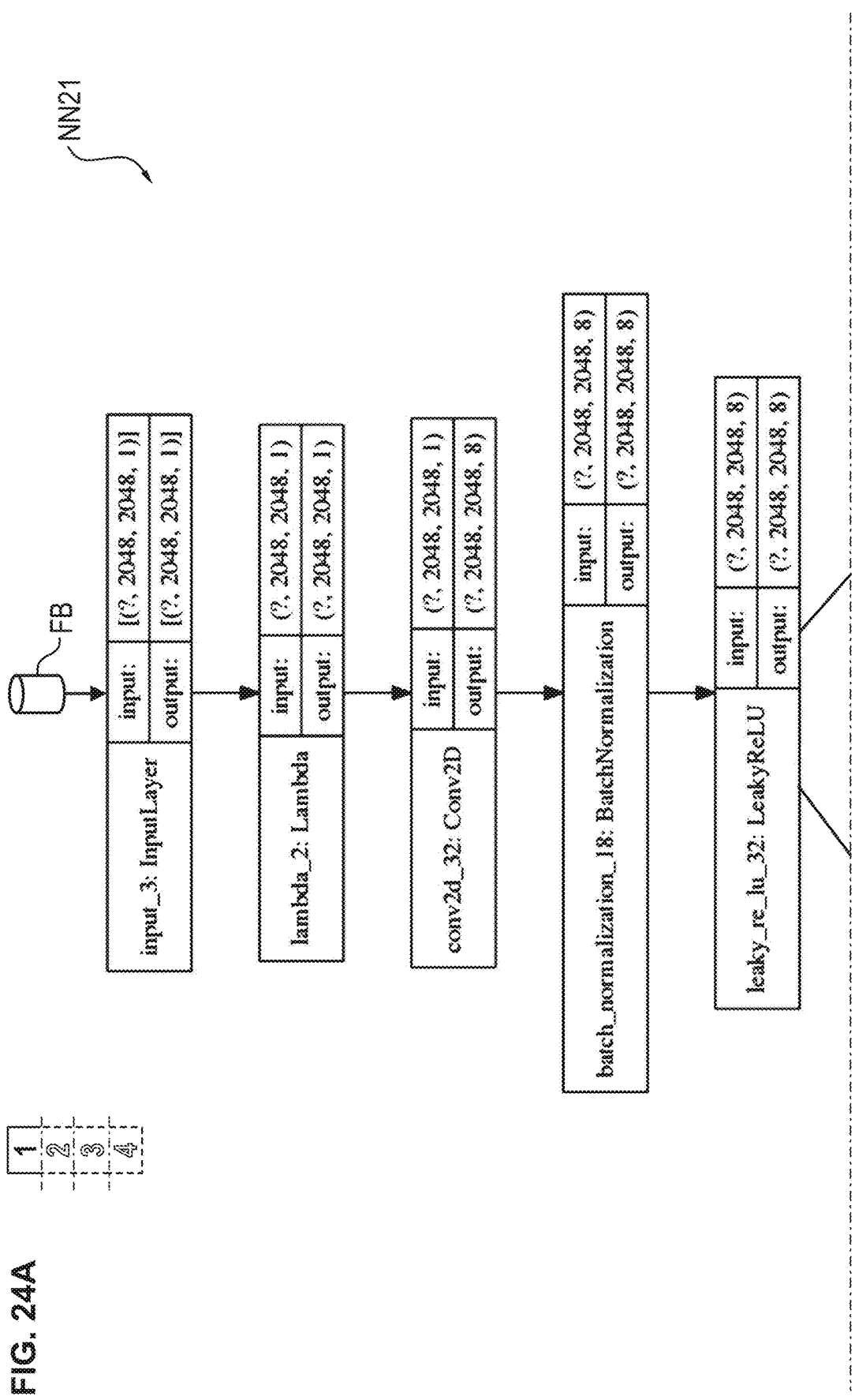
FIGS. 24-35 show preferred configurations of the first and the second neural network.
Figure 24B:
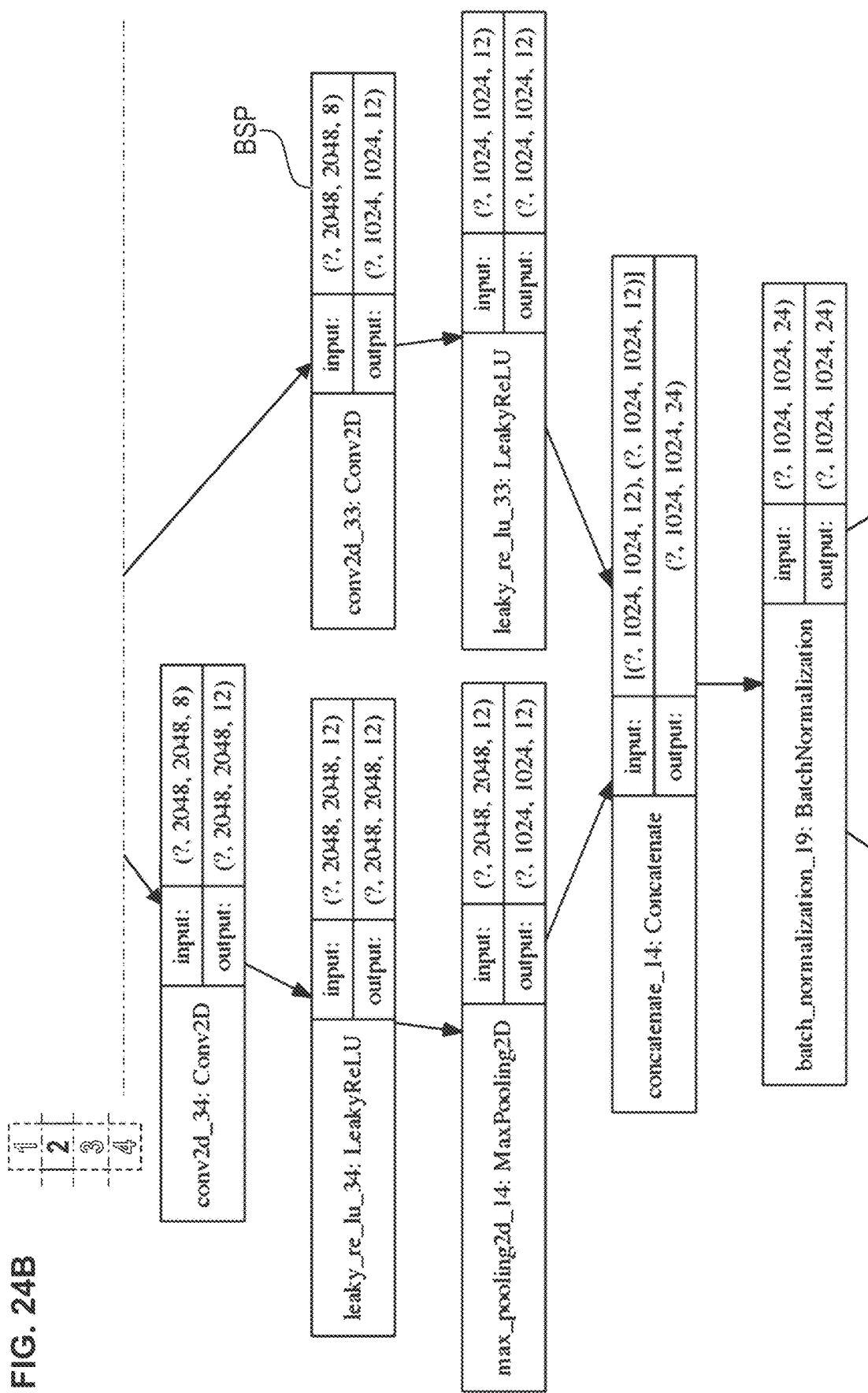
Figure 24C:
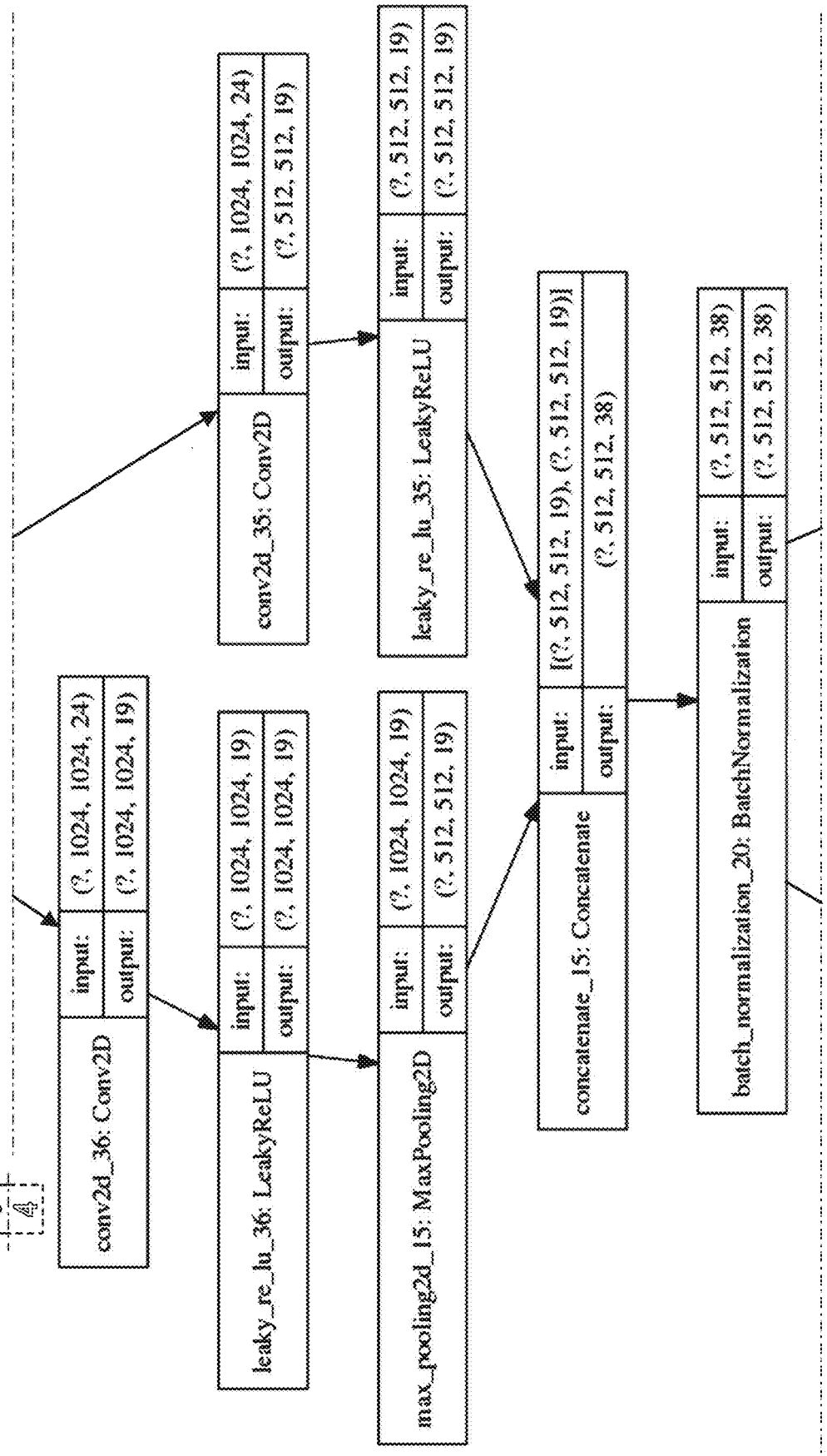
Figure 24D:
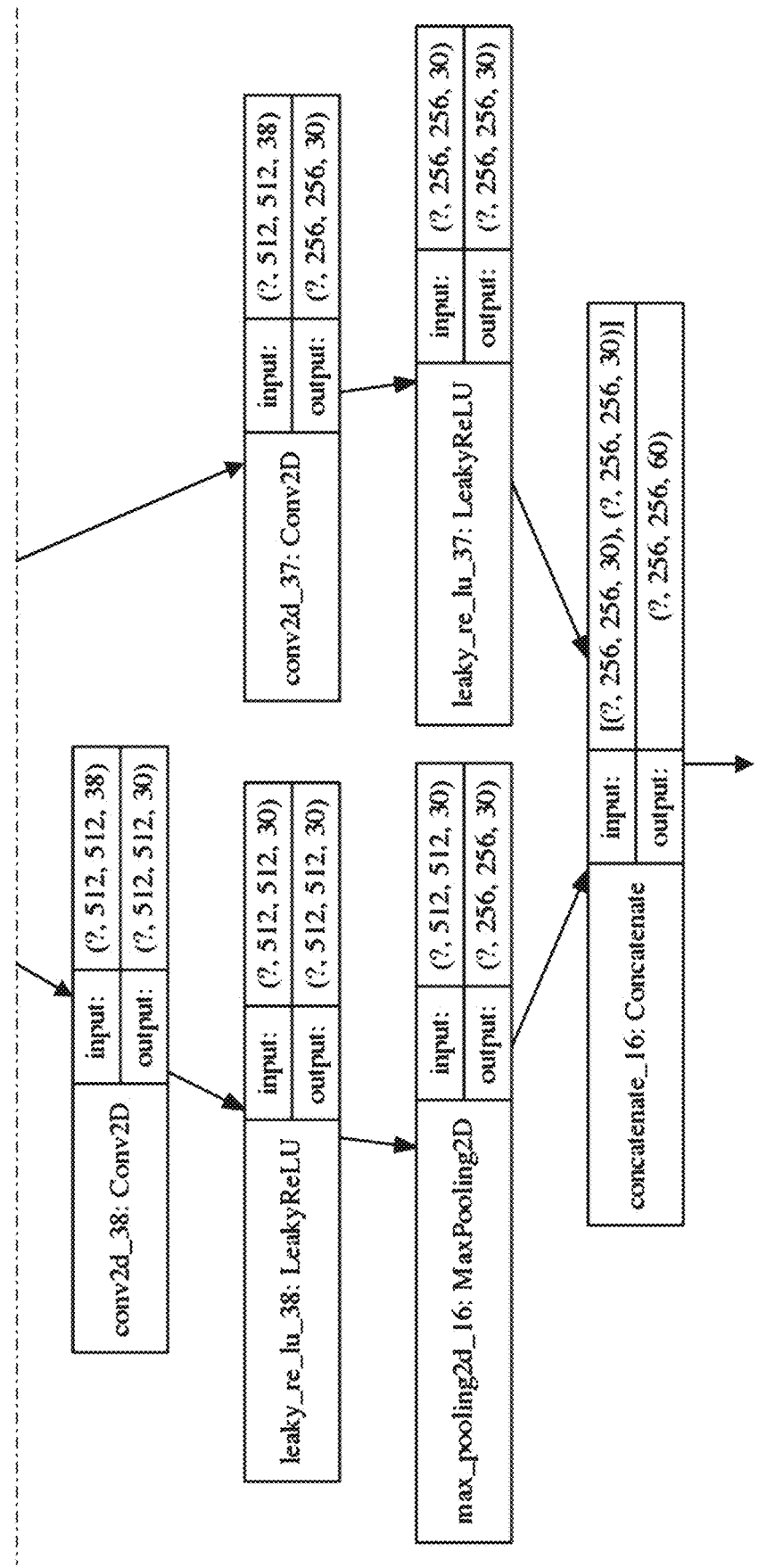
Figure 25A:
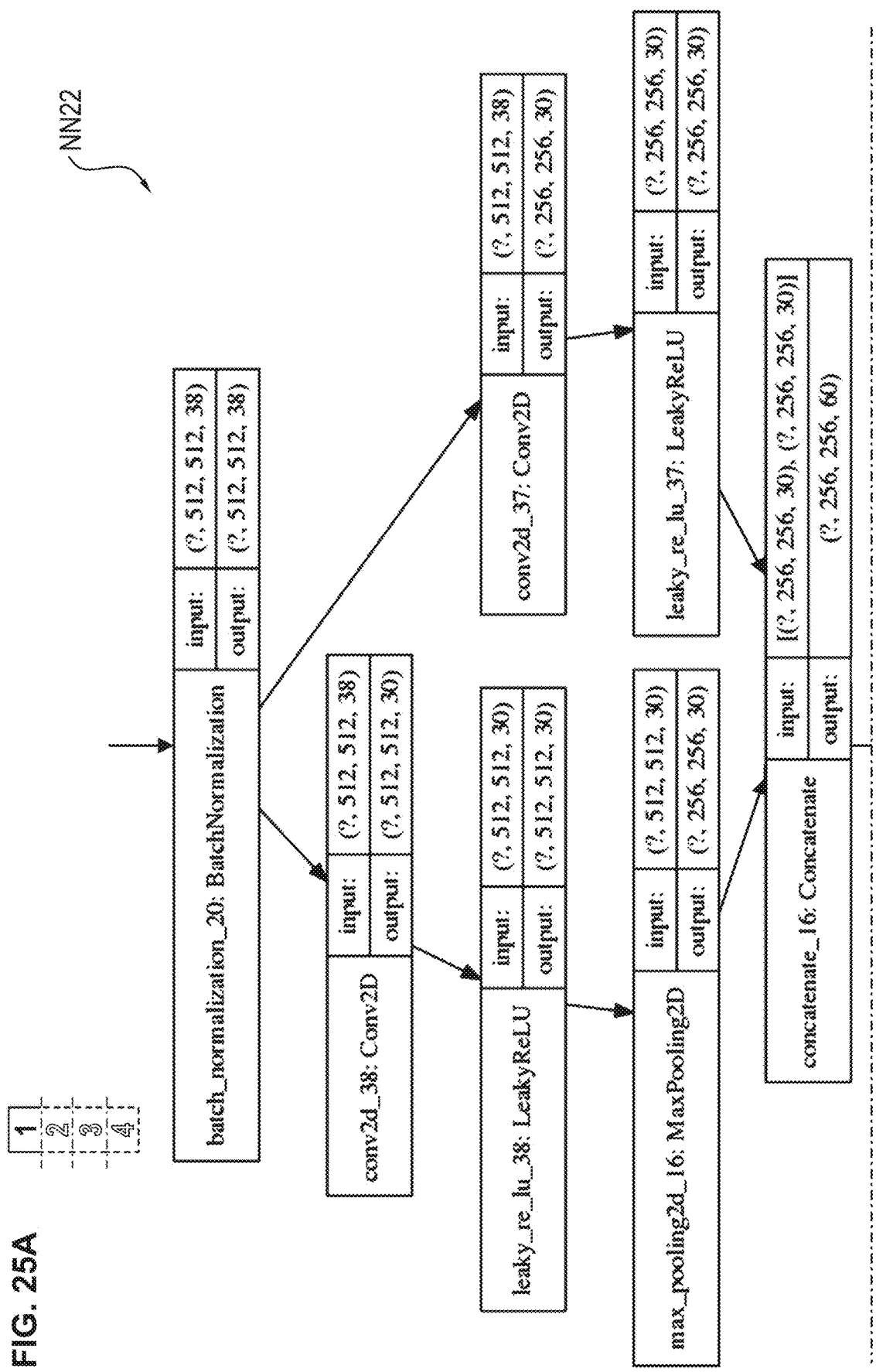
Figure 25B:
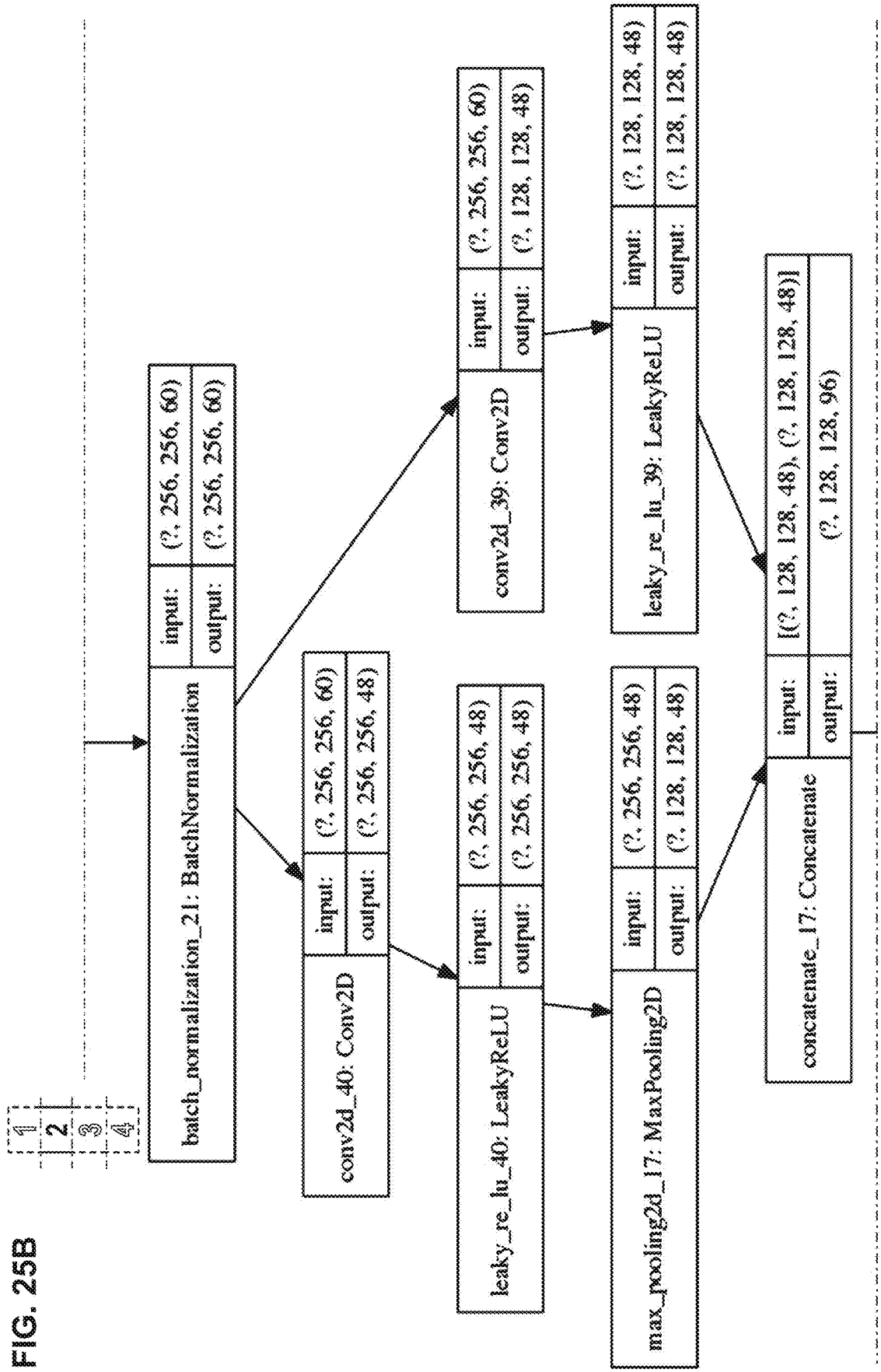
Figure 25C:
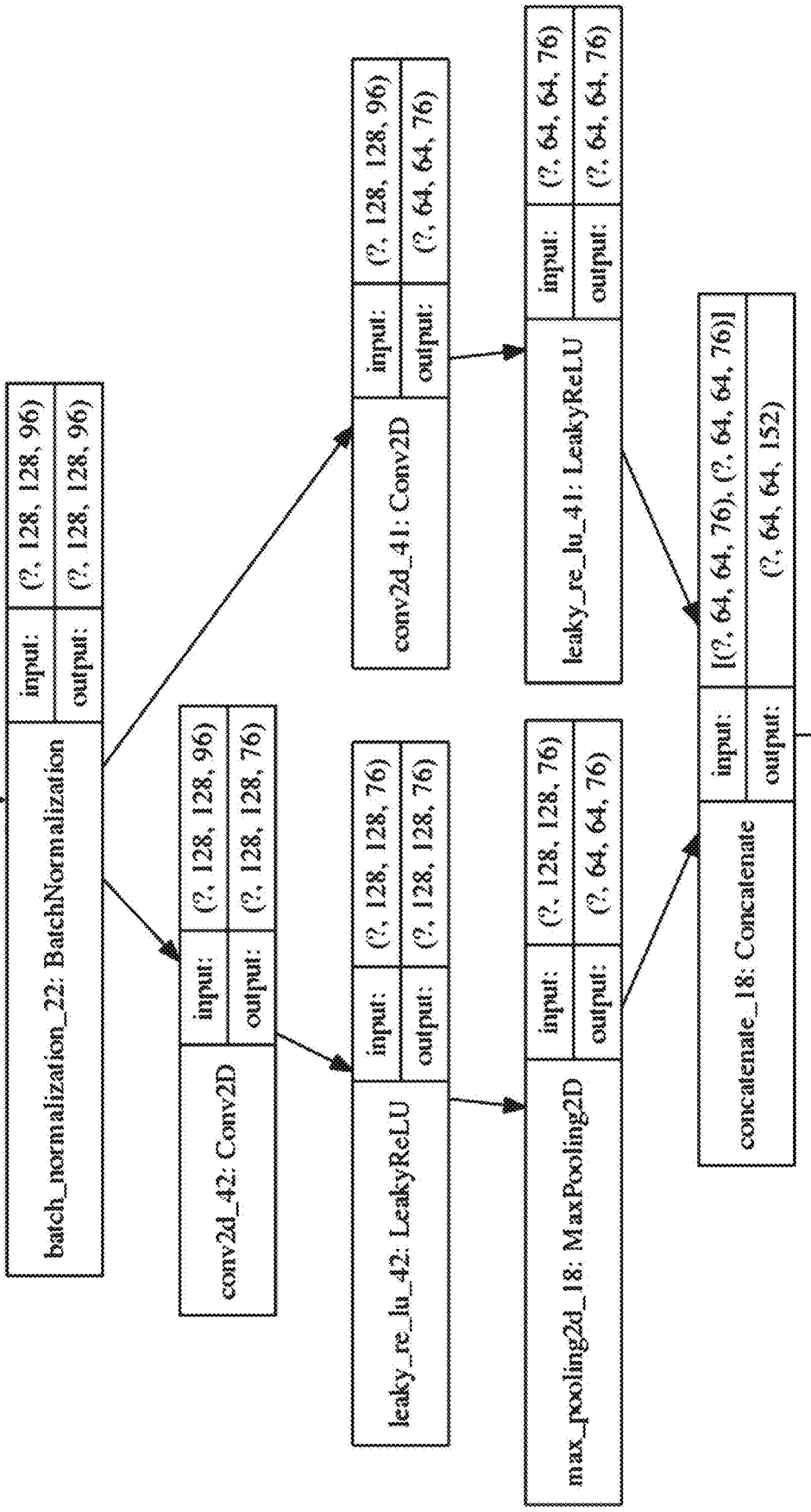
Figure 25D:
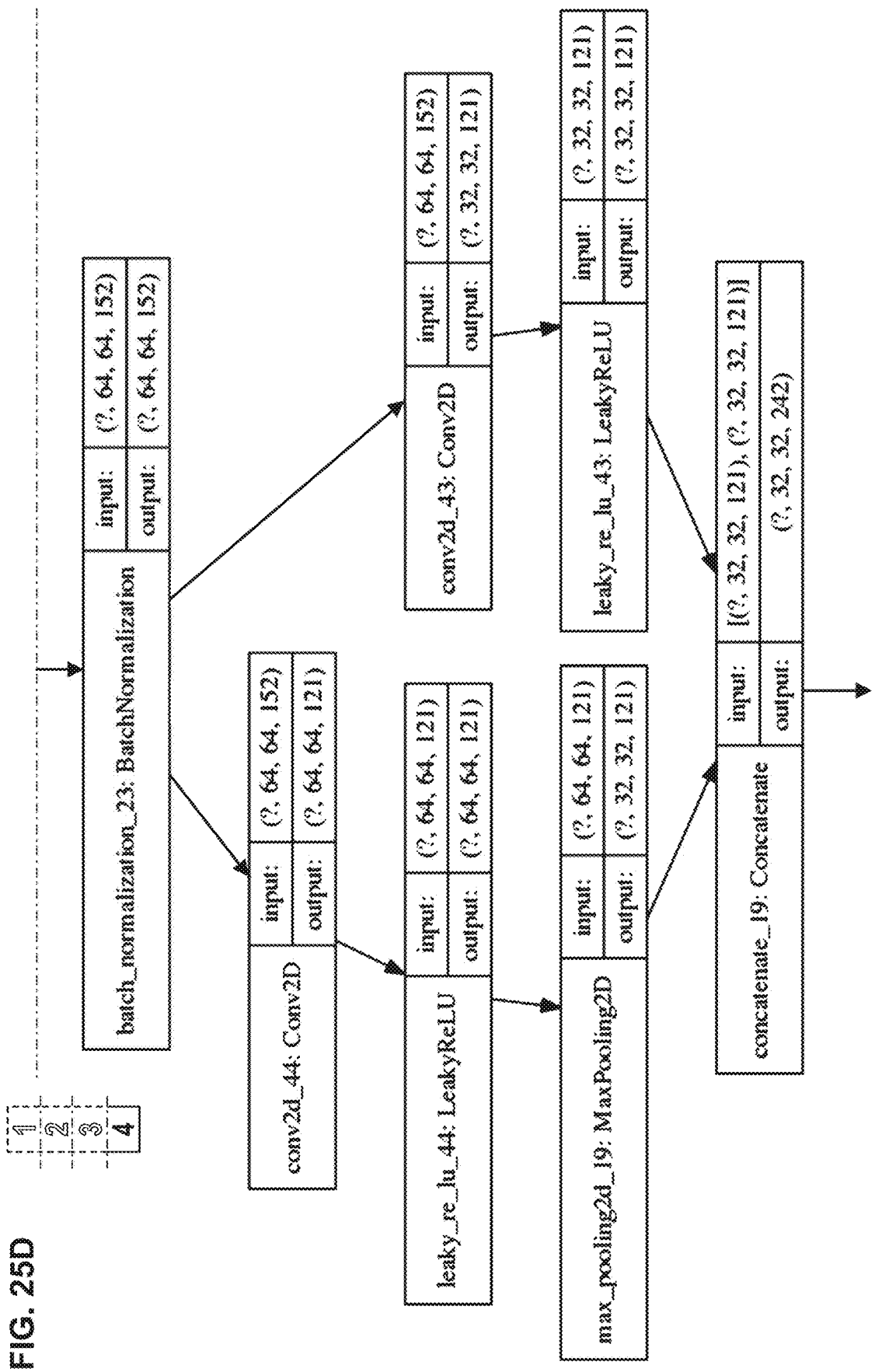

FIG. 19 show one embodiment of a proposed computer program product CPP. The computer program product CPP can be a data signal SI2 and received by a computer CO via a data interface DSX.

Although some aspects have been described in connection with an apparatus, it is evident that said aspects are also a description of the corresponding methods, and so a block or a component of an apparatus can also be understood as a corresponding method step or as a feature of a method step. By analogy, aspects which have described in connection with a method step or as a method step are also a description of a corresponding block or detail or feature of a corresponding apparatus.

Depending on particular implementation requirements, exemplary embodiments of the invention can realize the computing unit R or the data network device in hardware form and/or in software form. Here, realization of a presently mentioned computing unit R can be achieved as at least one computing unit or else by an association of multiple computing units. Implementation can be achieved using a digital storage medium, for example a floppy disk, a DVD, a Blu-Ray Disc, a CD, a ROM, a PROM, an EPROM, an EEPROM or a FLASH memory, a hard disk or some other magnetic or optical memory, which stores electronically readable control signals which cooperate or can cooperate with a programmable hardware component such that the method in question is carried out.

A programmable hardware component can be formed as a computing unit by a processor, a central processing unit (CPU), a computer, a computer system, an application-specific integrated circuit (ASIC), an integrated circuit (IC), a system on a chip (SOC), a programmable logic element or a field-programmable gate array with a microprocessor (FPGA).

The digital storage medium can therefore be machine-readable or computer-readable. Some exemplary embodiments thus comprise a data medium having electronically readable control signals capable of cooperating with a programmable computer system or a programmable hardware component such that one of the methods described herein is carried out.

In general, exemplary embodiments or parts of exemplary embodiments of the present invention can be implemented as a program, firmware, computer program or computer program product containing a program code or as data, the program code or the data being effective in carrying out one of the methods or part of a method when the program runs on a processor or a programmable hardware component.

EXPERIMENTS

FIGS. 20A to 23B show different experimental results for the various types of organ sections, in this case a rat kidney and an esophagus of a simian.

In the case of the example of the rat kidney, 465 fluorescence images were used in the course of the training for the segmentation network, i.e. the first neural network. Here, 75% of the 465 images were used in the course of the training for so-called backpropagation, and 25% of the 465 images as validation images, the classification of which was used by the network as a measure of model adjustment and generalization.

In the case of the example of the rat kidney, 6300 images were used for the classification network, i.e. the second neural network, and here too, a 75% share of the 6300 fluorescence images was used during the training as actual training data for backpropagation for adjustment of the weights of the neural network, and 25% of the 6300 fluorescence images were used for validation, i.e. for determination of a measure of the model adjustment and generalization of the neural network.

For the case of the example of an esophagus of a simian, 1700 images were correspondingly used for the training of the classification network, i.e. the second neural network, and here too, a split was made to give 75% of the images as training data for backpropagation and 25% of the images for validation.

For the case of the example of an esophagus of a simian, 1200 images were used for the segmentation network, i.e. the first neural network, in a training phase, and here too, a split was made to give 75% of the images in training data for backpropagation and 25% of the images as validation images.

Various positive and negative samples were used. Each sample was used in three different dilution levels for different incubations. What was thus generated for each sample was a set of three respective fluorescence images having a respective dilution level. If, for a particular sample, a particular pattern was detected as present at least for the fluorescence image of the lowest dilution level (=highest sample concentration) by the method according to the invention ("EPA classifier"), even if the other two fluorescence images of the greater dilutions (=lower sample concentrations) were rated as negative, then the particular pattern was decided as generally present for the sample, and the sample was rated as positive. If, for a particular sample, a particular pattern was detected as not present for all of the three fluorescence images of different dilution levels by the method according to the invention ("EPA classifier"), then the particular pattern was detected as generally not present and the sample was rated as generally negative. This principle was applied to all the results of FIGS. 20A to 23B.

FIG. 20A shows, for a rat kidney, experimental results achieved using a 20× magnification, i.e. a 20× optical magnification due to a 20× objective, and using the instrument EUROPattern Microscope 1.5.1. According to FIG. 20A, a presence of the LKM pattern was correctly detected in 11 of the 12 positive samples. In one case, the LKM pattern was not found. In the case of 80 negative samples, the LKM pattern was correctly decided as not present for 79 images; in the case of one sample, the LKM pattern was incorrectly detected. This yields a sensitivity of 91.67% and a specificity of 98.75%.

FIG. 20B shows detection of the AMA pattern in the case of a rat kidney, likewise with 20× magnification and use of the instrument EUROPattern Microscope 1.5.1. From the numerical values, the results are in agreement with those of detection of the LKM pattern.

FIG. 21A shows results for detection of the LKM pattern in the case of a rat kidney using a 10× optical magnification and the instrument EUROPattern Microscope 1.5.1. Here, in the case of 12 samples to be found as positive, the LKM pattern was found in 11 cases; however, the LKM pattern was not detected in one case. In the case of 81 samples to be rated as negative, it was correctly decided for 80 samples that the LKM pattern is not present, whereas for one sample, the LKM pattern was incorrectly detected as present. What then arise are values of 91.67% sensitivity and 98.77% specificity.

FIG. 21B shows results for a rat kidney, likewise with 10× optical magnification and use of the instrument EUROPattern Microscope 1.5.1. Here, in the case of 12 samples to be found as positive, the AMA pattern was correctly detected in 12 cases. In 81 cases of samples to be found as negative, it was also correctly decided in 81 samples that the AMA pattern is not present. The sensitivity and the specificity are then thus 100% in this case.

FIG. 22A shows results in the case of a rat kidney and an LKM pattern for a 20× magnification using the instrument EUROPattern Microscope Live. Here, in the case of 12 samples to be detected as positive, the LKM pattern was correctly detected as present for 11 samples, whereas in the case of one sample, the LKM pattern was not detected. In 80 cases of samples to be decided as negative, the LKM pattern was decided as not present for all 80 samples. Here, the sensitivity is 91.67% and the specificity is 100%.

FIG. 22B shows results for detection of the AMA pattern for a rat kidney with a 20× optical magnification and use of the instrument EUROPattern Microscope Live. In the case of 12 samples to be decided as positive, the presence of the AMA pattern was correctly detected for 11 samples, whereas in one case, the AMA pattern was incorrectly detected as not present. In the case of 80 samples to be decided as negative, it was correctly decided in 76 cases that the AMA pattern is not present, whereas in the case of 4 samples, the AMA pattern was decided as present, which, however, was incorrect. The resultant sensitivity and specificity here is 91.67% and 95%, respectively.

FIG. 23A shows, for the case of the esophagus of a simian for detection of the endomysium pattern, results using an optical 10× magnification and using the instrument EUROPattern Microscope 1.5.1. Here, in the case of 69 samples to be decided as positive, the endomysium pattern was detected as present for all 69 samples. Furthermore, in the case of 167 samples to be classified as negative, it was decided in 165 cases that the endomysium pattern is not present, which was correct. In 2 cases, it was decided that the endomysium pattern is present, which, however, was incorrect. The resultant sensitivity and specificity here is 100% and 98.8%, respectively.

FIG. 23B shows results for the esophagus of a simian for detection of a presence of the endomysium using an optical 20× magnification and using the instrument EUROPattern Microscope Live. Here, in 69 samples to be classified as positive, it was decided in all 69 cases that the endomysium pattern is present. In 167 samples to be found as negative, it was decided in all 167 cases that the endomysium pattern is not present. The resultant sensitivity and specificity are thereby 100%.

What is claimed is:

1. A method for detecting at least one potential presence of at least one fluorescence pattern type on an organ section by means of immunofluorescence microscopy and by means of digital image processing, the method comprising:
   providing the organ section on a slide,
   incubating the organ section with a liquid patient sample which potentially comprises primary antibodies, wherein said primary antibodies bind to antigens of the organ section,
   incubating the organ section with secondary antibodies which have been labelled with a fluorescent dye, wherein said secondary antibodies bind to said primary antibodies,
   acquiring a fluorescence image of the organ section in a color channel corresponding to the fluorescent dye,
   determining, by segmentation of the fluorescence image by means of a first neural network, a sub-area of the fluorescence image that is relevant to formation of the fluorescence pattern type,
   determining, on the basis of the fluorescence image by means of a second neural network, a measure of confidence that indicates an actual presence of the fluorescence pattern type,
   determining, on the basis of the previously determined sub-area, validity information that indicates a degree of a validity of the measure of confidence, wherein determining validity information comprises:
      determining a first size of a total area of the fluorescence image, and a second size of the sub-area;
      determining a percentage coverage of the fluorescence image due to the sub-area;
      comparing the percentage coverage against a predetermined threshold value;
      when the percentage coverage exceeds the predetermined threshold value, determining the validity information as valid; and
      when the percentage coverage is below the predetermined threshold value, determining the validity information as invalid; and
   outputting the measure of confidence of the actual presence of the fluorescence pattern type and the validity information.

2. A method according to claim 1, designed for detection of respective potential presences of respective fluorescence pattern types on an organ section by means of immunofluorescence microscopy and by means of digital image processing, the method further comprising:
   determining, by segmentation of the fluorescence image by means of a first neural network, a sub-area of the fluorescence image that is potentially relevant to formation of the fluorescence pattern types,
   determining, on the basis of the fluorescence image and on the basis of information indicating the sub-area, by means of a second neural network, respective measures of confidence that indicate respective actual presences of the respective fluorescence pattern types,
   determining, on the basis of the previously determined sub-area, validity information that indicates a degree of a validity of the measures of confidence, and
   outputting at least a subset of the respective measures of confidence of the respective actual presences of the respective fluorescence pattern types and the validity information.

3. A method according to claim 1, further comprising:
determining the measure of confidence on the basis of the fluorescence image and on the basis of the segmented fluorescence image by means of the second neural network.

4. A method according to claim 1, further comprising:
in the event of a fluorescence pattern type being determined as actually present, determining a degree of brightness of the sub-area in the fluorescence image that is potentially relevant to formation of the fluorescence pattern type.

5. A method according to claim 4, further comprising:
estimating a maximum degree of dilution of the patient sample at which incubation of the organ section with the patient sample still leads to a presence of a or the fluorescence pattern type.

6. A method according to claim 1, further comprising:
determining the measure of confidence on the basis of the fluorescence image, and on the basis of information indicating the sub-area, by means of the second neural network.

7. An apparatus for detecting at least one potential presence of at least one fluorescence pattern type on an organ section by means of immunofluorescence microscopy and by means of digital image processing, the apparatus comprising:
a holding device for a slide containing an organ section which has been incubated with a patient sample potentially comprising primary antibodies and furthermore with secondary antibodies which have each been labelled with a fluorescent dye,
at least one image acquisition unit for acquiring a fluorescence image of the organ section in a color channel corresponding to the fluorescent dye, and
at least one computing unit configured to:
determine, by segmentation of the fluorescence image by means of a first neural network, a sub-area in the fluorescence image that is relevant to formation of the fluorescence pattern type,
determine, on the basis of the fluorescence image by means of a second neural network, a measure of confidence that indicates an actual presence of the fluorescence pattern type,
determine, on the basis of the sub-area, validity information that indicates a degree of a validity of the measure of confidence, wherein determining validity information comprises:
determining a first size of a total area of the fluorescence image, and a second size of the sub-area;
determining a percentage coverage of the fluorescence image due to the sub-area;
comparing the percentage coverage against a predetermined threshold value;
when the percentage coverage exceeds the predetermined threshold value, determining the validity information as valid; and
when the percentage coverage is below the predetermined threshold value, determining the validity information as invalid; and
output the measure of confidence of the actual presence of the fluorescent pattern type and the validity information.

8. A computing unit which, in the course of digital image processing, is configured to:
receive a fluorescence image representing staining of an organ section due to a fluorescent dye,
determine, by segmentation of the fluorescence image by means of a first neural network, a sub-area in the fluorescence image that is relevant to formation of the fluorescence pattern type,
determine, on the basis of the fluorescence image by means of a second neural network, a measure of confidence that indicates an actual presence of the fluorescence pattern type,
determine, on the basis of the previously determined sub-area, validity information that indicates a degree of a validity of the measure of confidence, wherein determining validity information comprises:
determining a first size of a total area of the fluorescence image, and a second size of the sub-area;
determining a percentage coverage of the fluorescence image due to the sub-area;
comparing the percentage coverage against a predetermined threshold value;
when the percentage coverage exceeds the predetermined threshold value, determining the validity information as valid; and
when the percentage coverage is below the predetermined threshold value, determining the validity information as invalid; and
output the measure of confidence of the actual presence of the fluorescence pattern type and the validity information.

9. A data network device comprising:
at least one data interface for receiving a fluorescence image representing staining of an organ section due to a fluorescent dye, and
at least one computing unit which, in the course of digital image processing, is configured to:
determine, by segmentation of the fluorescence image by means of a first neural network, a sub-area in the fluorescence image that is relevant to formation of the fluorescence pattern type,
determine, on the basis of the fluorescence image by means of a second neural network, a measure of confidence that indicates an actual presence of the fluorescence pattern type,
determine, on the basis of the previously determined sub-area, validity information that indicates a degree of a validity of the measure of confidence, wherein determining validity information comprises:
determining a first size of a total area of the fluorescence image, and a second size of the sub-area;
determining a percentage coverage of the fluorescence image due to the sub-area;
comparing the percentage coverage against a predetermined threshold value;
when the percentage coverage exceeds the predetermined threshold value, determining the validity information as valid; and
when the percentage coverage is below the predetermined threshold value, determining the validity information as invalid; and
output the measure of confidence of the actual presence of the fluorescence pattern type and the validity information.

10. A method for digital image processing comprising:
receiving a fluorescence image representing staining of an organ section due to a fluorescent dye,
determining, by segmentation of the fluorescence image by means of a first neural network, a sub-area in the fluorescence image that is relevant to formation of the fluorescence pattern type, determining, on the basis of the fluorescence image by means of a second neural network, a measure of confidence that indicates an actual presence of the fluorescence pattern type, determining, on the basis of the previously determined sub-area, validity information that indicates a degree of a validity of the measure of confidence, wherein determining validity information comprises:

determining a first size of a total area of the fluorescence image, and a second size of the sub-area;

determining a percentage coverage of the fluorescence image due to the sub-area;

comparing the percentage coverage against a predetermined threshold value;

when the percentage coverage exceeds the predetermined threshold value, determining the validity information as valid; and when the percentage coverage is below the predetermined threshold value, determining the validity information as invalid; and outputting the measure of confidence of the actual presence of the fluorescence pattern type and the validity information.

11. A computer program product comprising commands which, upon execution of the program by a computer, prompt said computer to:

receive a fluorescence image representing staining of an organ section due to a fluorescent dye, determine, by segmentation of the fluorescence image by means of a first neural network, a sub-area in the fluorescence image that is relevant to formation of the fluorescence pattern type, determine, on the basis of the fluorescence image by means of a second neural network, a measure of confidence that indicates an actual presence of the fluorescence pattern type, determine, on the basis of the previously determined sub-area, validity information that indicates a degree of a validity of the measure of confidence, wherein determining validity information comprises:

determining a first size of a total area of the fluorescence image, and a second size of the sub-area;

determining a percentage coverage of the fluorescence image due to the sub-area;

comparing the percentage coverage against a predetermined threshold value;

when the percentage coverage exceeds the predetermined threshold value, determining the validity information as valid; and when the percentage coverage is below the predetermined threshold value, determining the validity information as invalid; and output the measure of confidence of the actual presence of the fluorescence pattern type and the validity information.

\* \* \* \* \*